(12) United States Patent
Tanaka et al.

(10) Patent No.: US 12,493,174 B2
(45) Date of Patent: Dec. 9, 2025

(54) ZOOM LENS AND IMAGING APPARATUS

(71) Applicant: FUJIFILM Corporation, Tokyo (JP)

(72) Inventors: Takuya Tanaka, Saitama (JP); Motoari Ota, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 310 days.

(21) Appl. No.: 18/466,521

(22) Filed: Sep. 13, 2023

(65) Prior Publication Data

US 2024/0103257 A1 Mar. 28, 2024

(30) Foreign Application Priority Data

Sep. 22, 2022 (JP) .................................. 2022-151982

(51) Int. Cl.
*G02B 15/14* (2006.01)
*G02B 15/16* (2006.01)

(52) U.S. Cl.
CPC .......... *G02B 15/143* (2019.08); *G02B 15/16* (2013.01)

(58) Field of Classification Search
CPC .............................. G02B 15/143; G02B 15/16

USPC ......................................... 359/672, 675, 689
See application file for complete search history.

(56) References Cited

U.S. PATENT DOCUMENTS

2007/0058264 A1* 3/2007 Yakita .................... H04N 23/55
359/676
2021/0096344 A1 4/2021 Komatsu

FOREIGN PATENT DOCUMENTS

JP 2021-056491 A 4/2021

* cited by examiner

*Primary Examiner* — William Choi
(74) *Attorney, Agent, or Firm* — Studebaker Brackett PLLC

(57) ABSTRACT

The zoom lens includes, in order from an object side, a focusing part, a variable magnification part, an aperture stop, and an imaging part. The zoom lens is switchable between a first state and a second state by replacing a part of the imaging part that is provided to be replaceable. In response to switching from the first state to the second state, a focal length of the zoom lens changes to a long focal length side while keeping an image formation position constant. The zoom lens satisfies predetermined conditional expressions.

20 Claims, 29 Drawing Sheets

EXAMPLE 1a

EXAMPLE 1b

EXAMPLE 1a

EXAMPLE 2a

EXAMPLE 2b

EXAMPLE 3a

EXAMPLE 3b

EXAMPLE 3a

EXAMPLE 3b

EXAMPLE 4a

EXAMPLE 4b

EXAMPLE 4a

EXAMPLE 4b

EXAMPLE 5a

EXAMPLE 5b

EXAMPLE 5b

EXAMPLE 6a

EXAMPLE 6b

EXAMPLE 6a

ZOOM LENS AND IMAGING APPARATUS

CROSS-REFERENCE TO RELATED APPLICATIONS

This application claims priority from Japanese Patent Application No. 2022-151982, filed on Sep. 22, 2022, the entire disclosure of which is incorporated herein by reference.

BACKGROUND OF THE INVENTION

Technical Field

The technique of the present disclosure relates to a zoom lens and an imaging apparatus.

Related Art

In the related art, as a lens system that can be used for a broadcast camera or the like, for example, the one described in JP2021-056491A below is known. JP2021-056491A describes an optical system including an extender lens that is replaced with a part of the master lens to change the focal length of the whole lens system after the replacement to a longer focal length side than the focal length of the master lens.

SUMMARY

In many optical systems in the related art, the angle of view of the optical system after the replacement is smaller than that of the optical system before the replacement with the extender lens, and the image size is fixed. However, a remarkable change in the angle of view during imaging may cause a sense of discomfort depending on a user, and may cause a strong sense of discomfort particularly in the case of taking a video. Further, in a case where the image size can be increased while lengthening the focal length of the whole system by changing a part of the optical system, it is possible to support an imaging element having a larger size, and it is possible to obtain a highly versatile optical system.

The present disclosure provides a zoom lens that is capable of increasing an image size while lengthening a focal length by replacing a part of a lens system and while suppressing fluctuations in an angle of view caused by the replacement so as to have favorable optical performance through suppression of various aberrations in a state before and after the replacement, and an imaging apparatus including the zoom lens.

According to a first aspect of the present disclosure, there is provided a zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change. The zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, and in response to switching from the first state to the second state, a focal length of a whole system changes to a long focal length side while keeping an image formation position constant. Assuming that a focal length of the whole system in a state where an infinite distance object is in focus at a telephoto end in the first state is fta, a maximum half angle of view in a state where the infinite distance object is in focus at the telephoto end in the first state is $\omega ta$, a focal length of the whole system in a state where the infinite distance object is in focus at the telephoto end in the second state is ftb, a maximum half angle of view in a state where the infinite distance object is in focus at the telephoto end in the second state is $\omega tb$, a focal length of the imaging part in the first state is fMa, a focal length of the M2a lens group is fM2a, a focal length of the imaging part in the second state is fMb, and a focal length of the M2b lens group is fM2b, Conditional Expressions (1), (2), and (3) are satisfied, which are represented by $$1.35 < (ftb \times \tan \omega tb)/(fta \times \tan \omega ta) < 1.65 \quad (1),$$

$$0 < |fMa/fM2a| < 4 \quad (2), \text{ and}$$

$$0 < |fMb/fM2b| < 7 \quad (3).$$

According to a second aspect of the present disclosure, there is provided a zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change. The zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, and in response to switching from the first state to the second state, a focal length of a whole system changes to a long focal length side while keeping an image formation position constant. Assuming that a focal length of the imaging part in the first state is fMa, a focal length of the M2a lens group is fM2a, a focal length of the imaging part in the second state is fMb, a focal length of the M2b lens group is fM2b, a maximum half angle of view in a state where an infinite distance object is in focus at a telephoto end in the first state is $\omega ta$, and a maximum half angle of view in a state where the infinite distance object is in focus at the telephoto end in the second state is $\omega tb$, Conditional Expressions (2), (3), and (4) are satisfied, which are represented by $$0 < |fMa/fM2a| < 4 \quad (2),$$

$$0 < |fMb/fM2b| < 7 \quad (3), \text{ and}$$

$$0.875 < \omega tb/\omega ta < 1.125 \quad (4).$$

According to a third aspect of the present disclosure, there is provided a zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change. The zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, and in response to switching from the first state to the second state, a focal length of a whole system changes to a long focal length side while keeping an image formation position constant. Assuming that a focal length of the imaging part in the first state is fMa, a focal length of the M2a lens group is fM2a, a focal length of the imaging part in the second state is fMb, a focal length of the M2b lens group is fM2b, an effective diameter of a lens surface closest to the object side in the M3 lens group in the second state is φM3F, and an effective diameter of a lens surface closest to the image side in the M3 lens group in the second state is φM3R, Conditional Expressions (2), (3), and (5) are satisfied, which are represented by $$0<|fMa/fM2a|<4 \quad (2),$$

$$0<|fMb/fM2b|<7 \quad (3), \text{ and}$$

$$0.5<\varphi M3F/\varphi M3R<0.95 \quad (5).$$

Hereinafter, in this unit, the zoom lenses according to the first aspect, the second aspect, and the third aspect are collectively referred to as the zoom lens according to the above-mentioned aspect.

Assuming that a maximum diameter of an on-axis luminous flux on a lens surface closest to the object side in the M2a lens group is φM2aF, a maximum diameter of the on-axis luminous flux on a lens surface closest to the image side in the M2a lens group is φM2aR, a maximum diameter of the on-axis luminous flux on a lens surface closest to the object side in the M2b lens group is φM2bF, and a maximum diameter of the on-axis luminous flux on a lens surface closest to the image side in the M2b lens group is φM2bR, it is preferable that the zoom lens according to the above-mentioned aspect satisfies Conditional Expression (6), which is represented by $$0.525<(\varphi M2bR/\varphi M2bF)/(\varphi M2aR/\varphi M2aF)<0.8 \quad (6).$$

It is preferable that the M1 lens group includes a vibration-proof group that moves in a direction intersecting with an optical axis during image blur correction. Assuming that a lateral magnification of the vibration-proof group in a state where the infinite distance object is in focus is βs, and a composite lateral magnification of the M2a lens group and the M3 lens group in a state where the infinite distance object is in focus in the first state is βM2a3, it is preferable that the zoom lens according to the above-mentioned aspect satisfies Conditional Expression (7), which is represented by $$0.5<|(1-\beta s)\times\beta M2a3|<2.75 \quad (7).$$

It is preferable that the vibration-proof group is disposed to be closest to the image side in the M1 lens group. Assuming that an effective diameter of a lens surface closest to the object side in the vibration-proof group in the first state is φM1saF, and an effective diameter of a lens surface closest to the object side in the M1 lens group in the first state is φM1aF, it is preferable that the zoom lens according to the above-mentioned aspect satisfies Conditional Expression (8), which is represented by $$0.6<\varphi M1saF/\varphi M1aF<0.875 \quad (8).$$

Assuming that a focal length of the whole system in a state where the infinite distance object is in focus at a wide angle end in the second state is fwb, and a distance on an optical axis from the image plane in a state where the infinite distance object is in focus at the wide angle end in the second state to a paraxial exit pupil position is Dexwb, where a sign of Dexwb is positive in a case of being a distance on the image side and is negative in a case of being a distance on the object side, with respect to the image plane, and Dexwb is calculated using an air-equivalent distance for an optical member having no refractive power in a case where the optical member is disposed between the image plane and the paraxial exit pupil position, it is preferable that the zoom lens according to the above-mentioned aspect satisfies Conditional Expression (9), which is represented by $$-0.45<fwb/Dexwb<-0.05 \quad (9).$$

The M2b lens group may be configured to include two cemented lenses. In such a case, one of the two cemented lenses may be configured to be a three-element cemented lens.

Assuming that a sum of a back focal length of the whole system at an air-equivalent distance and a distance on an optical axis from a lens surface closest to the object side in the zoom lens to a lens surface closest to the image side in the zoom lens in a state where the infinite distance object is in focus at the telephoto end in the second state is TLtb, the focal length of the whole system in a state where the infinite distance object is in focus at the telephoto end in the second state is ftb, and the maximum half angle of view in a state where the infinite distance object is in focus at the telephoto end in the second state is ωtb, it is preferable that the zoom lens according to the above-mentioned aspect satisfies Conditional Expression (10), which is represented by $$30<TLtb/(ftb\times\tan\omega tb)<39 \quad (10).$$

It is preferable that the focusing part has a positive refractive power as a whole.

Assuming that a focal length of the focusing part in a state where the infinite distance object is in focus is fF, and a focal length of a first lens, which is a lens closest to the object side in the focusing part, is fL1, it is preferable that the zoom lens according to the above-mentioned aspect satisfies Conditional Expression (11), which is represented by $$-0.675<fF/fL1<-0.425 \quad (11).$$

Assuming that a refractive index of a first lens, which is a lens closest to the object side in the focusing part, at a d line is NdL1, an Abbe number of the first lens based on the d line is vdL1, and a partial dispersion ratio of the first lens between a g line and an F line is θgFL1, it is preferable that the zoom lens according to the above-mentioned aspect satisfies Conditional Expressions (12), (13), and (14) represented by $$1.72<NdL1<1.92 \quad (12),$$

$$34<vdL1<57 \quad (13), \text{ and}$$

$$0.55<\theta gFL1<0.585 \quad (14).$$

Assuming that the variable magnification lens group closest to the object side in the variable magnification part is a V1 lens group that has a negative refractive power and moves during magnification change, a focal length of the focusing part in a state where the infinite distance object is in focus is fF, and a focal length of the V1 lens group is fV1, it is preferable that the zoom lens according to the above-mentioned aspect satisfies Conditional Expression (15), which is represented by $$4 < fF/(-fV1) < 9 \quad (15).$$

Assuming that the variable magnification lens group closest to the object side in the variable magnification part is a V1 lens group that has a negative refractive power and moves during magnification change, a lateral magnification of the V1 lens group in a state where the infinite distance object is in focus at the telephoto end is βV1t, and a lateral magnification of the V1 lens group in a state where the infinite distance object is in focus at a wide angle end is βV1w, it is preferable that the zoom lens according to the above-mentioned aspect satisfies Conditional Expression (16), which is represented by $$7.5 < \beta V1t/\beta V1w < 12 \quad (16).$$

The variable magnification part may be configured to consist of, in order from the object side to the image side, a V1 lens group that has a negative refractive power and moves during magnification change, a V2 lens group that has a positive refractive power and moves during magnification change, and a V3 lens group that has a positive refractive power and moves during magnification change, and may be configured such that a spacing between the V1 lens group and the V2 lens group changes and a spacing between the V2 lens group and the V3 lens group changes, during magnification change.

Assuming that a focal length of the V1 lens group is fV1, and a composite focal length between the V2 lens group and the V3 lens group at the telephoto end is fV23t, it is preferable that the zoom lens according to the above-mentioned aspect satisfies Conditional Expression (17), which is represented by $$-0.45 < fV23t/fV1 < -0.225 \quad (17).$$

Assuming that an open F number in a state where the infinite distance object is in focus at the telephoto end in the first state is Fnota, the focal length of the whole system in a state where the infinite distance object is in focus at the telephoto end in the first state is fta, and a focal length of the whole system in a state where the infinite distance object is in focus at a wide angle end in the first state is fwa, it is preferable that the zoom lens according to the above-mentioned aspect satisfies Conditional Expression (18), which is represented by $$0.11 < Fnota/(fta/fwa) < 0.15 \quad (18).$$

Assuming that a sum of a back focal length of the whole system at an air-equivalent distance and a distance on an optical axis from a lens surface closest to the object side in the zoom lens to a lens surface closest to the image side in the zoom lens in a state where the infinite distance object is in focus at the telephoto end in the second state is TLtb, and the focal length of the whole system in a state where the infinite distance object is in focus at the telephoto end in the second state is ftb, it is preferable that the zoom lens according to the above-mentioned aspect satisfies Conditional Expression (19), which is represented by $$0.4 < TLtb/ftb < 0.6 \quad (19).$$

An imaging apparatus according to another aspect of the present disclosure comprises the zoom lens according to the aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group that has a positive refractive power" mean that the group as a whole has a positive refractive power. Similarly, the terms "group that has a negative refractive power" and "group has a negative refractive power" mean that the group as a whole has a negative refractive power. Further, the term "lens group" in the present specification is not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power and the surface shape of the lens including the aspherical surface will be used in terms of the paraxial region unless otherwise specified.

In the present specification, the term "whole system" means "zoom lens". The "focal length" used in a conditional expression is a paraxial focal length. Unless otherwise specified, the "distance on the optical axis" used in Conditional Expression is considered as a geometrical distance. The values used in the conditional expressions are values in a case where the d line is used as a reference in a state where the infinite distance object is in focus unless otherwise specified.

The "d line", "C line", "F line", and "g line" described in the present specification are bright lines. It is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide a zoom lens that is capable of increasing an image size while lengthening a focal length by replacing a part of a lens system and while suppressing fluctuations in an angle of view caused by the replacement so as to have favorable optical performance through suppression of various aberrations in a state before and after the replacement, and an imaging apparatus including the zoom lens.

BRIEF DESCRIPTION OF THE DRAWINGS

FIG. 3 is a diagram showing a configuration and luminous flux of an imaging part of the zoom lens according to Example 1a.

FIG. 7 is a diagram showing aberrations of the zoom lens according to Example 1a.

FIG. 9 is a diagram showing a configuration and a movement locus of a zoom lens according to Example 2a.

FIG. 11 is a diagram showing aberrations of the zoom lens according to Example 2a.

FIG. 13 is a diagram showing a configuration and a movement locus of a zoom lens according to Example 3a.

FIG. 15 is a diagram showing aberrations of the zoom lens according to Example 3a.

FIG. 17 is a diagram showing a configuration and a movement locus of a zoom lens according to Example 4a.

FIG. 19 is a diagram showing aberrations of the zoom lens according to Example 4a.

FIG. 21 is a diagram showing a configuration and a movement locus of a zoom lens according to Example 5a.

FIG. 23 is a diagram showing aberrations of the zoom lens according to Example 5a.

FIG. 25 is a diagram showing a configuration and a movement locus of a zoom lens according to Example 6a.

FIG. 27 is a diagram showing aberrations of the zoom lens according to Example 6a.

DESCRIPTION OF EMBODIMENTS

Hereinafter, embodiments of the present disclosure will be described with reference to the accompanying drawings.

Figure 1:
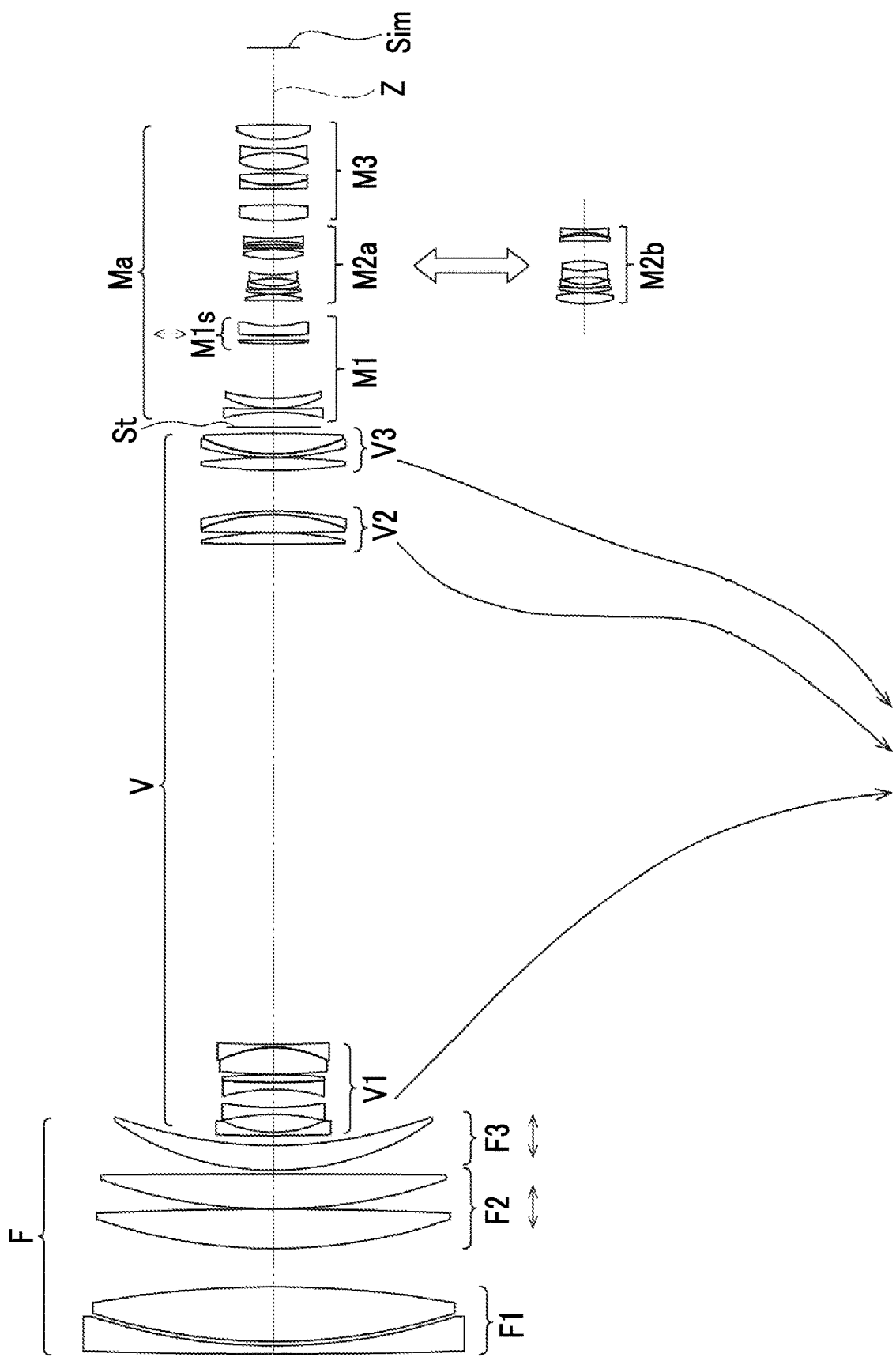
FIG. 1 is a diagram showing a configuration and a movement locus of a zoom lens according to an embodiment.

FIG. 1 shows a cross-sectional view and a movement locus of a configuration of a zoom lens according to an embodiment of the present disclosure. FIG. 1 shows a state where the infinite distance object is in focus, the left side thereof is an object side, and the right side thereof is an image side. A part of the zoom lens according to the embodiment of the present disclosure is replaceable, and the zoom lens is switchable between a first state and a second state by the replacement. The first state of the zoom lens of FIG. 1 corresponds to Example 1a to be described later, and the second state of the zoom lens of FIG. 1 corresponds to Example 1b to be described later.

In the first state, the zoom lens according to the embodiment of the present disclosure comprises, in order from the object side to the image side along an optical axis Z, a focusing part F, a variable magnification part V, an aperture stop St, and an imaging part Ma.

The focusing part F includes a focusing lens group that moves during focusing, and remains stationary with respect to an image plane Sim during magnification change. Since the focusing part F remains stationary during magnification change, a total length of the lens system during magnification change can be kept constant. Thereby, fluctuation in center of gravity of the lens system during magnification change can be reduced. Therefore, convenience for imaging can be enhanced. The variable magnification part V includes at least two variable magnification lens groups in which the spacing between the adjacent groups changes during magnification change. The imaging part Ma remains stationary with respect to the image plane Sim during magnification change.

The imaging part Ma consists of, in order from the object side to the image side, an M1 lens group M1, an M2a lens group M2a, and an M3 lens group M3. The M2a lens group M2a is insertable and detachable, and replaceable in an optical path.

In the second state, the zoom lens according to the embodiment of the present disclosure comprises, in order from the object side to the image side along the optical axis Z, the focusing part F, the variable magnification part V, the aperture stop St, and the imaging part Mb. The imaging part Mb remains stationary with respect to the image plane Sim during magnification change.

The imaging part Mb consists of, in order from the object side to the image side, an M1 lens group M1, an M2b lens group M2b, and an M3 lens group M3. The focusing part F, the variable magnification part V, the aperture stop St, the M1 lens group M1, and the M3 lens group M3 in the second state are all common to those in the first state. The M2b lens group M2b is insertable and detachable in the optical path and is replaceable with the M2a lens group M2a.

The zoom lens according to the embodiment of the present disclosure is switchable between the first state and the second state by replacing the M2a lens group M2a and the M2b lens group M2b. In response to switching from the first state to the second state, a focal length of a whole system changes to a long focal length side while keeping an image formation position constant. It should be noted that "keeping the image formation position constant" above is not limited to a case of complete matching and permits a slight error. For example, in a case where a diameter of a permissible circle of confusion is denoted by δ and an F number of the whole system in the second state is denoted by AFN, the permissible error can be set as ±(δ×AFN).

Figure 2:
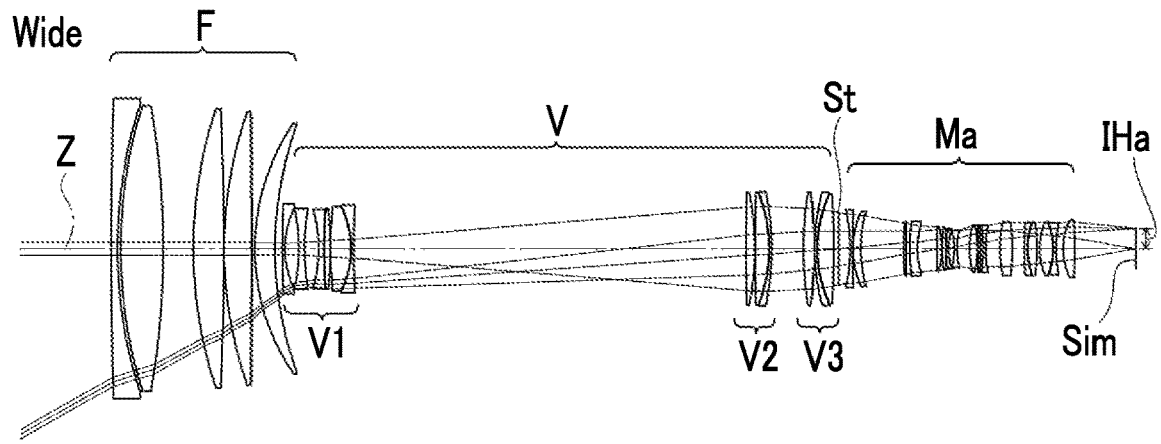
FIG. 2 is a diagram showing a configuration and luminous flux of a zoom lens according to Example 1a in each magnification change state.
Figure 2:
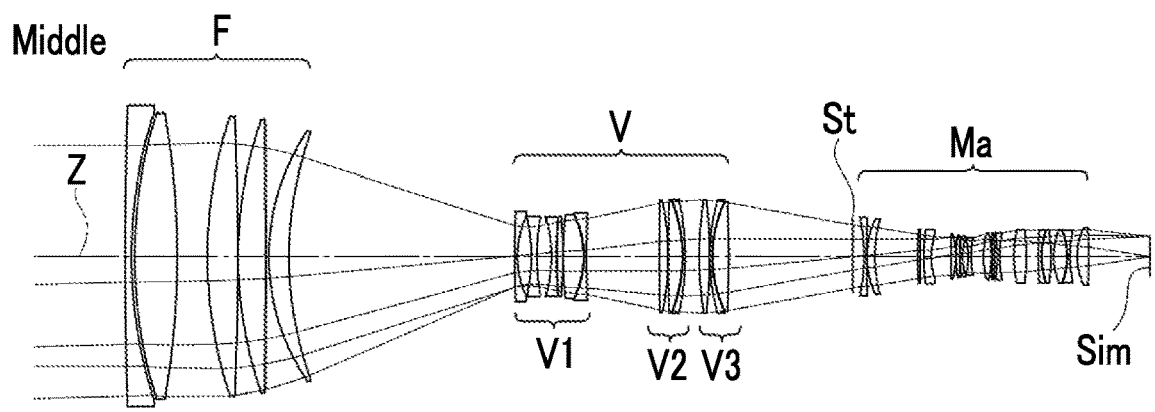
Figure 2:
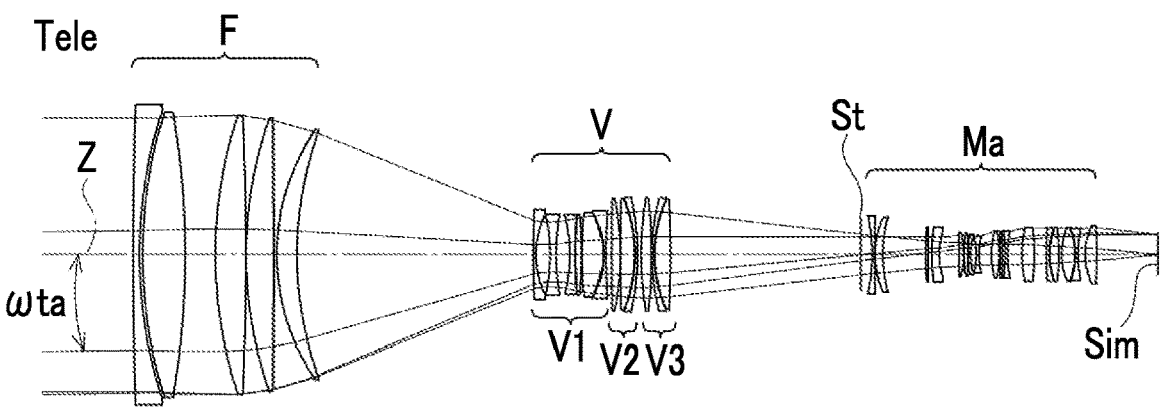

FIG. 2 shows a configuration and luminous flux in each variable magnification state of the zoom lens of FIG. 1 in the first state. In FIG. 2, the upper part labeled "Wide" shows the wide angle end state, the middle part labeled "Middle" shows the middle focal length state, and the lower part labeled "Tele" shows the telephoto end state. FIG. 2 shows, as the luminous flux, an on-axis luminous flux and a luminous flux with a maximum image height IHa.

Figure 3:
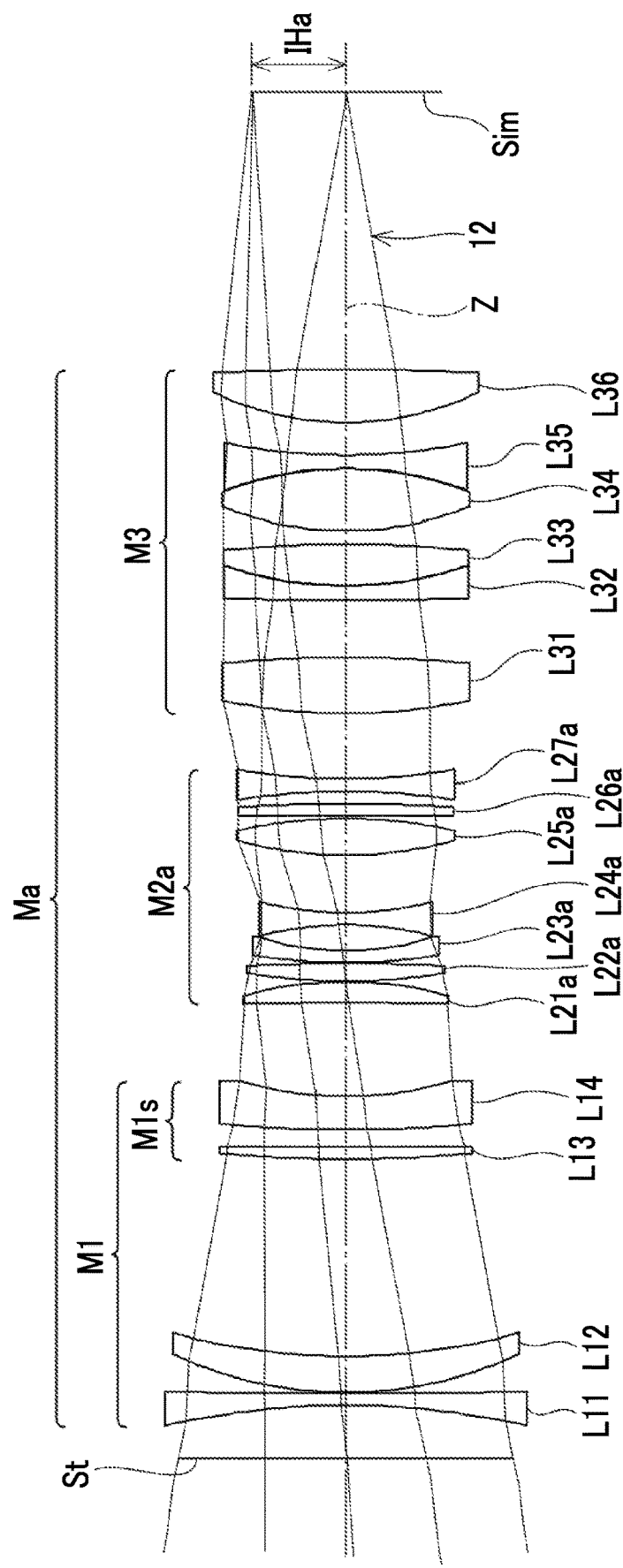

FIG. 3 shows an enlarged view of the aperture stop St and the imaging part Ma at the wide angle end of the zoom lens of FIG. 2. FIG. 3 shows, as the luminous flux, the on-axis luminous flux 12 and the luminous flux with the maximum image height IHa. For example, each lens group of the imaging part Ma in FIG. 3 is configured as follows. The M1 lens group M1 consists of four lenses L11 to L14, in order from the object side to the image side. The M2a lens group M2a consists of seven lenses L21a to L27a, in order from the object side to the image side. The M3 lens group M3 consists of six lenses L31 to L36, in order from the object side to the image side.

Figure 4:
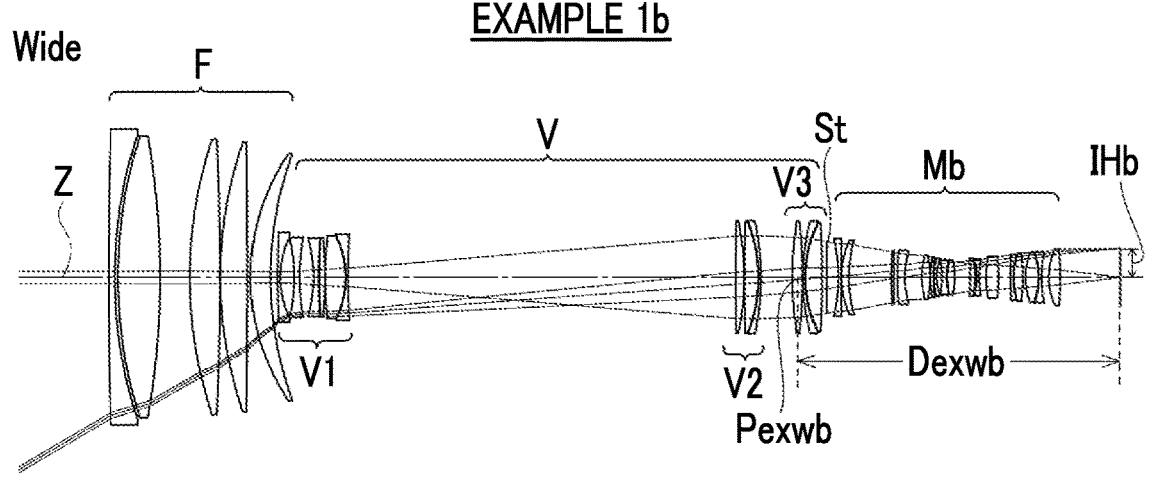
FIG. 4 is a diagram showing a configuration and luminous flux of a zoom lens according to Example 1b in each magnification change state.
Figure 4:
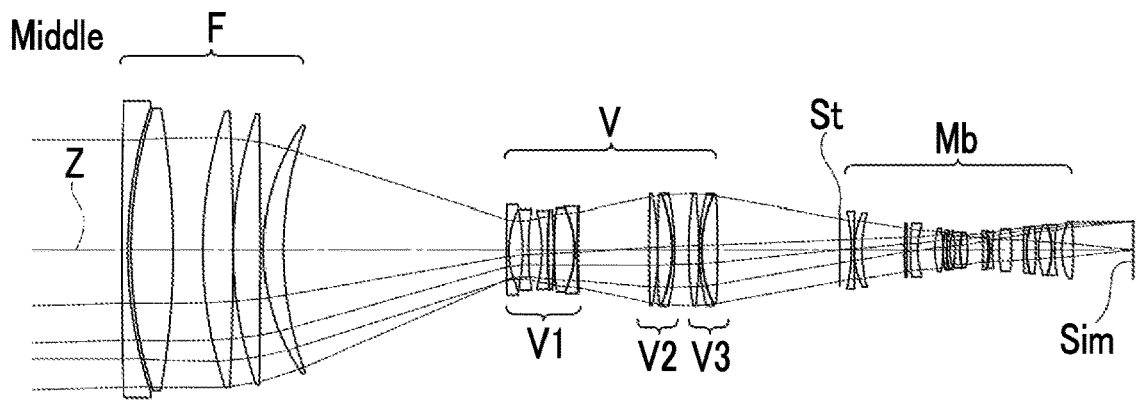
Figure 4:
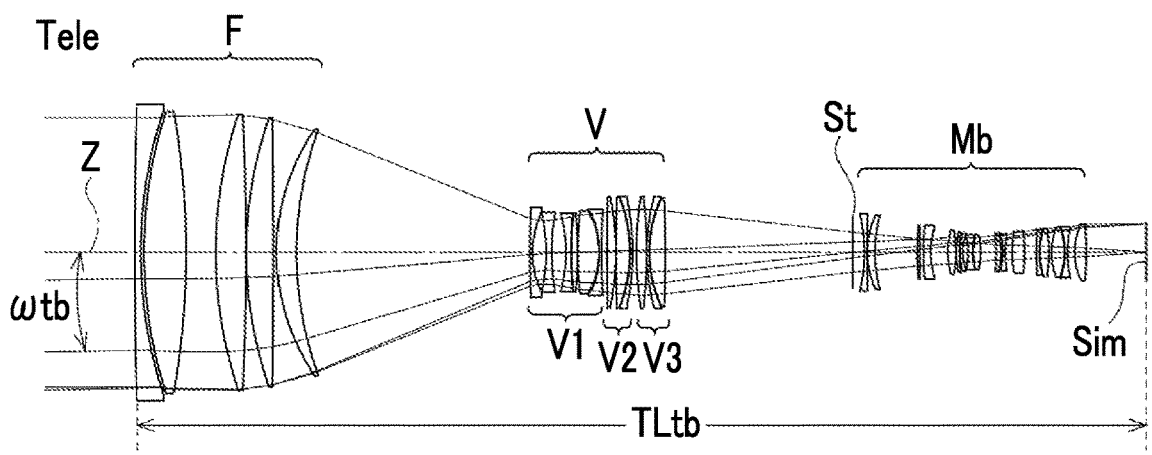

FIG. 4 shows a configuration and luminous flux in each variable magnification state of the zoom lens of FIG. 1 in the second state. In FIG. 4, the upper part labeled "Wide" shows the wide angle end state, the middle part labeled "Middle" shows the middle focal length state, and the lower part labeled "Tele" shows the telephoto end state. FIG. 4 shows, as the luminous flux, an on-axis luminous flux and a luminous flux with a maximum image height IHb.

Figure 5:
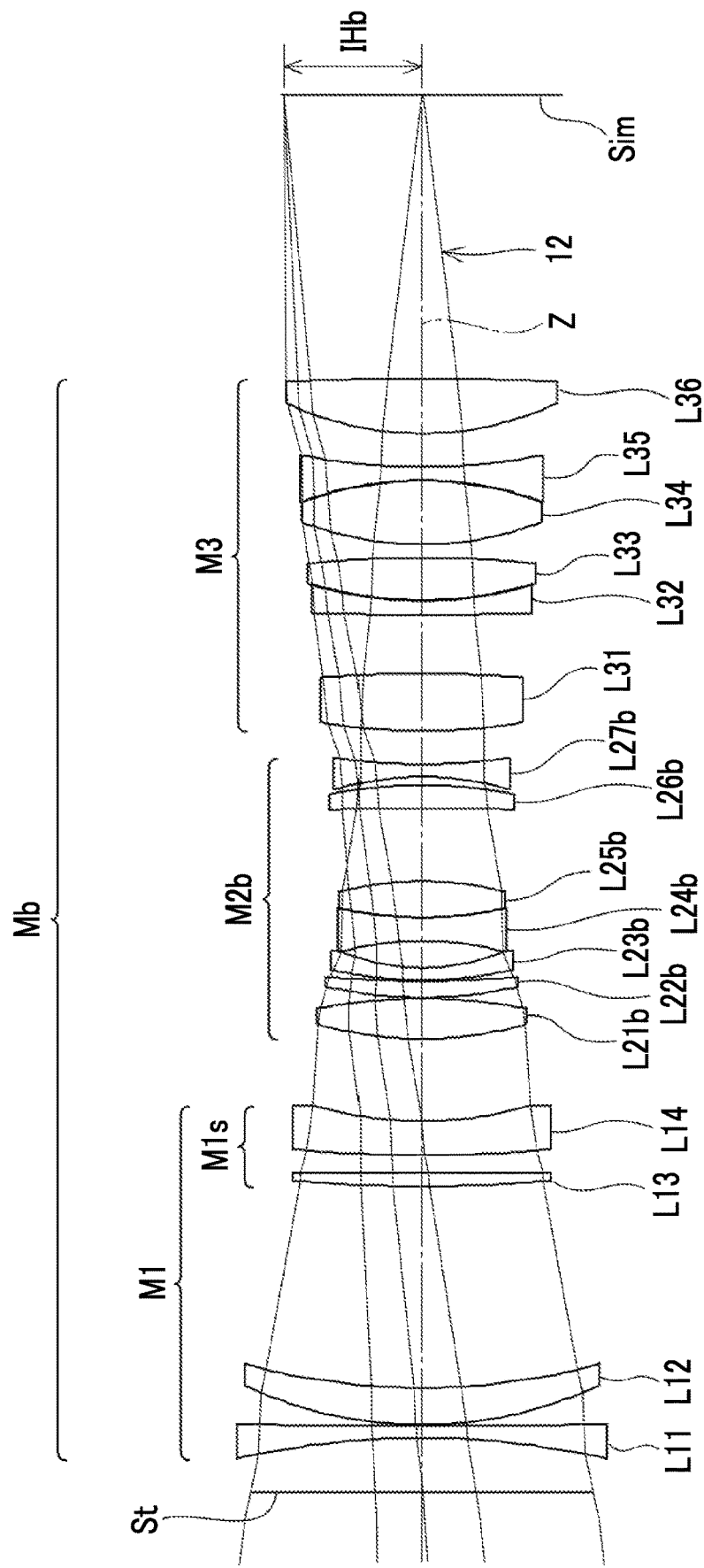
FIG. 5 is a diagram showing a configuration and luminous flux of an imaging part of the zoom lens according to Example 1b.

FIG. 5 shows an enlarged view of the aperture stop St and the imaging part Mb at the wide angle end of the zoom lens of FIG. 4. FIG. 5 shows, as the luminous flux, the on-axis luminous flux 12 and the luminous flux with the maximum image height IHb. The M1 lens group M1 and the M3 lens group M3 in FIG. 5 are common to those in FIG. 3. The M2b lens group M2b in FIG. 5 is different from the M2a lens group M2a in FIG. 3. For example, the M2b lens group M2b in FIG. 5 consists of, in order from the object side to the image side, seven lenses L21$b$ to L27$b$.

The M2b lens group M2b in FIG. 5 includes a cemented lens. Since the M2b lens group M2b includes the cemented lens, there is an advantage in correcting longitudinal chromatic aberration on the wide angle side, and it is possible to reduce a light reflective surface as compared with a case where the same total number of lenses is not used as the cemented lens. As a result, there is an advantage in achieving reduction in stray light.

It is preferable that the M1 lens group M1 includes a vibration-proof group M1s that moves in a direction intersecting with the optical axis Z during image blur correction. In such a case, it is preferable that the vibration-proof group M1s is disposed closest to the image side in the M1 lens group M1. Since the vibration-proof group M1s is located closest to the image side in the M1 lens group M1, the angle of the ray incident on the vibration-proof group M1s with respect to the optical axis Z can be reduced. As a result, there is an advantage in achieving reduction in size. For example, in the example of FIGS. 3 and 5, the vibration-proof group M1s consists of a lens L13 and a lens L14. An up-down arrow on the vibration-proof group M1s in FIG. 1 indicates that the vibration-proof group M1s moves in a direction intersecting with the optical axis Z during image blur correction. In the example of FIG. 1, during image blur correction, groups other than the vibration-proof group M1s and the aperture stop St remain stationary with respect to the image plane Sim.

It is preferable that the focusing part F has a positive refractive power as a whole. By setting the group closest to the object side as the group that has a positive refractive power, the total length of the lens system can be shortened. As a result, there is an advantage in achieving reduction in size.

For example, the focusing part F in the example of FIG. 1 consists of, in order from the object side to the image side, an F1 lens group F1, an F2 lens group F2, and an F3 lens group F3. The F2 lens group F2 and the F3 lens group F3 in FIG. 1 are focusing lens groups, and the floating focus method is adopted in the example of FIG. 1. In the example of FIG. 1, during focusing, the F1 lens group F1 remains stationary with respect to the image plane Sim, and the F2 lens group F2 and the F3 lens group F3 move along the optical axis Z by changing the mutual spacing. The double left-right arrows below the F2 lens group F2 and the F3 lens group F3 in FIG. 1 indicate that the lens groups move along the optical axis Z during focusing. In the example of FIG. 1, during focusing, groups other than the two focusing lens groups and the aperture stop St remain stationary with respect to the image plane Sim.

The first lens, which is a lens closest to the object side in the focusing part F, may be configured to be a negative lens, and the second lens, which is the second lens of the focusing part F from the object side, may be configured to be a positive lens. In such a case, there is an advantage in correcting chromatic aberration.

For example, the variable magnification part V in the example of FIG. 1 consists of, in order from the object side to the image side, a V1 lens group V1 that has a negative refractive power and moves during magnification change, a V2 lens group V2 that has a positive refractive power and moves during magnification change, and a V3 lens group V3 that has a positive refractive power and moves during magnification change. During magnification change, a spacing between the V1 lens group V1 and the V2 lens group V2 changes, and a spacing between the V2 lens group V2 and the V3 lens group V3 changes. According to such a configuration, a main magnification change is performed by the V1 lens group V1 that has a negative refractive power, and a change in the image plane position caused by the magnification change can be corrected by the two groups including the V2 lens group V2 and the V3 lens group V3. Since it is possible to adopt a floating method in which the above-mentioned two groups move relatively, it is possible to satisfactorily correct fluctuation in spherical aberration during magnification change as well as correction of fluctuation in field curvature during magnification change.

The V1 lens group V1, the V2 lens group V2, and the V3 lens group V3 in the example of FIG. 1 are variable magnification lens groups. In FIG. 1, a movement trajectory of each lens group during magnification change from the wide angle end to the telephoto end is schematically indicated by the arrow below each of the three lens groups. In the example of FIG. 1, during magnification change, groups other than the three variable magnification lens groups and the aperture stop St remain stationary with respect to the image plane Sim.

Next, preferable configurations about the conditional expressions of the zoom lens according to the embodiment of the present disclosure will be described. In the following description of conditional expressions, in order to avoid redundant descriptions, the same symbols are used for those having the same definition, and some duplicate descriptions of the symbols will not be repeated. Further, in the following description, the term "zoom lens according to the embodiment of the present disclosure" is also simply referred to as a "zoom lens" in order to avoid redundant description.

It is preferable that the zoom lens satisfies Conditional Expression (1). Here, it is assumed that a focal length of the whole system in a state where the infinite distance object is in focus at the telephoto end in the first state is fta. It is assumed that a maximum half angle of view in a state where the infinite distance object is in focus at the telephoto end in the first state is ωta. It is assumed that a focal length of the whole system in a state where the infinite distance object is in focus at the telephoto end in the second state is ftb. It is assumed that a maximum half angle of view in a state where the infinite distance object is in focus at the telephoto end in the second state is ωtb. The tan is a tangent. For example, FIG. 2 shows the maximum half angle of view ωta, and FIG. 4 shows the maximum half angle of view ωtb. In the zoom lens according to the embodiment of the present disclosure, ftb>fta since the focal length of the whole system changes to the long focal length side by switching from the first state to the second state. Further, in a lens system as disclosed in the embodiment of the present disclosure, assuming that the focal length thereof is f and the maximum half angle of view is ω, an approximate image height can be represented by f×tan ω. From the facts, by not allowing the image size to be equal to or less than the lower limit of Conditional Expression (1), it is possible to increase the image size while suppressing fluctuation in angle of view in the second state as compared with the first state. For example, FIGS. 2 and 3 show the maximum image height IHa in the first state, and FIGS. 4 and 5 show the maximum image height IHb in the second state. The maximum image height IHb is greater than the maximum image height IHa. By not allowing the result of Conditional Expression (1) to be equal to or greater than the upper limit thereof, it is easy to suppress various aberrations in the first state and various aberrations in the second state at the same time. In order to obtain more favorable characteristics, it is more preferable that the zoom lens satisfies Conditional Expression (1-1), it is yet more preferable that the zoom lens satisfies Conditional Expression (1-2), and it is most preferable that the zoom lens satisfies Conditional Expression (1-3).

$$1.35 < (f t b \times \tan \omega t b)/(f t a \times \tan \omega t a) < 1.65 \qquad (1)$$

$$1.375 < (f t b \times \tan \omega t b)/(f t a \times \tan \omega t a) < 1.6 \qquad (1\text{-}1)$$

$$1.4 < (f t b \times \tan \omega t b)/(f t a \times \tan \omega t a) < 1.55 \qquad (1\text{-}2)$$

$$1.425 < (f t b \times \tan \omega t b)/(f t a \times \tan \omega t a) < 1.5 \qquad (1\text{-}3)$$

It is preferable that the zoom lens satisfies Conditional Expressions (2) and (3) at the same time. Here, it is assumed that a focal length of the imaging part Ma in the first state is fMa. It is assumed that a focal length of the M2a lens group M2a is fM2a. It is assumed that a focal length of the imaging part Mb in the second state is fMb. It is assumed that a focal length of the M2b lens group M2b is fM2b. By simultaneously satisfying Conditional Expressions (2) and (3), it is easy to suppress various aberrations in the first state and various aberrations in the second state, at the same time. In order to obtain more favorable characteristics, it is yet more preferable that the zoom lens satisfies Conditional Expressions (2), and (3) at the same time, and then satisfies at least one of Conditional Expressions (2-1), (2-2), (2-3), (3-1), (3-2), or (3-3).

$$0 < |fMa/fM2a| < 4 \qquad (2)$$

$$0.025 < |fMa/fM2a| < 3.5 \qquad (2\text{-}1)$$

$$0.05 < |fMa/fM2a| < 3 \qquad (2\text{-}2)$$

$$0.075 < |fMa/fM2a| < 2.5 \qquad (2\text{-}3)$$

$$0 < |fMb/fM2b| < 7 \qquad (3)$$

$$0.05 < |fMb/fM2b| < 6.5 \qquad (3\text{-}1)$$

$$0.1 < |fMb/fM2b| < 6 \qquad (3\text{-}2)$$

$$0.15 < |fMb/fM2b| < 5.5 \qquad (3\text{-}3)$$

It is preferable that the zoom lens satisfies Conditional Expression (4). By not allowing the corresponding value of Conditional Expression (4) to be equal to or less than the lower limit thereof, it is possible to obtain an angle of view, which is approximate to that of the angle of view in the first state, in the second state. As described in the description of Conditional Expression (1), in a lens system as disclosed in the present disclosure, assuming that the focal length is f and the maximum half angle of view is ω, the approximate image height can be represented by f×tan ω. Therefore, by not allowing the corresponding value of Conditional Expression (4) from being equal to or less than the lower limit thereof, the image size can be increased while ensuring a similar angle of view in the second state as compared with the first state. Further, by not allowing the corresponding value of Conditional Expression (4) to be equal to or greater than the upper limit thereof, it is easy to suppress various aberrations in the first state and various aberrations in the second state at the same time. In order to obtain more favorable characteristics, it is more preferable that the zoom lens satisfies Conditional Expression (4-1), it is yet more preferable that the zoom lens satisfies Conditional Expression (4-2), and it is most preferable that the zoom lens satisfies Conditional Expression (4-3).

$$0.875 < \omega t b/\omega t a < 1.125 \qquad (4)$$

$$0.9 < \omega t b/\omega t a < 1.1 \qquad (4\text{-}1)$$

$$0.925 < \omega t b/\omega t a < 1.075 \qquad (4\text{-}2)$$

$$0.95 < \omega t b/\omega t a < 1.05 \qquad (4\text{-}3)$$

It is preferable that the zoom lens satisfies Conditional Expression (5). Here, it is assumed that an effective diameter of the lens surface of the M3 lens group M3 closest to the object side in the second state is φM3F. It is assumed that an effective diameter of the lens surface of the M3 lens group M3 closest to the image side in the second state is φM3R. By not allowing the corresponding value of Conditional Expression (5) to be less than or equal to the lower limit thereof, it is easy to reduce the angle of incidence of the off-axis principal ray on the image plane Sim. As a result, there is an advantage in ensuring the amount of ambient light. By not allowing the corresponding value of Conditional Expression (5) to be equal to or greater than the upper limit thereof, it is possible to suppress an increase in length of the back focal length. As a result, it is easy to shorten the total length of the lens system. Thereby, in the second state as compared with the first state, it is easy to increase the image size and reduce the size while suppressing fluctuation in angle of view. In order to obtain more favorable characteristics, it is more preferable that the zoom lens satisfies Conditional Expression (5-1), it is yet more preferable that the zoom lens satisfies Conditional Expression (5-2), and it is most preferable that the zoom lens satisfies Conditional Expression (5-3).

$$0.5 < \varphi M3F/\varphi M3R < 0.95 \qquad (5)$$

$$0.525 < \varphi M3F/\varphi M3R < 0.925 \qquad (5\text{-}1)$$

$$0.55 < \varphi M3F/\varphi M3R < 0.9 \qquad (5\text{-}2)$$

$$0.575 < \varphi M3F/\varphi M3R < 0.85 \qquad (5\text{-}3)$$

In the present specification, twice the distance to the optical axis Z from the intersection between the lens surface and the ray passing through the outermost side among rays incident onto the lens surface from the object side and emitted to the image side is the "effective diameter" of the lens surface. The "outer side" here is the radial outside centered on the optical axis Z, that is, the side separated from the optical axis Z. It should be noted that the "ray passing through the outermost side" is determined in consideration of the entire zoom range.

Figure 6:
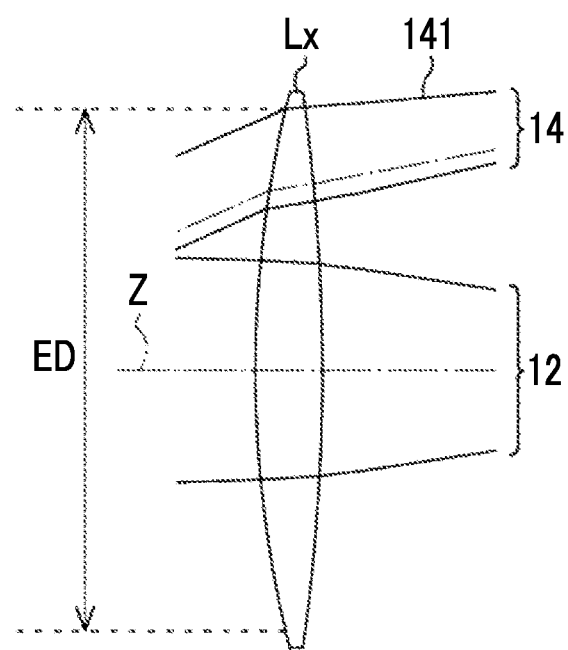
FIG. 6 is a diagram for explaining an effective diameter.

As an explanatory diagram, FIG. 6 shows an example of an effective diameter ED. In FIG. 6, the left side is the object side, and the right side is the image side. FIG. 6 shows an on-axis luminous flux 12 and an off-axis luminous flux 14 passing through a lens Lx. In the example of FIG. 6, a ray 141, which is the upper ray of the off-axis luminous flux 14, is the ray passing through the outermost side. Therefore, in the example of FIG. 6, twice the distance to the optical axis Z from the intersection between the ray 141 and the object side surface of the lens Lx is the effective diameter ED of the object side surface of the lens Lx. In FIG. 6, the upper ray of the off-axis luminous flux 14 is the ray passing through the outermost side, but which ray is the ray passing through the outermost side depends on the optical system.

It is preferable that the zoom lens satisfies Conditional Expression (6). Here, it is assumed that a maximum diameter of the on-axis luminous flux on a lens surface closest to the object side in the M2a lens group M2a is φM2aF. It is assumed that a maximum diameter of the on-axis luminous flux on a lens surface closest to the image side in the M2a lens group M2a is φM2aR. It is assumed that a maximum diameter of the on-axis luminous flux on a lens surface closest to the object side in the M2b lens group M2b is φM2bF. It is assumed that a maximum diameter of the on-axis luminous flux on a lens surface closest to the image side in the M2b lens group M2b is φM2bR. The above-mentioned "maximum diameter of the on-axis luminous flux" means a maximum diameter of the on-axis luminous flux in the entire magnification change range. By satisfying Conditional Expression (6), it is easy to suppress various aberrations in the first state and various aberrations in the second state at the same time. In order to obtain more favorable characteristics, it is more preferable that the zoom lens satisfies Conditional Expression (6-1), it is yet more preferable that the zoom lens satisfies Conditional Expression (6-2), and it is most preferable that the zoom lens satisfies Conditional Expression (6-3).

$$0.525<(\varphi M2bR/\varphi M2bF)/(\varphi M2aR/\varphi M2aF)<0.8 \quad (6)$$

$$0.55<(\varphi M2bR/\varphi M2bF)/(\varphi M2aR/\varphi M2aF)<0.775 \quad (6\text{-}1)$$

$$0.575<(\varphi M2bR/\varphi M2bF)/(\varphi M2aR/\varphi M2aF)<0.75 \quad (6\text{-}2)$$

$$0.6<(\varphi M2bR/\varphi M2bF)/(\varphi M2aR/\varphi M2aF)<0.725 \quad (6\text{-}3)$$

It is preferable that the zoom lens satisfies Conditional Expression (7) in a configuration including the vibration-proof group M1s. Here, it is assumed that a lateral magnification of the vibration-proof group M1s in a state where the infinite distance object is in focus is βs. It is assumed that a composite lateral magnification of the M2a lens group M2a and the M3 lens group M3 in a state where the infinite distance object is in focus in the first state is βM2a3. By not allowing the corresponding value of Conditional Expression (7) to be equal to or less than the lower limit thereof, the amount of movement of the vibration-proof group M1s during image blur correction can be suppressed. As a result, there is an advantage in achieving reduction in size. By not allowing the corresponding value of Conditional Expression (7) to be equal to or greater than the upper limit thereof, the amount of correction with respect to the amount of movement of the vibration-proof group M1s during image blur correction is prevented from becoming excessively large. As a result, it is easy to perform control. In order to obtain more favorable characteristics, it is more preferable that the zoom lens satisfies Conditional Expression (7-1), it is yet more preferable that the zoom lens satisfies Conditional Expression (7-2), and it is most preferable that the zoom lens satisfies Conditional Expression (7-3).

$$0.5<|(1-\beta s)\times\beta M2a3|<2.75 \quad (7)$$

$$0.55<|(1-\beta s)\times\beta M2a3|<2.25 \quad (7\text{-}1)$$

$$0.6<|(1-\beta s)\times\beta M2a3|<1.75 \quad (7\text{-}2)$$

$$0.65<|(1-\beta s)\times\beta M2a3|<1.25 \quad (7\text{-}3)$$

In a configuration in which the vibration-proof group M1s is disposed closest to the image side in the M1 lens group M1, it is preferable that the zoom lens satisfies Conditional Expression (8). Here, it is assumed that an effective diameter of the vibration-proof group M1s in the first state on the lens surface closest to the object side is φM1saF. It is assumed that an effective diameter of the lens surface of the M1 lens group M1 closest to the object side in the first state is φM1aF. By not allowing the corresponding value of Conditional Expression (8) to be equal to or less than the lower limit thereof, it is easy to reduce the angle of the ray incident on the vibration-proof group M1s with respect to the optical axis Z. As a result, there is an advantage in achieving reduction in size of the vibration-proof group M1s. By not allowing the corresponding value of Conditional Expression (8) to be equal to or greater than the upper limit thereof, the angle of the ray incident on the vibration-proof group M1s with respect to the optical axis Z is prevented from becoming excessively large. As a result, there is an advantage in correcting various aberrations. In order to obtain more favorable characteristics, it is more preferable that the zoom lens satisfies Conditional Expression (8-1), it is yet more preferable that the zoom lens satisfies Conditional Expression (8-2), and it is most preferable that the zoom lens satisfies Conditional Expression (8-3).

$$0.6<\varphi M1saF/\varphi M1aF<0.875 \quad (8)$$

$$0.625<\varphi M1saF/\varphi M1aF<0.85 \quad (8\text{-}1)$$

$$0.65<\varphi M1saF/\varphi M1aF<0.825 \quad (8\text{-}2)$$

$$0.675<\varphi M1saF/\varphi M1aF<0.8 \quad (8\text{-}3)$$

It is preferable that the zoom lens satisfies Conditional Expression (9). Here, it is assumed that a focal length of the whole system in a state where the infinite distance object is in focus at the wide angle end in the second state is fwb. It is assumed that a distance on the optical axis from the image plane Sim in a state where the infinite distance object is in focus at the wide angle end in the second state to a paraxial exit pupil position Pexwb is Dexwb. The sign of Dexwb is positive in a case of being a distance on the image side and is negative in a case of being a distance on the object side, with respect to the image plane Sim. Further, Dexwb is calculated using an air-equivalent distance for an optical member having no refractive power in a case where the optical member is disposed between the image plane Sim and the paraxial exit pupil position Pexwb. For example, FIG. 4 shows the paraxial exit pupil position Pexwb and the distance Dexwb in a state where the infinite distance object is in focus at the wide angle end. By not allowing the corresponding value of Conditional Expression (9) to be less than or equal to the lower limit thereof, it is easy to reduce the angle of incidence of the off-axis principal ray on the image plane Sim. As a result, there is an advantage in ensuring the amount of ambient light. By not allowing the corresponding value of Conditional Expression (9) to be equal to or greater than the upper limit thereof, the total length of the lens system can be easily shortened. As a result, there is an advantage in achieving reduction in size. In order to obtain more favorable characteristics, it is more preferable that the zoom lens satisfies Conditional Expression (9-1), it is yet more preferable that the zoom lens satisfies Conditional Expression (9-2), and it is most preferable that the zoom lens satisfies Conditional Expression (9-3).

$$-0.45 < fwb/Dexwb < -0.05 \quad (9)$$

$$-0.425 < fwb/Dexwb < -0.075 \quad (9\text{-}1)$$

$$-0.4 < fwb/Dexwb < -0.1 \quad (9\text{-}2)$$

$$-0.375 < fwb/Dexwb < -0.125 \quad (9\text{-}3)$$

It is preferable that the zoom lens satisfies Conditional Expression (10). Here, it is assumed that a sum of a back focal length of the whole system at an air-equivalent distance and a distance on an optical axis from a lens surface closest to the object side in the zoom lens to a lens surface closest to the image side in the zoom lens in a state where the infinite distance object is in focus at the telephoto end in the second state is TLtb. TLtb is defined as the total length of the lens system in a state where the infinite distance object is in focus at the telephoto end in the second state. For example, FIG. 4 shows the total length TLtb of the lens system. The tan is a tangent. By not allowing the corresponding value of Conditional Expression (10) to be equal to or less than the lower limit thereof, it is possible to gently converge the on-axis luminous flux toward the image plane Sim at the telephoto end, and thus to converge the on-axis luminous flux. As a result, it is easy to suppress longitudinal chromatic aberration that occurs. By not allowing the corresponding value of Conditional Expression (10) to be equal to or greater than the upper limit thereof, it is easy to reduce the total length of the lens system at the telephoto end. In order to obtain more favorable characteristics, it is more preferable that the zoom lens satisfies Conditional Expression (10-1), it is yet more preferable that the zoom lens satisfies Conditional Expression (10-2), and it is most preferable that the zoom lens satisfies Conditional Expression (10-3).

$$30 < TLtb/(ftb \times \tan \omega tb) < 39 \quad (10)$$

$$31 < TLtb/(ftb \times \tan \omega tb) < 38 \quad (10\text{-}1)$$

$$32 < TLtb/(ftb \times \tan \omega tb) < 37 \quad (10\text{-}2)$$

$$33 < TLtb/(ftb \times \tan \omega tb) < 36 \quad (10\text{-}3)$$

In a configuration in which the focusing part F has a positive refractive power as a whole, it is preferable that the zoom lens satisfies Conditional Expression (11). Here, it is assumed that a focal length of the focusing part F in a state where the infinite distance object is in focus is fF. It is assumed that a lens closest to the object side in the focusing part F is a first lens, and it is assumed that a focal length of the first lens is fL1. By not allowing the corresponding value of Conditional Expression (11) to be equal to or less than the lower limit thereof, the refractive power of the first lens is prevented from becoming excessively strong. Therefore, it is easy to suppress high-order aberrations at the telephoto end. Alternatively, since the refractive power of the focusing part F is prevented from becoming excessively weak, it is easy to reduce the size of the focusing part F. In addition, in the present specification, the term "high-order" relating to aberration means a fifth order or higher. By not allowing the corresponding value of Conditional Expression (11) to be equal to or greater than the upper limit thereof, the refractive power of the focusing part F is prevented from becoming excessively strong, and therefore the refractive power of the variable magnification part V is prevented from becoming excessively strong. As a result, it is easy to suppress fluctuation in aberrations during magnification change. In order to obtain more favorable characteristics, it is more preferable that the zoom lens satisfies Conditional Expression (11-1), it is yet more preferable that the zoom lens satisfies Conditional Expression (11-2), and it is most preferable that the zoom lens satisfies Conditional Expression (11-3).

$$-0.675 < fF/fL1 < -0.425 \quad (11)$$

$$-0.65 < fF/fL1 < -0.45 \quad (11\text{-}1)$$

$$-0.625 < fF/fL1 < -0.475 \quad (11\text{-}2)$$

$$-0.6 < fF/fL1 < -0.5 \quad (11\text{-}3)$$

Assuming that a refractive index of the first lens at the d line is NdL1, it is preferable that the zoom lens satisfies Conditional Expression (12). By not allowing the corresponding value of Conditional Expression (12) to be less than or equal to the lower limit thereof, the absolute value of the curvature radius of the first lens is prevented from becoming excessively small, and thus an increase in high-order spherical aberration at the telephoto end can be suppressed. As a result, there is an advantage in improving the performance. Alternatively, it is easy to reduce the size of the focusing part F. Regarding the upper limit of Conditional Expression (12), in general, in an optical material, as the refractive index increases, the specific gravity increases and the Abbe number decreases. Therefore, by not allowing the corresponding value of Conditional Expression (12) to be equal to or greater than the upper limit thereof, it is possible to suppress an increase in weight of the first lens having a large lens diameter. As a result, it is easy to achieve reduction in weight. Further, it is easy to correct lateral chromatic aberration at the wide angle end. In order to obtain more favorable characteristics, it is more preferable that the zoom lens satisfies Conditional Expression (12-1), it is yet more preferable that the zoom lens satisfies Conditional Expression (12-2), and it is most preferable that the zoom lens satisfies Conditional Expression (12-3).

$$1.72 < NdL1 < 1.92 \quad (12)$$

$$1.74 < NdL1 < 1.89 \quad (12\text{-}1)$$

$$1.78 < NdL1 < 1.86 \quad (12\text{-}2)$$

$$1.8 < NdL1 < 1.84 \quad (12\text{-}3)$$

Assuming that an Abbe number of the first lens based on the d line is vdL1, it is preferable that the zoom lens satisfies Conditional Expression (13). By not allowing the corresponding value of Conditional Expression (13) to be equal to or less than the lower limit thereof, it is possible to prevent longitudinal chromatic aberration at the telephoto end from being excessively corrected. By not allowing the corresponding value of Conditional Expression (13) to be equal to or greater than the upper limit thereof, it is possible to prevent longitudinal chromatic aberration at the telephoto end from being insufficiently corrected. In order to obtain more favorable characteristics, it is more preferable that the zoom lens satisfies Conditional Expression (13-1), it is yet more preferable that the zoom lens satisfies Conditional Expression (13-2), and it is most preferable that the zoom lens satisfies Conditional Expression (13-3).

$$34 < vdL1 < 57 \quad (13)$$

$$35.5 < vdL1 < 55 \quad (13\text{-}1)$$

$$37 < \nu dL1 < 49 \quad (13\text{-}2)$$

$$39 < \nu dL1 < 47 \quad (13\text{-}3)$$

Assuming that a partial dispersion ratio of the first lens between the g line and the F line is θgFL1, it is preferable that the zoom lens satisfies Conditional Expression (14). By not allowing the corresponding value of Conditional Expression (14) to be less than or equal to the lower limit thereof, it is easy to select a material having a small Abbe number at the d line. As a result, there is an advantage in suppressing first-order longitudinal chromatic aberration at the telephoto end. By not allowing the corresponding value of Conditional Expression (14) to be equal to or greater than the upper limit thereof, there is an advantage in suppressing second-order longitudinal chromatic aberration at the telephoto end. In order to obtain more favorable characteristics, it is more preferable that the zoom lens satisfies Conditional Expression (14-1), and it is yet more preferable that the zoom lens satisfies Conditional Expression (14-2).

$$0.55 < \theta gFL1 < 0.585 \quad (14)$$

$$0.555 < \theta gFL1 < 0.58 \quad (14\text{-}1)$$

$$0.56 < \theta gFL1 < 0.575 \quad (14\text{-}2)$$

It is preferable that the zoom lens satisfies Conditional Expressions (12), (13), and (14) at the same time. It is more preferable that the zoom lens satisfies Conditional Expressions (12), (13), and (14) at the same time and further satisfies at least one of Conditional Expression (12-1), (12-2), (12-3), (13-1), (13-2), (13-3), (14-1), or (14-2).

In a configuration in which the V1 lens group V1, which is the variable magnification lens group closest to the object side in the variable magnification part V, has a negative refractive power and moves during magnification change, it is preferable that the zoom lens satisfies Conditional Expression (15). Here, it is assumed that a focal length of the focusing part F in a state where the infinite distance object is in focus is fF. It is assumed that a focal length of the V1 lens group V1 is fV1. By not allowing the corresponding value of Conditional Expression (15) to be equal to or less than the lower limit thereof, the refractive power of the V1 lens group V1 is prevented from becoming excessively weak. As a result, it is easy to suppress the amount of movement of the V1 lens group V1 during magnification change. By not allowing the corresponding value of Conditional Expression (15) to be equal to or greater than the upper limit thereof, the refractive power of the focusing part F is prevented from becoming excessively weak. As a result, it is easy to suppress an increase in size of the focusing part F. In order to obtain more favorable characteristics, it is more preferable that the zoom lens satisfies Conditional Expression (15-1), it is yet more preferable that the zoom lens satisfies Conditional Expression (15-2), and it is most preferable that the zoom lens satisfies Conditional Expression (15-3).

$$4 < fF/(-fV1) < 9 \quad (15)$$

$$4.5 < fF/(-fV1) < 8.5 \quad (15\text{-}1)$$

$$5 < fF/(-fV1) < 8 \quad (15\text{-}2)$$

$$5.5 < fF/(-fV1) < 7.5 \quad (15\text{-}3)$$

In a configuration in which the V1 lens group V1, which is the variable magnification lens group closest to the object side in the variable magnification part V, has a negative refractive power and moves during magnification change, it is preferable that the zoom lens satisfies Conditional Expression (16). Here, it is assumed that a lateral magnification of the V1 lens group V1 in a state where the infinite distance object is in focus at the telephoto end is βV1t. It is assumed that a lateral magnification of the V1 lens group V1 in a state where the infinite distance object is in focus at the wide angle end is βV1w. By not allowing the corresponding value of Conditional Expression (16) to be equal to or less than the lower limit thereof, there is an advantage in achieving an increase in magnification change ratio. By not allowing the corresponding value of Conditional Expression (16) to be equal to or greater than the upper limit thereof, there is an advantage in suppressing fluctuation in aberrations during magnification change. In order to obtain more favorable characteristics, it is more preferable that the zoom lens satisfies Conditional Expression (16-1), it is yet more preferable that the zoom lens satisfies Conditional Expression (16-2), and it is most preferable that the zoom lens satisfies Conditional Expression (16-3).

$$7.5 < \beta V1t/\beta V1w < 12 \quad (16)$$

$$8 < \beta V1t/\beta V1w < 11.5 \quad (16\text{-}1)$$

$$8.5 < \beta V1t/\beta V1w < 11 \quad (16\text{-}2)$$

$$9 < \beta V1t/\beta V1w < 10.5 \quad (16\text{-}3)$$

It is preferable that the variable magnification part V consists of, in order from the object side to the image side, the V1 lens group V1 that has a negative refractive power, the V2 lens group V2 that has a positive refractive power, and the V3 lens group V3 that has a positive refractive power. In a configuration in which the V1 lens group V1, the V2 lens group V2, and the V3 lens group V3 move by changing the spacing between the adjacent groups during magnification change, it is preferable that the zoom lens satisfies Conditional Expression (17). Here, it is assumed that a focal length of the V1 lens group V1 is fV1. It is assumed that a composite focal length between the V2 lens group V2 and the V3 lens group V3 at the telephoto end is fV23t. By not allowing the corresponding value of Conditional Expression (17) to be equal to or less than the lower limit thereof, the refractive power of the V1 lens group V1 is prevented from becoming excessively strong. As a result, there is an advantage in suppressing fluctuations in various aberrations such as spherical aberration during magnification change. By not allowing the corresponding value of Conditional Expression (17) to be equal to or greater than the upper limit thereof, the combined refractive power of the V2 lens group V2 and the V3 lens group V3 is prevented from becoming excessively strong. As a result, there is an advantage in suppressing spherical aberration at the telephoto end. In order to obtain more favorable characteristics, it is more preferable that the zoom lens satisfies Conditional Expression (17-1), it is yet more preferable that the zoom lens satisfies Conditional Expression (17-2), and it is most preferable that the zoom lens satisfies Conditional Expression (17-3).

$$-0.45 < fV23t/fV1 < -0.225 \quad (17)$$

$$-0.425 < fV23t/fV1 < -0.25 \quad (17\text{-}1)$$

$$-0.4 < fV23t/fV1 < -0.275 \quad (17\text{-}2)$$

$$-0.375 < fV23t/fV1 < -0.3 \quad (17\text{-}3)$$

It is preferable that the zoom lens satisfies Conditional Expression (18). Here, it is assumed that an open F number in a state where the infinite distance object is in focus at the telephoto end in the first state is Fnota. It is assumed that a focal length of the whole system in a state where the infinite distance object is in focus at a wide angle end in the first state is fwa. By not allowing the corresponding value of Conditional Expression (18) to be equal to or less than the lower limit thereof, there is an advantage in achieving reduction in size of the whole lens system. Alternatively, it is easy to suppress various aberrations particularly at the telephoto end. By not allowing the corresponding value of Conditional Expression (18) to be equal to or greater than the upper limit thereof, it is easy to obtain a sufficiently bright image at the telephoto end. In order to obtain more favorable characteristics, it is more preferable that the zoom lens satisfies Conditional Expression (18-1), it is yet more preferable that the zoom lens satisfies Conditional Expression (18-2), and it is most preferable that the zoom lens satisfies Conditional Expression (18-3).

$$0.11 < Fnota/(fta/fwa) < 0.15 \quad (18)$$

$$0.115 < Fnota/(fta/fwa) < 0.145 \quad (18\text{-}1)$$

$$0.12 < Fnota/(fta/fwa) < 0.14 \quad (18\text{-}2)$$

$$0.125 < Fnota/(fta/fwa) < 0.135 \quad (18\text{-}3)$$

It is preferable that the zoom lens satisfies Conditional Expression (19). By not allowing the corresponding value of Conditional Expression (19) to be equal to or less than the lower limit thereof, it is easy to suppress various aberrations at the telephoto end. By not allowing the corresponding value of Conditional Expression (19) to be equal to or greater than the upper limit thereof, it is easy to reduce the total length of the lens system at the telephoto end. In order to obtain more favorable characteristics, it is more preferable that the zoom lens satisfies Conditional Expression (19-1), it is yet more preferable that the zoom lens satisfies Conditional Expression (19-2), and it is most preferable that the zoom lens satisfies Conditional Expression (19-3).

$$0.4 < TLtb/ftb < 0.6 \quad (19)$$

$$0.425 < TLtb/ftb < 0.575 \quad (19\text{-}1)$$

$$0.45 < TLtb/ftb < 0.55 \quad (19\text{-}2)$$

$$0.45 < TLtb/ftb < 0.525 \quad (19\text{-}3)$$

The example shown in FIG. 1 is an example, and various modifications can be made without departing from the scope of the technique according to the embodiment of the present disclosure. For example, the number of focusing lens groups included in the focusing part F, the number of variable magnification lens groups included in the variable magnification part V, and the number of lenses included in each lens group may be different from the number in the example of FIG. 1.

For example, the variable magnification part V consists of, in order from the object side to the image side, a lens group that has a negative refractive power, a lens group that has a negative refractive power, a lens group that has a positive refractive power, and a lens group that has a positive refractive power. The four lens groups may be configured to move by changing the spacing between the adjacent groups during magnification change. Alternatively, the variable magnification part V consists of, in order from the object side to the image side, a lens group that has a negative refractive power, a lens group that has a positive refractive power, a lens group that has a positive refractive power, and a lens group that has a positive refractive power. The four lens groups may be configured to move by changing the spacing between the adjacent groups during magnification change. The configuration in which the variable magnification part V consists of the four lens groups as described above is advantageous for improving optical performance.

The M2b lens group M2b may be configured to include two cemented lenses. In such a case, there is an advantage in correcting longitudinal chromatic aberration on the wide angle side, and it is possible to reduce a light reflective surface as compared with a case where the same total number of lenses is not used as the cemented lens. As a result, there is an advantage in achieving reduction in stray light. In a case where the M2b lens group M2b includes two cemented lenses, one of the two cemented lenses may be configured to be a three-element cemented lens. In such a case, there is an advantage in correcting longitudinal chromatic aberration on the wide angle side, and it is possible to reduce a light reflective surface as compared with a case where the same total number of lenses is not used as the cemented lens. As a result, there is an advantage in achieving reduction in stray light.

The above-mentioned preferred configurations and available configurations may be optional combinations, and it is preferable to selectively adopt the configurations in accordance with required specification. It should be noted that conditional expressions that the zoom lens according to the embodiment of the present disclosure preferably satisfies are not limited to the conditional expressions described in the form of Expression, and the lower limit and the upper limit are selected from the preferable, more preferable, yet more preferable, and most preferable conditional expressions. The conditional expressions include all conditional expressions obtained through optional combinations.

For example, according to the preferred first aspect of the present disclosure, a zoom lens comprises, in order from the object side to the image side: a focusing part F that includes a focusing lens group moving during focusing and remains stationary with respect to an image plane Sim during magnification change; a variable magnification part V that includes at least two variable magnification lens groups of which spacings from adjacent groups change during magnification change; an aperture stop St; and an imaging part that remains stationary with respect to the image plane Sim during magnification change. The zoom lens is switchable between a first state and a second state by replacing a part of the imaging part that is provided to be replaceable, in the first state, the imaging part Ma consists of, in order from the object side to the image side, an M1 lens group M1, a replaceable M2a lens group M2a, and an M3 lens group M3, in the second state, the imaging part Mb consists of, in order from the object side to the image side, the M1 lens group M1, the replaceable M2b lens group M2b, and the M3 lens group M3, and in response to switching from the first state to the second state, a focal length of the whole system changes to a long focal length side while keeping an image formation position constant. The zoom lens satisfies Conditional Expressions (1), (2), and (3).

According to the preferred second aspect of the present disclosure, a zoom lens comprises, in order from an object side to an image side: a focusing part F that includes a focusing lens group moving during focusing and remains stationary with respect to an image plane Sim during magnification change; a variable magnification part V that includes at least two variable magnification lens groups of which spacings from adjacent groups change during magnification change; an aperture stop St; and an imaging part that remains stationary with respect to the image plane Sim during magnification change. The zoom lens is switchable between a first state and a second state by replacing a part of the imaging part that is provided to be replaceable, in the first state, the imaging part Ma consists of, in order from the object side to the image side, an M1 lens group M1, a replaceable M2a lens group M2a, and an M3 lens group M3, in the second state, the imaging part Mb consists of, in order from the object side to the image side, the M1 lens group M1, the replaceable M2b lens group M2b, and the M3 lens group M3, and in response to switching from the first state to the second state, a focal length of a whole system changes to a long focal length side while keeping an image formation position constant. The zoom lens satisfies Conditional Expressions (2), (3), and (4).

According to the preferred third aspect of the present disclosure, a zoom lens comprises, in order from an object side to an image side: a focusing part F that includes a focusing lens group moving during focusing and remains stationary with respect to an image plane Sim during magnification change; a variable magnification part V that includes at least two variable magnification lens groups of which spacings from adjacent groups change during magnification change; an aperture stop St; and an imaging part that remains stationary with respect to the image plane Sim during magnification change. The zoom lens is switchable between a first state and a second state by replacing a part of the imaging part that is provided to be replaceable, in the first state, the imaging part Ma consists of, in order from the object side to the image side, an M1 lens group M1, a replaceable M2a lens group M2a, and an M3 lens group M3, in the second state, the imaging part Mb consists of, in order from the object side to the image side, the M1 lens group M1, the replaceable M2b lens group M2b, and the M3 lens group M3, and in response to switching from the first state to the second state, a focal length of a whole system changes to a long focal length side while keeping an image formation position constant. The zoom lens satisfies Conditional Expressions (2), (3), and (5).

Next, examples of the zoom lens according to the embodiment of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Hereinafter, the zoom lens in the first state and the zoom lens in the second state according to Example 1 are referred to as a zoom lens according to Example 1a and a zoom lens according to Example 1b, respectively. The same applies to the other examples. The zoom lens in the first state and the zoom lens in the second state according to Example 2 are a zoom lens according to Example 2a and a zoom lens according to Example 2b, respectively. The zoom lens in the first state and the zoom lens in the second state according to Example 3 are a zoom lens according to Example 3a and a zoom lens according to Example 3b, respectively. The zoom lens in the first state and the zoom lens in the second state according to Example 4 are a zoom lens according to Example 4a and a zoom lens according to Example 4b, respectively. The zoom lens in the first state and the zoom lens in the second state according to Example 5 are a zoom lens according to Example 5a and a zoom lens according to Example 5b, respectively. The zoom lens in the first state and the zoom lens in the second state according to Example 6 are a zoom lens according to Example 6a and a zoom lens according to Example 6b, respectively.

Example 1a

FIGS. 1 to 3 each show a configuration and movement loci of a zoom lens according to Example 1a, and an illustration method and a configuration thereof are as described above. Therefore, some description is not repeated herein. The zoom lens according to Example 1a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. The variable magnification part V consists of, in order from the object side to the image side, a V1 lens group V1 that has a negative refractive power, a V2 lens group V2 that has a positive refractive power, and a V3 lens group V3 that has a positive refractive power. The imaging part Ma consists of, in order from the object side to the image side, an M1 lens group M1, an M2a lens group M2a, and an M3 lens group M3. The M1 lens group M1 includes the vibration-proof group M1s closest to the image side.

The M2a lens group M2a is replaceable with the M2b lens group M2b according to Example 1b.

Regarding the zoom lens according to Example 1a, Tables 1-1 and 1-2 show basic lens data, Table 2 shows specifications and variable surface spacings, and Table 3 shows aspherical coefficients thereof. Here, the basic lens data is shown to be divided into two tables, Tables 1-1 and 1-2, in order to avoid lengthening of one table. Table 1-1 shows the focusing part F, the variable magnification part V, and the aperture stop St. Table 1-2 shows the imaging part Ma.

The table of basic lens data will be described as follows. The Sn column shows surface numbers in a case where the surface closest to the object side is the first surface and the number is increased one by one toward the image side. The R column shows a curvature radius of each surface. The D column shows a surface spacing between each surface and the surface adjacent to the image side on the optical axis. The Nd column shows a refractive index of each constituent element at the d line. The vd column shows an Abbe number of each constituent element based on the d line. The θgF column shows a partial dispersion ratio of each constituent element between the g line and the F line. The ED column shows an effective diameter of each surface. The MDA column shows a maximum diameter of the on-axis luminous flux of the lens surface used in Conditional Expression (6).

In the table of the basic lens data, the sign of the curvature radius of the convex surface facing toward the object side is positive, and the sign of the curvature radius of the convex surface facing toward the image side is negative. A value at the bottom cell of the column of surface spacing in the table indicates a spacing between the image plane Sim and the surface closest to the image side in Table 1-2. The symbol DD[ ] is used for each variable surface spacing during magnification change, and the object side surface number of the spacing is given in [ ] and is noted in the column of surface spacing. In Table 1-1, columns labeled "F", "V", and "St" are attached to the left sides of the surface numbers respectively corresponding to the focusing part F, the variable magnification part V, and the aperture stop St. In Table 1-2, columns "M1", "M2a", and "M3" are attached to the left sides of the surface numbers respectively corresponding to the M1 lens group M1, the M2a lens group M2a, and the M3 lens group M3. The 36th to 39th surfaces of Table 1-2 correspond to the vibration-proof group M1s.

Table 2 shows the magnification change ratio Zr, the focal length f, the back focal length Bf, the open F number FNo., the maximum total angle of view 2ω, and the variable surface spacing during magnification change, based on the d line. The magnification change ratio is synonymous with the zoom magnification. [°] in the cells of 2ω indicates that the unit thereof is a degree. In Table 2, the column labeled "Wide" shows values in the wide angle end state, the column labeled "Middle" shows values in the middle focal length state, and the column labeled "Tele" shows values in the telephoto end state.

In basic lens data, a reference sign * is attached to surface numbers of aspherical surfaces, and values of the paraxial curvature radius are written into the column of the curvature radius of the aspherical surface. In Table 3, the Sn row shows surface numbers of the aspherical surfaces, and the KA and Am rows show numerical values of the aspherical coefficients for each aspherical surface. It should be noted that m of Am is an integer of 3 or more, and differs depending on the surface. For example, in the eleventh surface of Example 1a, m=3, 4, 5, . . . , and 16. The "E±n" (n: an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

In the data of each table, degrees are used as a unit of an angle, and millimeters are used as a unit of a length, but appropriate different units may be used since the optical system can be used even in a case where the system is enlarged or reduced in proportion. Each of the following tables shows numerical values rounded off to predetermined decimal places.

TABLE 1-1

Example 1a

|  | Sn | R | D | Nd | vd | θgF | ED |
|---|---|---|---|---|---|---|---|
| F | 1 | 3541.5008 | 4.4000 | 1.80610 | 40.97 | 0.56882 | 212.00 |
|  | 2 | 331.2983 | 2.2778 |  |  |  | 201.99 |
|  | 3 | 338.1560 | 29.6404 | 1.43387 | 95.18 | 0.53733 | 201.50 |
|  | 4 | −595.8685 | 20.9000 |  |  |  | 201.65 |
|  | 5 | 317.5806 | 21.2502 | 1.43387 | 95.18 | 0.53733 | 197.00 |
|  | 6 | −2217.4805 | 0.1202 |  |  |  | 196.60 |
|  | 7 | 298.8273 | 18.8917 | 1.43387 | 95.18 | 0.53733 | 192.77 |
|  | 8 | −9727.3375 | 2.0400 |  |  |  | 191.91 |
|  | 9 | 159.7808 | 13.8345 | 1.43700 | 95.10 | 0.53364 | 176.98 |
|  | 10 | 258.4761 | DD[10] |  |  |  | 175.20 |
| V | *11 | 860.5308 | 1.8002 | 2.00069 | 25.46 | 0.61364 | 64.37 |
|  | 12 | 67.2560 | 9.7502 |  |  |  | 57.50 |
|  | 13 | −127.1006 | 3.9225 | 1.82522 | 46.67 | 0.55684 | 57.49 |
|  | 14 | 173.3813 | 9.6664 |  |  |  | 55.57 |
|  | 15 | −106.3833 | 3.7816 | 1.59282 | 68.62 | 0.54414 | 55.17 |
|  | 16 | 394.6457 | 4.2902 | 1.82457 | 23.77 | 0.62004 | 56.30 |
|  | 17 | −314.5217 | 0.1215 |  |  |  | 56.50 |
|  | 18 | 268.7129 | 14.3948 | 1.81654 | 24.18 | 0.61923 | 58.29 |
|  | 19 | −69.2017 | 1.8202 | 1.79902 | 48.10 | 0.55220 | 59.70 |
|  | 20 | 754.7999 | DD[20] |  |  |  | 61.77 |
|  | 21 | 1988.3555 | 6.1012 | 1.49618 | 85.04 | 0.53763 | 79.85 |
|  | 22 | −197.2144 | 0.1200 |  |  |  | 79.96 |
|  | 23 | 1721.7175 | 9.8692 | 1.54124 | 76.54 | 0.53952 | 79.50 |
|  | 24 | −108.1353 | 1.8001 | 1.90132 | 37.87 | 0.57367 | 79.59 |
|  | 25 | −189.7037 | DD[25] |  |  |  | 80.52 |
|  | 26 | 259.1642 | 7.2250 | 1.43700 | 95.10 | 0.53364 | 80.00 |
|  | 27 | −354.4498 | 0.1207 |  |  |  | 79.99 |
|  | 28 | 154.4534 | 1.8000 | 1.93858 | 30.14 | 0.59773 | 79.18 |
|  | 29 | 94.1737 | 11.2311 | 1.55032 | 75.50 | 0.54001 | 77.63 |
|  | 30 | −769.3778 | DD[30] |  |  |  | 77.31 |
| St | 31 | ∞ | 8.0000 |  |  |  | 51.36 |

TABLE 1-2

Example 1a

|  | Sn | R | D | Nd | vd | θgF | ED | MDA |
|---|---|---|---|---|---|---|---|---|
| M1 | 32 | −124.3275 | 1.8026 | 1.71503 | 54.05 | 0.54618 | 48.99 |  |
|  | 33 | 1945.9620 | 0.1242 |  |  |  | 48.68 |  |
|  | 34 | 62.9903 | 5.4715 | 1.78658 | 26.03 | 0.61472 | 48.20 |  |
|  | 35 | 102.5044 | 29.7042 |  |  |  | 46.80 |  |
|  | 36 | 234.7724 | 1.8171 | 1.80501 | 40.82 | 0.57077 | 36.64 |  |
|  | 37 | 2277.1644 | 2.6432 |  |  |  | 36.33 |  |
|  | 38 | 223.3409 | 5.0198 | 1.89602 | 21.67 | 0.63407 | 34.76 |  |
|  | 39 | 58.1697 | 14.0463 |  |  |  | 32.59 |  |
| M2a | 40 | −557.5314 | 3.1454 | 1.61128 | 60.72 | 0.54295 | 31.50 | 31.10 |
|  | 41 | −61.3213 | 0.1243 |  |  |  | 31.45 |  |
|  | 42 | 93.3614 | 2.6776 | 1.92053 | 19.77 | 0.64430 | 30.10 |  |
|  | 43 | −325.0210 | 0.1200 |  |  |  | 29.69 |  |
|  | 44 | 93.8598 | 1.8001 | 1.68580 | 54.24 | 0.54692 | 28.39 |  |
|  | 45 | 44.6783 | 3.9231 |  |  |  | 26.70 |  |
|  | 46 | −51.5085 | 1.8117 | 1.78376 | 46.18 | 0.55942 | 26.63 |  |
|  | 47 | 51.7612 | 8.6779 |  |  |  | 26.25 |  |
|  | 48 | 61.8493 | 5.5520 | 1.68415 | 40.99 | 0.57411 | 32.91 |  |
|  | 49 | −76.1456 | 0.3541 |  |  |  | 33.15 |  |
|  | 50 | 2596.3387 | 1.8149 | 1.70472 | 49.38 | 0.55528 | 33.08 |  |
|  | 51 | −296.8627 | 1.8810 |  |  |  | 33.05 |  |

TABLE 1-2-continued

Example 1a

| | Sn | R | D | Nd | vd | θgF | ED | MDA |
|---|---|---|---|---|---|---|---|---|
| | 52 | −113.6203 | 1.8128 | 1.83886 | 28.77 | 0.60442 | 32.92 | |
| | 53 | 102.6380 | 9.7502 | | | | 33.22 | 25.82 |
| M3 | 54 | 90.0364 | 8.4452 | 1.71772 | 29.58 | 0.60466 | 37.56 | |
| | 55 | −207.8317 | 8.8020 | | | | 37.87 | |
| | 56 | 2394.7506 | 2.0705 | 1.90001 | 37.60 | 0.57658 | 37.51 | |
| | 57 | 58.9078 | 6.3111 | 1.57699 | 68.16 | 0.54129 | 37.37 | |
| | 58 | −173.7528 | 1.9444 | | | | 37.61 | |
| | 59 | 50.6072 | 9.3508 | 1.55347 | 71.77 | 0.53990 | 37.88 | |
| | 60 | −52.9608 | 2.0518 | 1.91491 | 36.26 | 0.57997 | 37.30 | |
| | 61 | 97.8417 | 4.9127 | | | | 36.87 | |
| | 62 | 47.4788 | 7.9448 | 1.45569 | 65.84 | 0.52857 | 38.62 | |
| | *63 | −593.1281 | 41.9000 | | | | 38.21 | |

TABLE 2

Example 1a

| | Wide | Middle | Tele |
|---|---|---|---|
| Zr | 1.00 | 19.87 | 38.60 |
| f | 25.65 | 509.52 | 989.98 |
| Bf | 41.90 | 41.90 | 41.90 |
| FNo. | 2.85 | 3.27 | 5.12 |
| 2ω[°] | 60.00 | 3.20 | 1.66 |
| DD[10] | 5.19 | 156.72 | 164.17 |
| DD[20] | 271.34 | 49.94 | 3.86 |
| DD[25] | 21.99 | 9.80 | 2.58 |
| DD[30] | 3.60 | 85.66 | 131.51 |

TABLE 3

Example 1a

| Sn | 11 | 63 |
|---|---|---|
| KA | 1.0000000E+00 | 1.0000000E+00 |
| A3 | 0.0000000E+00 | 0.0000000E+00 |
| A4 | 1.2701233E−07 | −6.6890039E−07 |
| A5 | −8.5362964E−08 | −5.5470282E−08 |
| A6 | 2.1931019E−08 | 8.6799191E−08 |
| A7 | −2.8749756E−09 | −2.8894915E−08 |
| A8 | 2.0643840E−10 | 3.9529389E−09 |
| A9 | −7.2590463E−12 | −2.0534125E−10 |
| A10 | 2.0167883E−14 | −6.6548439E−12 |
| A11 | 6.5339439E−15 | 1.1828751E−12 |
| A12 | −7.1951167E−17 | −8.9480047E−15 |
| A13 | −8.9115165E−18 | −5.3354174E−15 |
| A14 | 3.7514660E−19 | 3.6366851E−16 |
| A15 | −5.9646059E−21 | −1.0090396E−17 |
| A16 | 3.5114960E−23 | 1.0677704E−19 |

Figure 7:
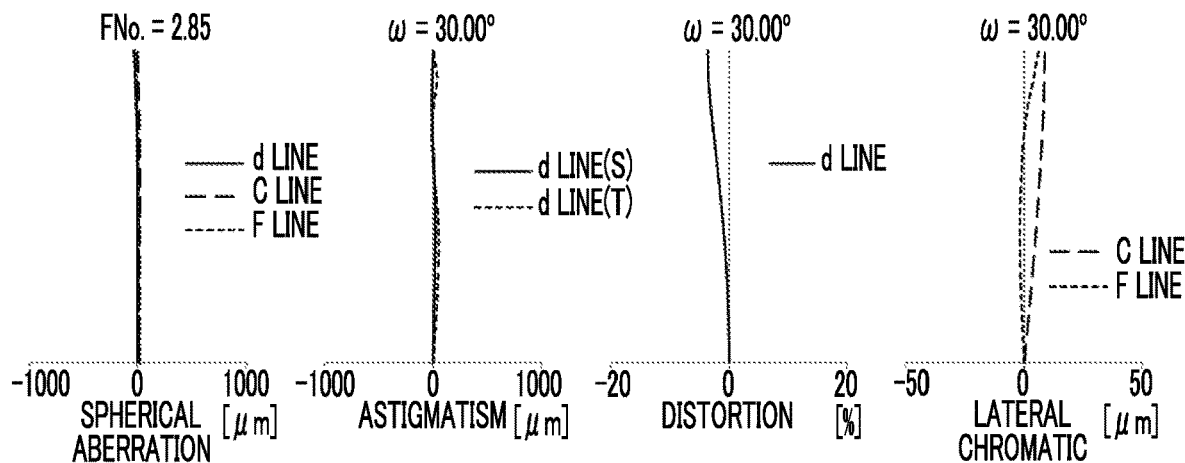
Figure 7:
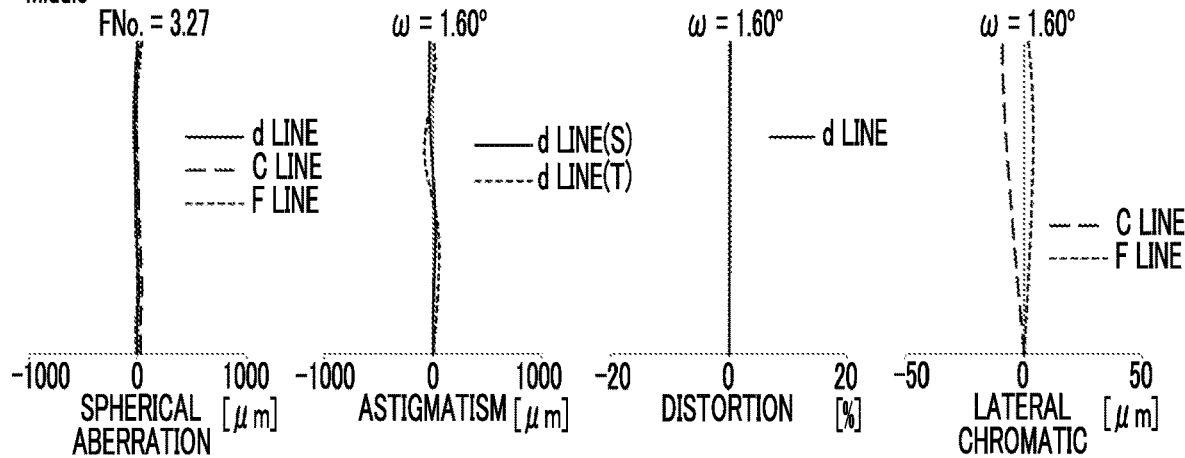
Figure 7:
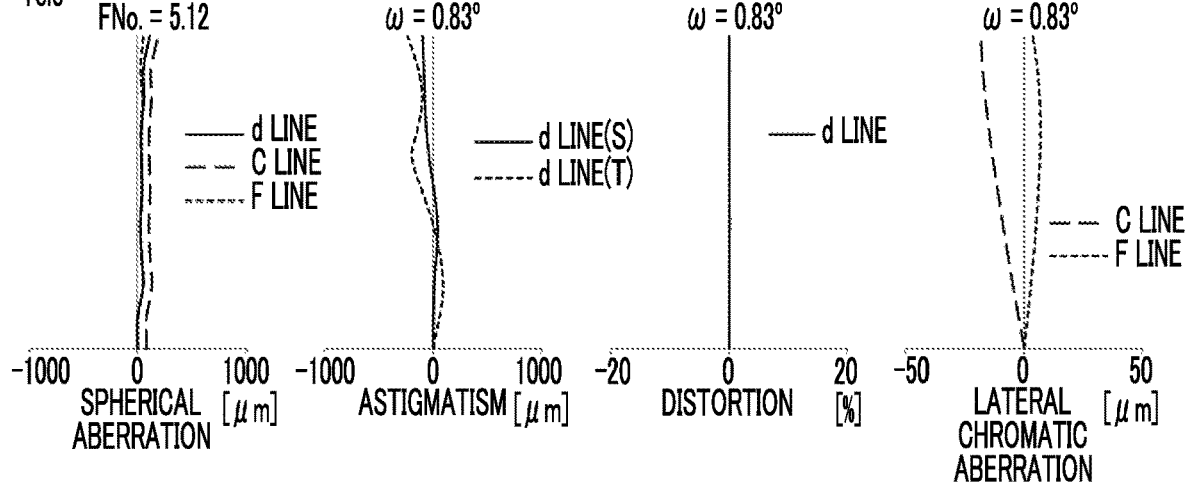

FIG. 7 is a diagram showing aberrations of the zoom lens according to Example 1a in a state where the infinite distance object is in focus. In FIG. 7, in order from the left side, spherical aberration, astigmatism, distortion, and lateral chromatic aberration are shown. In FIG. 7, the upper part labeled "Wide" shows aberrations in the wide angle end state, the middle part labeled "Middle" shows aberrations in the middle focal length state, and the lower part labeled "Tele" shows aberrations in the telephoto end state. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, and the F line are respectively indicated by the long broken line, and the short broken line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1a are basically similar to those in the following examples unless otherwise specified. Therefore, in the following description, repeated description will not be given.

Example 1b

FIGS. 1, 4, and 5 each show a configuration and movement loci of a zoom lens according to Example 1b, and an illustration method and a configuration thereof are as described above. Therefore, some description is not repeated herein. In the zoom lens according to Example 1b, the M2a lens group M2a of the zoom lens according to Example 1a is replaced with the M2b lens group M2b according to Example 1b. The focusing part F, the variable magnification part V, the aperture stop St, the M1 lens group M1, and the M3 lens group M3 of the zoom lens according to Example 1b are common to those of the zoom lens according to Example 1a.

Figure 8:
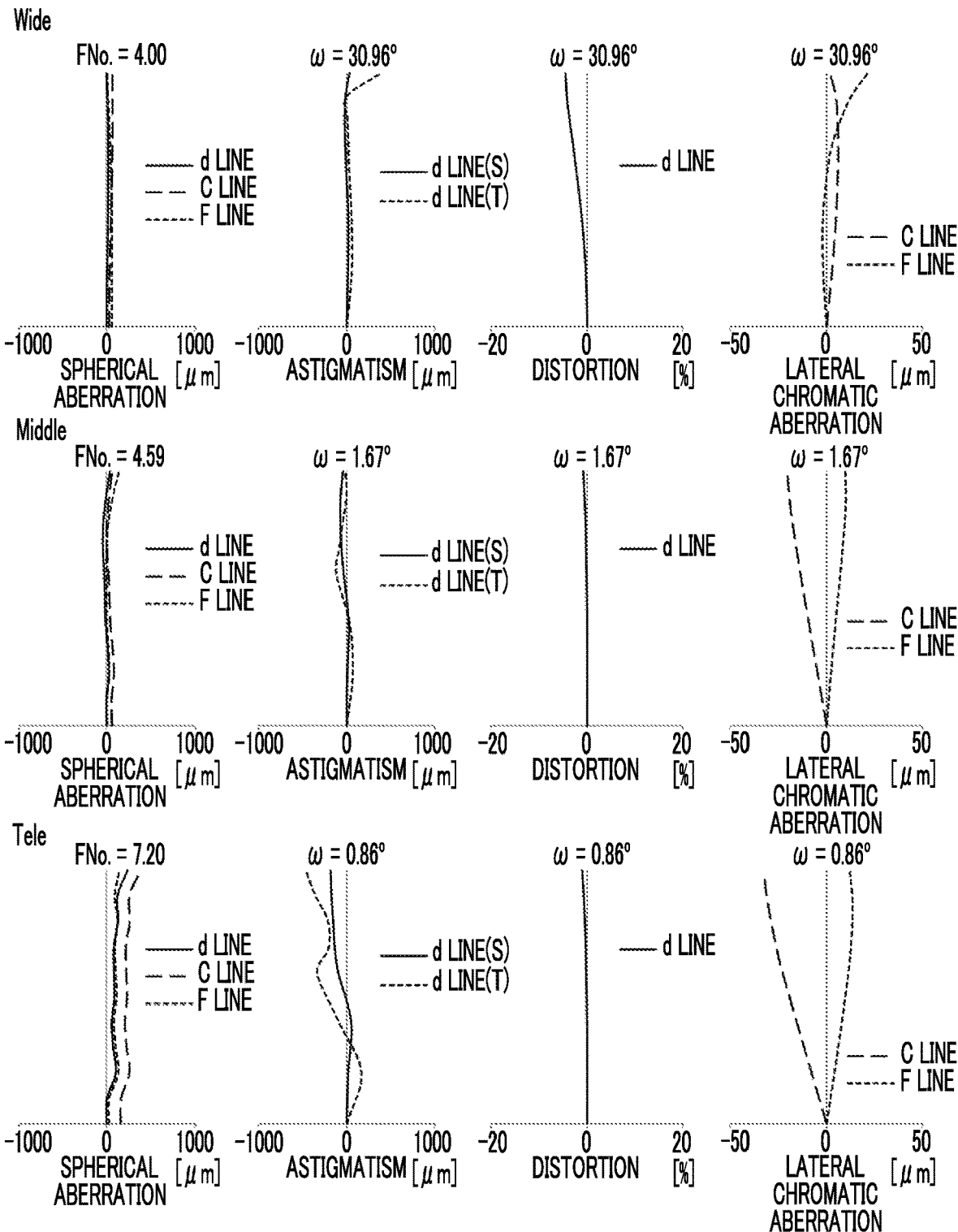
FIG. 8 is a diagram showing aberrations of the zoom lens according to Example 1b.

Regarding the zoom lens according to Example 1b, Tables 4-1 and 4-2 show basic lens data, Table 5 shows specifications and variable surface spacings, and Table 6 shows aspherical coefficients thereof. FIG. 8 shows aberration diagrams.

TABLE 4-1

Example 1b

| | Sn | R | D | Nd | vd | θgF | ED |
|---|---|---|---|---|---|---|---|
| F | 1 | 3541.5008 | 4.4000 | 1.80610 | 40.97 | 0.56882 | 212.00 |
| | 2 | 331.2983 | 2.2778 | | | | 201.99 |
| | 3 | 338.1560 | 29.6404 | 1.43387 | 95.18 | 0.53733 | 201.50 |
| | 4 | −595.8685 | 20.9000 | | | | 201.65 |
| | 5 | 317.5806 | 21.2502 | 1.43387 | 95.18 | 0.53733 | 197.00 |
| | 6 | −2217.4805 | 0.1202 | | | | 196.60 |
| | 7 | 298.8273 | 18.8917 | 1.43387 | 95.18 | 0.53733 | 192.77 |
| | 8 | −9727.3375 | 2.0400 | | | | 191.91 |
| | 9 | 159.7808 | 13.8345 | 1.43700 | 95.10 | 0.53364 | 176.98 |
| | 10 | 258.4761 | DD[10] | | | | 175.20 |
| V | *11 | 860.5308 | 1.8002 | 2.00069 | 25.46 | 0.61364 | 64.37 |
| | 12 | 67.2560 | 9.7502 | | | | 57.50 |
| | 13 | −127.1006 | 3.9225 | 1.82522 | 46.67 | 0.55684 | 57.49 |
| | 14 | 173.3813 | 9.6664 | | | | 55.57 |
| | 15 | −106.3833 | 3.7816 | 1.59282 | 68.62 | 0.54414 | 55.17 |

TABLE 4-1-continued

Example 1b

| Sn | R | D | Nd | vd | θgF | ED |
|---|---|---|---|---|---|---|
| 16 | 394.6457 | 4.2902 | 1.82457 | 23.77 | 0.62004 | 56.30 |
| 17 | −314.5217 | 0.1215 | | | | 56.50 |
| 18 | 268.7129 | 14.3948 | 1.81654 | 24.18 | 0.61923 | 58.29 |
| 19 | −69.2017 | 1.8202 | 1.79902 | 48.10 | 0.55220 | 59.70 |
| 20 | 754.7999 | DD[20] | | | | 61.77 |
| 21 | 1988.3555 | 6.1012 | 1.49618 | 85.04 | 0.53763 | 79.85 |
| 22 | −197.2144 | 0.1200 | | | | 79.96 |
| 23 | 1721.7175 | 9.8692 | 1.54124 | 76.54 | 0.53952 | 79.50 |
| 24 | −108.1353 | 1.8001 | 1.90132 | 37.87 | 0.57367 | 79.59 |
| 25 | −189.7037 | DD[25] | | | | 80.52 |
| 26 | 259.1642 | 7.2250 | 1.43700 | 95.10 | 0.53364 | 80.00 |
| 27 | −354.4498 | 0.1207 | | | | 79.99 |
| 28 | 154.4534 | 1.8000 | 1.93858 | 30.14 | 0.59773 | 79.18 |
| 29 | 94.1737 | 11.2311 | 1.55032 | 75.50 | 0.54001 | 77.63 |
| 30 | −769.3778 | DD[30] | | | | 77.31 |
| St 31 | ∞ | 8.0000 | | | | 51.36 |

TABLE 6

Example 1b

| Sn | 11 | 62 |
|---|---|---|
| KA | 1.0000000E+00 | 1.0000000E+00 |
| A3 | 0.0000000E+00 | 0.0000000E+00 |
| A4 | 1.2701233E−07 | −6.6890039E−07 |
| A5 | −8.5362964E−08 | −5.5470282E−08 |
| A6 | 2.1931019E−08 | 8.6799191E−08 |
| A7 | −2.8749756E−09 | −2.8894915E−08 |
| A8 | 2.0643840E−10 | 3.9529389E−09 |
| A9 | −7.2590463E−12 | −2.0534125E−10 |
| A10 | 2.0167883E−14 | −6.6548439E−12 |
| A11 | 6.5339439E−15 | 1.1828751E−12 |
| A12 | −7.1951167E−17 | −8.9480047E−15 |
| A13 | −8.9115165E−18 | −5.3354174E−15 |
| A14 | 3.7514660E−19 | 3.6366851E−16 |
| A15 | −5.9646059E−21 | −1.0090396E−17 |
| A16 | 3.5114960E−23 | 1.0677704E−19 |

TABLE 4-2

Example 1b

| | Sn | R | D | Nd | vd | θgF | ED | MDA |
|---|---|---|---|---|---|---|---|---|
| M1 | 32 | −124.3275 | 1.8026 | 1.71503 | 54.05 | 0.54618 | 48.99 | |
| | 33 | 1945.9620 | 0.1242 | | | | 48.68 | |
| | 34 | 62.9903 | 5.4715 | 1.78658 | 26.03 | 0.61472 | 48.20 | |
| | 35 | 102.5044 | 29.7042 | | | | 46.80 | |
| | 36 | 234.7724 | 1.8171 | 1.80501 | 40.82 | 0.57077 | 36.65 | |
| | 37 | 2277.1644 | 2.6432 | | | | 36.33 | |
| | 38 | 223.3409 | 5.0198 | 1.89602 | 21.67 | 0.63407 | 34.77 | |
| | 39 | 58.1697 | 12.1988 | | | | 32.60 | |
| M2b | 40 | 57.3360 | 5.8415 | 1.57808 | 53.78 | 0.55467 | 31.50 | 31.10 |
| | 41 | −83.8711 | 0.1234 | | | | 30.96 | |
| | 42 | 64.5323 | 2.4601 | 1.89389 | 20.39 | 0.63938 | 28.88 | |
| | 43 | 178.1418 | 0.1285 | | | | 28.12 | |
| | 44 | 63.0804 | 1.8144 | 1.75127 | 52.87 | 0.54696 | 27.12 | |
| | 45 | 31.7735 | 3.9685 | | | | 25.03 | |
| | 46 | −49.0552 | 3.4449 | 1.89101 | 37.12 | 0.57818 | 25.18 | |
| | 47 | 52.5365 | 5.3684 | 1.60525 | 38.88 | 0.58116 | 24.84 | |
| | 48 | −51.1775 | 10.7553 | | | | 24.90 | |
| | 49 | −641.5893 | 3.4529 | 1.89524 | 20.25 | 0.64024 | 25.65 | |
| | 50 | −72.4781 | 1.2516 | | | | 25.77 | |
| | 51 | −46.9530 | 1.8022 | 1.90497 | 37.50 | 0.57671 | 25.63 | |
| | 52 | 93.7062 | 4.8805 | | | | 26.31 | 18.29 |
| M3 | 53 | 90.0364 | 8.4452 | 1.71772 | 29.58 | 0.60466 | 29.26 | |
| | 54 | −207.8317 | 8.8020 | | | | 30.46 | |
| | 55 | 2394.7506 | 2.0705 | 1.90001 | 37.60 | 0.57658 | 32.52 | |
| | 56 | 58.9078 | 6.3111 | 1.57699 | 68.16 | 0.54129 | 33.06 | |
| | 57 | −173.7528 | 1.9444 | | | | 33.92 | |
| | 58 | 50.6072 | 9.3508 | 1.55347 | 71.77 | 0.53990 | 35.90 | |
| | 59 | −52.9608 | 2.0518 | 1.91491 | 36.26 | 0.57997 | 35.70 | |
| | 60 | 97.8417 | 4.9127 | | | | 36.25 | |
| | 61 | 47.4788 | 7.9448 | 1.45569 | 65.84 | 0.52857 | 40.38 | |
| | *62 | −593.1281 | 41.8800 | | | | 40.50 | |

TABLE 5

Example 1b

| | Wide | Middle | Tele |
|---|---|---|---|
| Zr | 1.00 | 19.87 | 38.60 |
| f | 36.04 | 715.99 | 1391.16 |
| Bf | 41.87 | 41.87 | 41.87 |
| FNo. | 4.00 | 4.59 | 7.20 |
| 2ω[°] | 61.92 | 3.34 | 1.72 |
| DD[10] | 5.19 | 156.72 | 164.17 |
| DD[20] | 271.34 | 49.94 | 3.86 |
| DD[25] | 21.99 | 9.80 | 2.58 |
| DD[30] | 3.60 | 85.66 | 131.51 |

Example 2a

Figure 9:
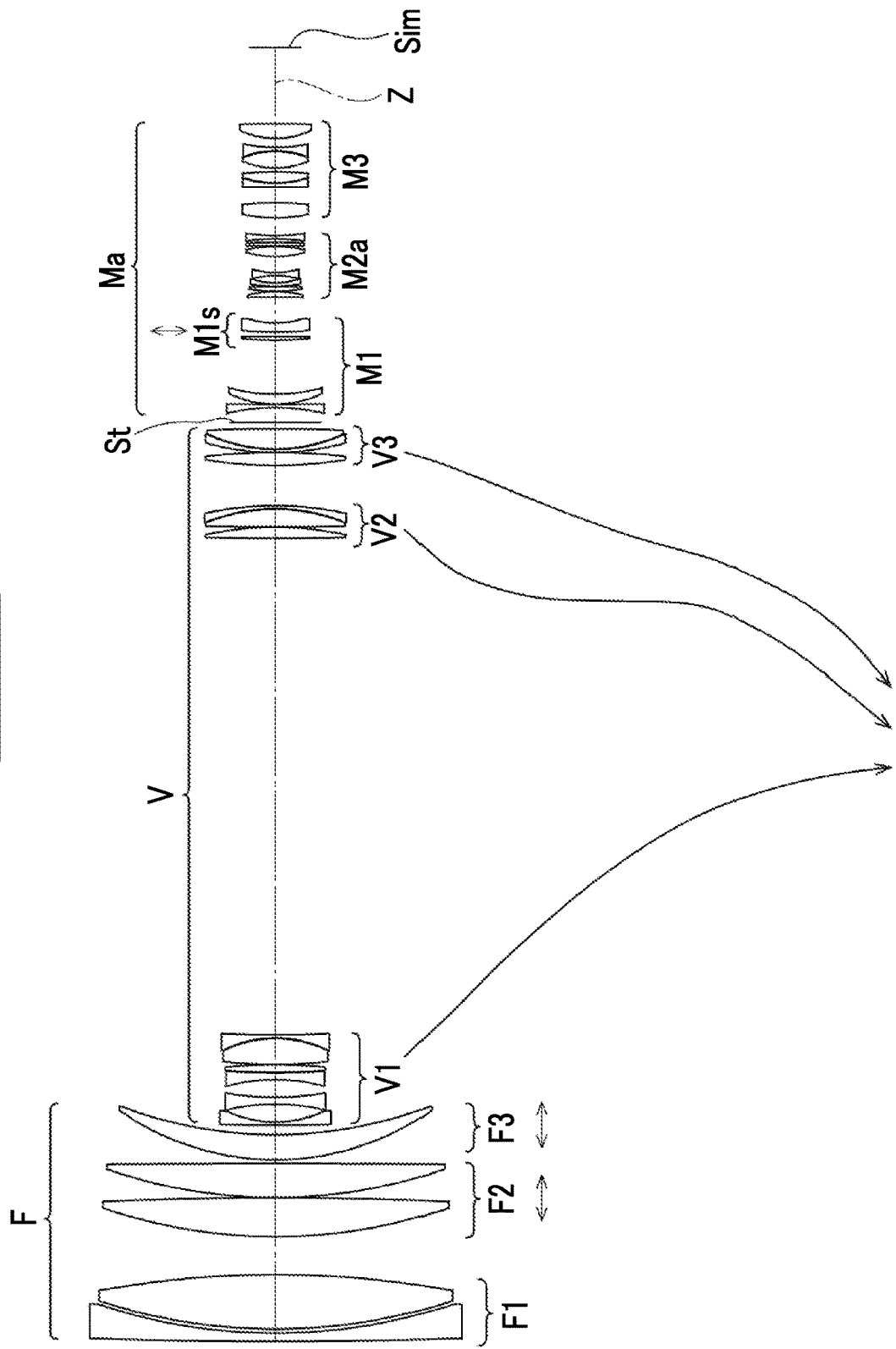

FIG. 9 shows a configuration and movement loci of the zoom lens according to Example 2a. The zoom lens according to Example 2a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. During focusing, the F1 lens group F1 remains stationary with respect to the image plane Sim, and the F2 lens group F2 and the F3 lens group F3 move along the optical axis Z by changing the mutual spacing. The variable magnification part V consists of, in order from the object side to the image side, a V1 lens group V1 that has a negative refractive power, a V2 lens group V2 that has a positive refractive power, and a V3 lens group V3 that has a positive refractive power. During magnification change, the V1 lens group V1, the V2 lens group V2, and the V3 lens group V3 move along the optical axis Z by changing the spacing between adjacent groups. The imaging part Ma consists of, in order from the object side to the image side, an M1 lens group M1, an M2a lens group M2a, and an M3 lens group M3. The M1 lens group M1 includes the vibration-proof group M1s closest to the image side. The M2a lens group M2a is replaceable with the M2b lens group M2b according to Example 2b.

Figure 11:
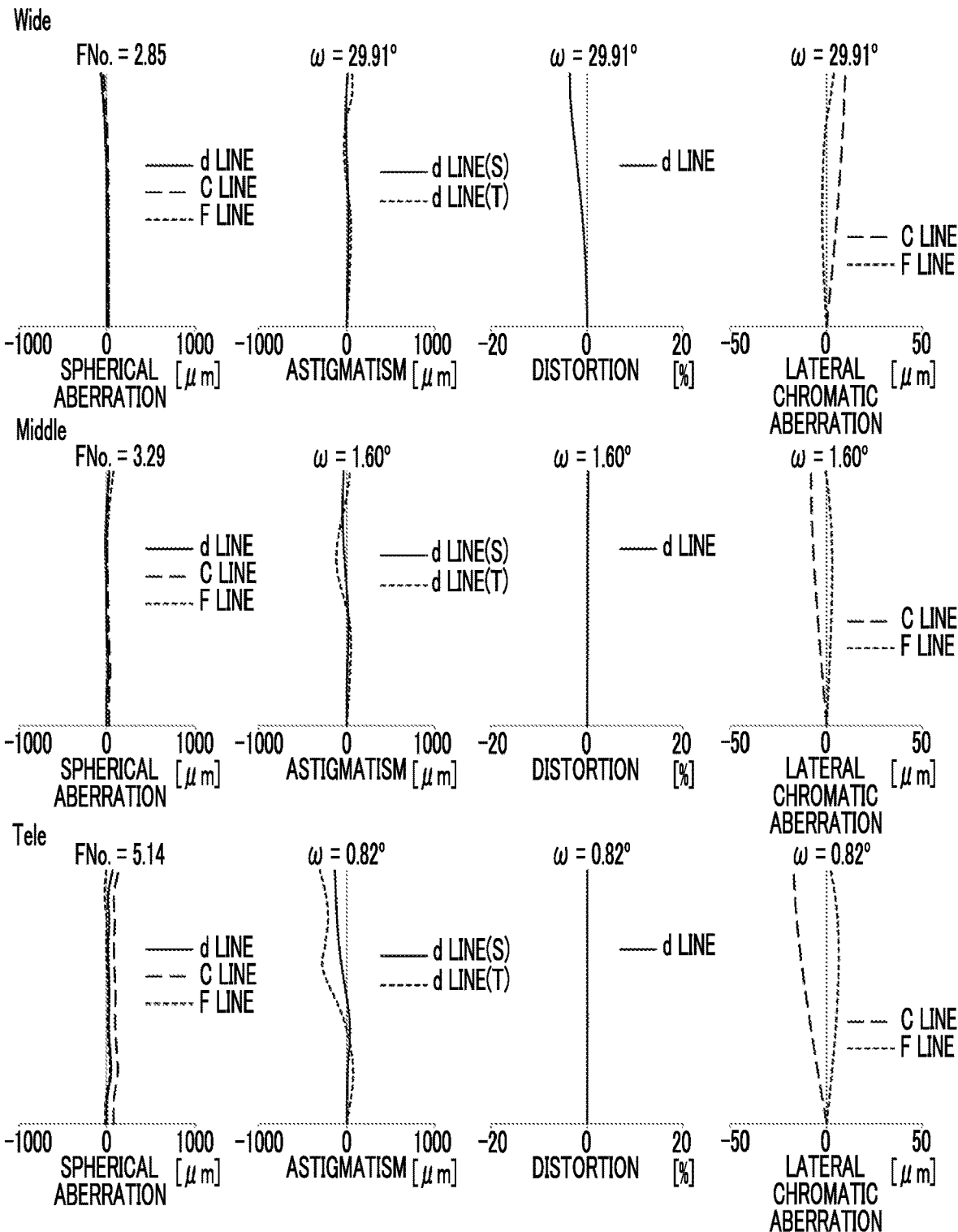

Regarding the zoom lens according to Example 2a, Tables 7-1 and 7-2 show basic lens data, Table 8 shows specifications and variable surface spacings, and Table 9 shows aspherical coefficients thereof. FIG. 11 shows aberration diagrams. The 36th to 39th surfaces of Table 7-2 correspond to the vibration-proof group M1s.

TABLE 7-1

Example 2a

|   | Sn | R | D | Nd | vd | θgF | ED |
|---|---|---|---|---|---|---|---|
| F | 1 | 3522.8936 | 4.4000 | 1.80610 | 40.97 | 0.56882 | 209.86 |
|   | 2 | 331.3997 | 2.2778 |   |   |   | 200.22 |
|   | 3 | 338.2495 | 29.6404 | 1.43387 | 95.18 | 0.53733 | 200.07 |
|   | 4 | -595.5919 | 20.9000 |   |   |   | 200.25 |

TABLE 7-1-continued

Example 2a

|   | Sn | R | D | Nd | vd | θgF | ED |
|---|---|---|---|---|---|---|---|
|   | 5 | 317.6064 | 21.2502 | 1.43387 | 95.18 | 0.53733 | 197.00 |
|   | 6 | -2216.5767 | 0.1202 |   |   |   | 196.60 |
|   | 7 | 298.8189 | 18.8917 | 1.43387 | 95.18 | 0.53733 | 192.83 |
|   | 8 | -9755.6288 | 2.0400 |   |   |   | 191.99 |
|   | 9 | 159.8334 | 13.8345 | 1.43700 | 95.10 | 0.53364 | 177.94 |
|   | 10 | 258.5068 | DD[10] |   |   |   | 176.04 |
| V | *11 | 859.5721 | 1.8002 | 2.00069 | 25.46 | 0.61364 | 63.55 |
|   | 12 | 67.2517 | 9.7502 |   |   |   | 57.03 |
|   | 13 | -127.1070 | 3.9225 | 1.82515 | 46.68 | 0.55683 | 56.88 |
|   | 14 | 173.3864 | 9.6664 |   |   |   | 55.19 |
|   | 15 | -106.3794 | 3.7816 | 1.59282 | 68.62 | 0.54414 | 54.94 |
|   | 16 | 394.5838 | 4.2902 | 1.82458 | 23.77 | 0.62004 | 56.26 |
|   | 17 | -314.5125 | 0.1215 |   |   |   | 56.50 |
|   | 18 | 268.7066 | 14.3948 | 1.81662 | 24.17 | 0.61925 | 58.38 |
|   | 19 | -69.2000 | 1.8202 | 1.79900 | 48.10 | 0.55219 | 59.77 |
|   | 20 | 754.7683 | DD[20] |   |   |   | 61.83 |
|   | 21 | 2000.8521 | 6.1012 | 1.49616 | 85.05 | 0.53763 | 79.81 |
|   | 22 | -197.3378 | 0.1200 |   |   |   | 79.93 |
|   | 23 | 1732.8560 | 9.8692 | 1.54124 | 76.54 | 0.53952 | 79.50 |
|   | 24 | -108.1125 | 1.8001 | 1.90143 | 37.86 | 0.57370 | 79.59 |
|   | 25 | -189.8802 | DD[25] |   |   |   | 80.53 |
|   | 26 | 259.3897 | 7.2250 | 1.43700 | 95.10 | 0.53364 | 80.00 |
|   | 27 | -354.8604 | 0.1207 |   |   |   | 80.01 |
|   | 28 | 154.5733 | 1.8000 | 1.93869 | 30.13 | 0.59776 | 79.29 |
|   | 29 | 94.1540 | 11.2311 | 1.55031 | 75.50 | 0.54001 | 77.77 |
|   | 30 | -770.4342 | DD[30] |   |   |   | 77.48 |
| St | 31 | ∞ | 8.0000 |   |   |   | 51.69 |

TABLE 7-2

Example 2a

|   | Sn | R | D | Nd | vd | θgF | ED | MDA |
|---|---|---|---|---|---|---|---|---|
| M1 | 32 | -124.6264 | 1.8000 | 1.70614 | 55.21 | 0.54470 | 49.33 |   |
|   | 33 | 1904.1130 | 0.1200 |   |   |   | 49.01 |   |
|   | 34 | 63.0805 | 5.4592 | 1.78586 | 26.27 | 0.61399 | 48.50 |   |
|   | 35 | 102.2976 | 29.6876 |   |   |   | 47.10 |   |
|   | 36 | 236.2230 | 1.8077 | 1.80330 | 40.99 | 0.57041 | 36.78 |   |
|   | 37 | 1851.1492 | 2.6294 |   |   |   | 36.45 |   |
|   | 38 | 226.1908 | 5.0118 | 1.89763 | 21.49 | 0.63490 | 34.88 |   |
|   | 39 | 58.8261 | 13.9976 |   |   |   | 32.70 |   |
| M2a | 40 | -559.8490 | 3.1070 | 1.61607 | 60.51 | 0.54302 | 31.51 | 31.37 |
|   | 41 | -61.1175 | 0.1201 |   |   |   | 31.46 |   |
|   | 42 | 92.9795 | 2.6486 | 1.91308 | 19.95 | 0.64284 | 30.09 |   |
|   | 43 | -337.6264 | 0.1460 |   |   |   | 29.69 |   |
|   | 44 | 94.7100 | 1.8102 | 1.68041 | 54.97 | 0.54594 | 28.39 |   |
|   | 45 | 44.7671 | 3.9226 |   |   |   | 26.70 |   |
|   | 46 | -51.1568 | 1.8000 | 1.78484 | 46.68 | 0.55828 | 26.62 |   |
|   | 47 | 51.9931 | 8.7061 |   |   |   | 26.25 |   |
|   | 48 | 61.5413 | 5.5251 | 1.69180 | 40.16 | 0.57569 | 32.94 |   |
|   | 49 | -74.3372 | 0.3580 |   |   |   | 33.16 |   |
|   | 50 | 7090.8834 | 1.8000 | 1.69983 | 49.56 | 0.55506 | 33.05 |   |
|   | 51 | -312.5333 | 1.8889 |   |   |   | 33.01 |   |
|   | 52 | -113.5195 | 1.8000 | 1.84835 | 28.39 | 0.60544 | 32.86 |   |
|   | 53 | 102.8372 | 9.7671 |   |   |   | 33.15 | 26.04 |
| M3 | 54 | 87.6054 | 8.4373 | 1.72992 | 29.21 | 0.60555 | 37.46 |   |
|   | 55 | -209.5885 | 8.7942 |   |   |   | 37.71 |   |
|   | 56 | 2547.8064 | 2.0635 | 1.90000 | 37.63 | 0.57649 | 37.17 |   |
|   | 57 | 59.6808 | 6.3077 | 1.58104 | 67.50 | 0.54153 | 36.99 |   |
|   | 58 | -178.1579 | 1.9397 |   |   |   | 37.20 |   |
|   | 59 | 49.0253 | 9.3358 | 1.53370 | 74.79 | 0.53882 | 37.32 |   |
|   | 60 | -51.5880 | 2.0483 | 1.92772 | 34.98 | 0.58328 | 36.71 |   |
|   | 61 | 97.3283 | 4.8903 |   |   |   | 36.34 |   |
|   | 62 | 50.0016 | 7.9321 | 1.50682 | 56.55 | 0.54935 | 38.14 |   |
|   | *63 | -918.6296 | 41.8900 |   |   |   | 37.71 |   |

TABLE 8

| | Example 2a | | |
|---|---|---|---|
| | Wide | Middle | Tele |
| Zr | 1.00 | 19.87 | 38.60 |
| f | 25.74 | 511.33 | 993.51 |
| Bf | 41.88 | 41.88 | 41.88 |
| FNo. | 2.85 | 3.29 | 5.14 |
| 2ω[°] | 59.82 | 3.20 | 1.64 |
| DD[10] | 5.03 | 156.64 | 164.09 |
| DD[20] | 271.90 | 50.28 | 4.14 |
| DD[25] | 21.99 | 9.80 | 2.58 |
| DD[30] | 3.50 | 85.70 | 131.61 |

TABLE 9

| | Example 2a | |
|---|---|---|
| Sn | 11 | 63 |
| KA | 1.0000000E+00 | 1.0000000E+00 |
| A3 | 0.0000000E+00 | 0.0000000E+00 |
| A4 | 9.5408109E−08 | 8.3044119E−07 |
| A5 | −6.3285034E−08 | −1.3115148E−06 |
| A6 | 1.5530784E−08 | 5.2479364E−07 |
| A7 | −1.8596266E−09 | −1.1165695E−07 |
| A8 | 1.0985930E−10 | 1.3044476E−08 |
| A9 | −1.7312872E−12 | −7.5932335E−10 |
| A10 | −1.4427742E−13 | 5.6736081E−12 |
| A11 | 6.3642991E−15 | 1.7290422E−12 |
| A12 | 1.4714590E−16 | −4.5102769E−14 |
| A13 | −1.7788327E−17 | −5.4837575E−15 |
| A14 | 5.5216315E−19 | 4.3073119E−16 |
| A15 | −7.8005768E−21 | −1.2217750E−17 |
| A16 | 4.2980685E−23 | 1.2898761E−19 |

Example 2b

Figure 10:
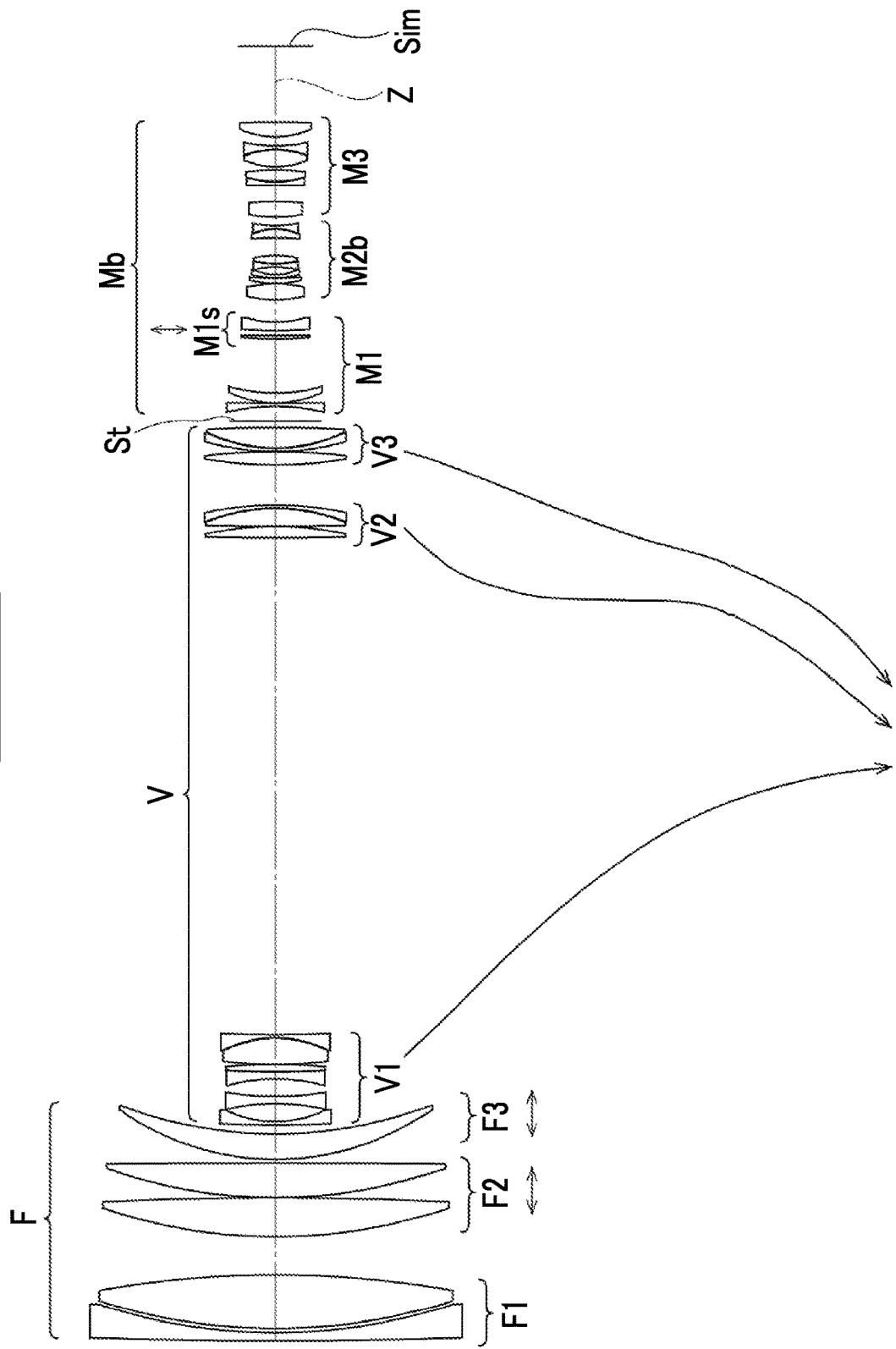
FIG. 10 is a diagram showing a configuration and a movement locus of a zoom lens according to Example 2b.

FIG. 10 shows a configuration and movement loci of the zoom lens according to Example 2b. In the zoom lens according to Example 2b, the M2a lens group M2a of the zoom lens according to Example 2a is replaced with the M2b lens group M2b according to Example 2b. The focusing part F, the variable magnification part V, the aperture stop St, the M1 lens group M1, and the M3 lens group M3 of the zoom lens according to Example 2b are common to those of the zoom lens according to Example 2a.

Figure 12:
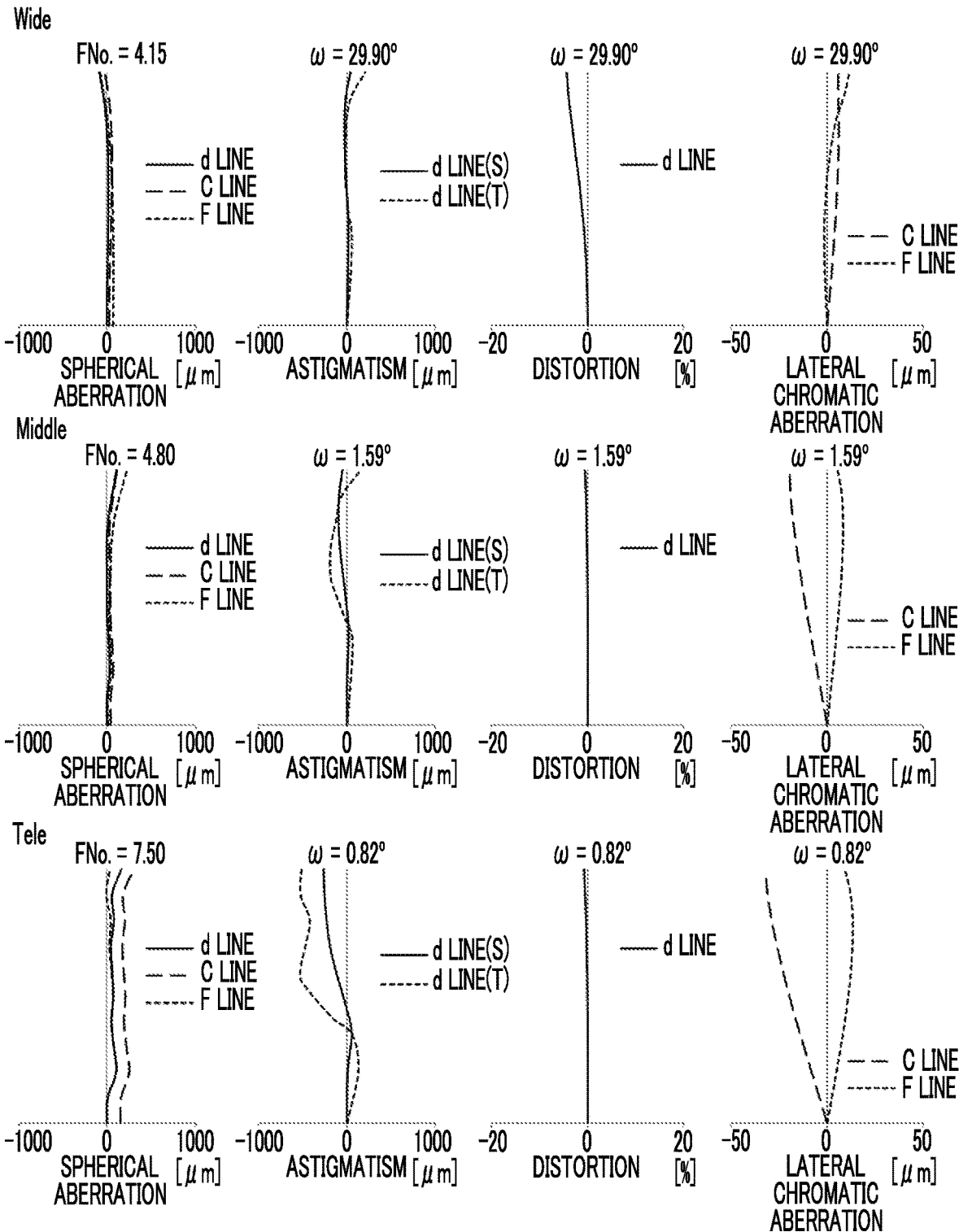
FIG. 12 is a diagram showing aberrations of the zoom lens according to Example 2b.

Regarding the zoom lens according to Example 2b, Tables 10-1 and 10-2 show basic lens data, Table 11 shows specifications and variable surface spacings, and Table 12 shows aspherical coefficients thereof. FIG. 12 shows aberration diagrams.

TABLE 10-1

| | | Example 2b | | | | | |
|---|---|---|---|---|---|---|---|
| | Sn | R | D | Nd | vd | θgF | ED |
| F | 1 | 3522.8936 | 4.4000 | 1.80610 | 40.97 | 0.56882 | 209.86 |
| | 2 | 331.3997 | 2.2778 | | | | 200.22 |
| | 3 | 338.2495 | 29.6404 | 1.43387 | 95.18 | 0.53733 | 200.07 |
| | 4 | −595.5919 | 20.9000 | | | | 200.25 |
| | 5 | 317.6064 | 21.2502 | 1.43387 | 95.18 | 0.53733 | 197.00 |
| | 6 | −2216.5767 | 0.1202 | | | | 196.60 |
| | 7 | 298.8189 | 18.8917 | 1.43387 | 95.18 | 0.53733 | 192.83 |
| | 8 | −9755.6288 | 2.0400 | | | | 191.99 |
| | 9 | 159.8334 | 13.8345 | 1.43700 | 95.10 | 0.53364 | 177.94 |
| | 10 | 258.5068 | DD[10] | | | | 176.04 |
| V | *11 | 859.5721 | 1.8002 | 2.00069 | 25.46 | 0.61364 | 63.55 |
| | 12 | 67.2517 | 9.7502 | | | | 57.03 |
| | 13 | −127.1070 | 3.9225 | 1.82515 | 46.68 | 0.55683 | 56.88 |
| | 14 | 173.3864 | 9.6664 | | | | 55.19 |
| | 15 | −106.3794 | 3.7816 | 1.59282 | 68.62 | 0.54414 | 54.94 |
| | 16 | 394.5838 | 4.2902 | 1.82458 | 23.77 | 0.62004 | 56.26 |
| | 17 | −314.5125 | 0.1215 | | | | 56.50 |
| | 18 | 268.7066 | 14.3948 | 1.81662 | 24.17 | 0.61925 | 58.38 |
| | 19 | −69.2000 | 1.8202 | 1.79900 | 48.10 | 0.55219 | 59.77 |
| | 20 | 754.7683 | DD[20] | | | | 61.83 |
| | 21 | 2000.8521 | 6.1012 | 1.49616 | 85.05 | 0.53763 | 79.81 |
| | 22 | −197.3378 | 0.1200 | | | | 79.93 |
| | 23 | 1732.8560 | 9.8692 | 1.54124 | 76.54 | 0.53952 | 79.50 |
| | 24 | −108.1125 | 1.8001 | 1.90143 | 37.86 | 0.57370 | 79.59 |
| | 25 | −189.8802 | DD[25] | | | | 80.53 |
| | 26 | 259.3897 | 7.2250 | 1.43700 | 95.10 | 0.53364 | 80.00 |
| | 27 | −354.8604 | 0.1207 | | | | 80.01 |
| | 28 | 154.5733 | 1.8000 | 1.93869 | 30.13 | 0.59776 | 79.29 |
| | 29 | 94.1540 | 11.2311 | 1.55031 | 75.50 | 0.54001 | 77.77 |
| | 30 | −770.4342 | DD[30] | | | | 77.48 |
| St | 31 | ∞ | 8.0000 | | | | 51.69 |

TABLE 10-2

| | | Example 2b | | | | | | |
|---|---|---|---|---|---|---|---|---|
| | Sn | R | D | Nd | vd | θgF | ED | MDA |
| M1 | 32 | −124.6264 | 1.8000 | 1.70614 | 55.21 | 0.54470 | 49.33 | |
| | 33 | 1904.1130 | 0.1200 | | | | 49.01 | |
| | 34 | 63.0805 | 5.4592 | 1.78586 | 26.27 | 0.61399 | 48.52 | |
| | 35 | 102.2976 | 29.6876 | | | | 47.12 | |
| | 36 | 236.2230 | 1.8077 | 1.80330 | 40.99 | 0.57041 | 37.05 | |
| | 37 | 1851.1492 | 2.6294 | | | | 36.73 | |
| | 38 | 226.1908 | 5.0118 | 1.89763 | 21.49 | 0.63490 | 35.21 | |
| | 39 | 58.8261 | 12.2021 | | | | 33.08 | |
| M2b | 40 | 75.1441 | 8.7285 | 1.51600 | 77.54 | 0.51944 | 32.41 | 31.36 |
| | 41 | −70.4404 | 0.1200 | | | | 31.45 | |
| | 42 | 58.6063 | 2.8817 | 1.85943 | 22.03 | 0.63142 | 29.37 | |
| | 43 | 205.5722 | 0.1200 | | | | 28.56 | |
| | 44 | 48.9182 | 1.8000 | 1.71933 | 55.53 | 0.54385 | 27.14 | |
| | 45 | 28.9543 | 4.2432 | | | | 25.03 | |
| | 46 | −48.5238 | 1.8002 | 1.89101 | 37.95 | 0.57586 | 25.20 | |
| | 47 | 61.5801 | 4.4124 | 1.68854 | 30.82 | 0.60201 | 24.93 | |
| | 48 | −56.0448 | 9.6633 | | | | 24.90 | |
| | 49 | −158.1390 | 5.0100 | 1.78124 | 25.94 | 0.61506 | 24.76 | |

TABLE 10-2-continued

Example 2b

| | Sn | R | D | Nd | vd | θgF | ED | MDA |
|---|---|---|---|---|---|---|---|---|
| | 50 | −29.8932 | 1.8001 | 1.93001 | 35.00 | 0.58315 | 24.98 | |
| | 51 | 77.5503 | 4.6127 | | | | 25.79 | 17.75 |
| M3 | 52 | 87.6054 | 8.4373 | 1.72992 | 29.21 | 0.60555 | 28.80 | |
| | 53 | −209.5885 | 8.7942 | | | | 30.16 | |
| | 54 | 2547.8064 | 2.0635 | 1.90000 | 37.63 | 0.57649 | 32.47 | |
| | 55 | 59.6808 | 6.3077 | 1.58104 | 67.50 | 0.54153 | 33.00 | |
| | 56 | −178.1579 | 1.9397 | | | | 33.86 | |
| | 57 | 49.0253 | 9.3358 | 1.53370 | 74.79 | 0.53882 | 35.80 | |
| | 58 | −51.5880 | 2.0483 | 1.92772 | 34.98 | 0.58328 | 35.59 | |
| | 59 | 97.3283 | 4.8903 | | | | 36.21 | |
| | 60 | 50.0016 | 7.9321 | 1.50682 | 56.55 | 0.54935 | 40.37 | |
| | *61 | −918.6296 | 41.8700 | | | | 40.50 | |

TABLE 11

Example 2b

| | Wide | Middle | Tele |
|---|---|---|---|
| Zr | 1.00 | 19.87 | 38.60 |
| f | 37.55 | 746.00 | 1449.46 |
| Bf | 41.87 | 41.87 | 41.87 |
| FNo. | 4.15 | 4.80 | 7.50 |
| 2ω[°] | 59.80 | 3.18 | 1.64 |
| DD[10] | 5.03 | 156.64 | 164.09 |
| DD[20] | 271.90 | 50.28 | 4.14 |
| DD[25] | 21.99 | 9.80 | 2.58 |
| DD[30] | 3.50 | 85.70 | 131.61 |

TABLE 12

Example 2b

| Sn | 11 | 61 |
|---|---|---|
| KA | 1.0000000E+00 | 1.0000000E+00 |
| A3 | 0.0000000E+00 | 0.0000000E+00 |
| A4 | 9.5408109E−08 | 8.3044119E−07 |
| A5 | −6.3285034E−08 | −1.3115148E−06 |
| A6 | 1.5530784E−08 | 5.2479364E−07 |
| A7 | −1.8596266E−09 | −1.1165695E−07 |
| A8 | 1.0985930E−10 | 1.3044476E−08 |
| A9 | −1.7312872E−12 | −7.5932335E−10 |
| A10 | −1.4427742E−13 | 5.6736081E−12 |
| A11 | 6.3642991E−15 | 1.7290422E−12 |
| A12 | 1.4714590E−16 | −4.5102769E−14 |
| A13 | −1.7788327E−17 | −5.4837575E−15 |
| A14 | 5.5216315E−19 | 4.3073119E−16 |
| A15 | −7.8005768E−21 | −1.2217750E−17 |
| A16 | 4.2980685E−23 | 1.2898761E−19 |

Example 3a

Figure 13:
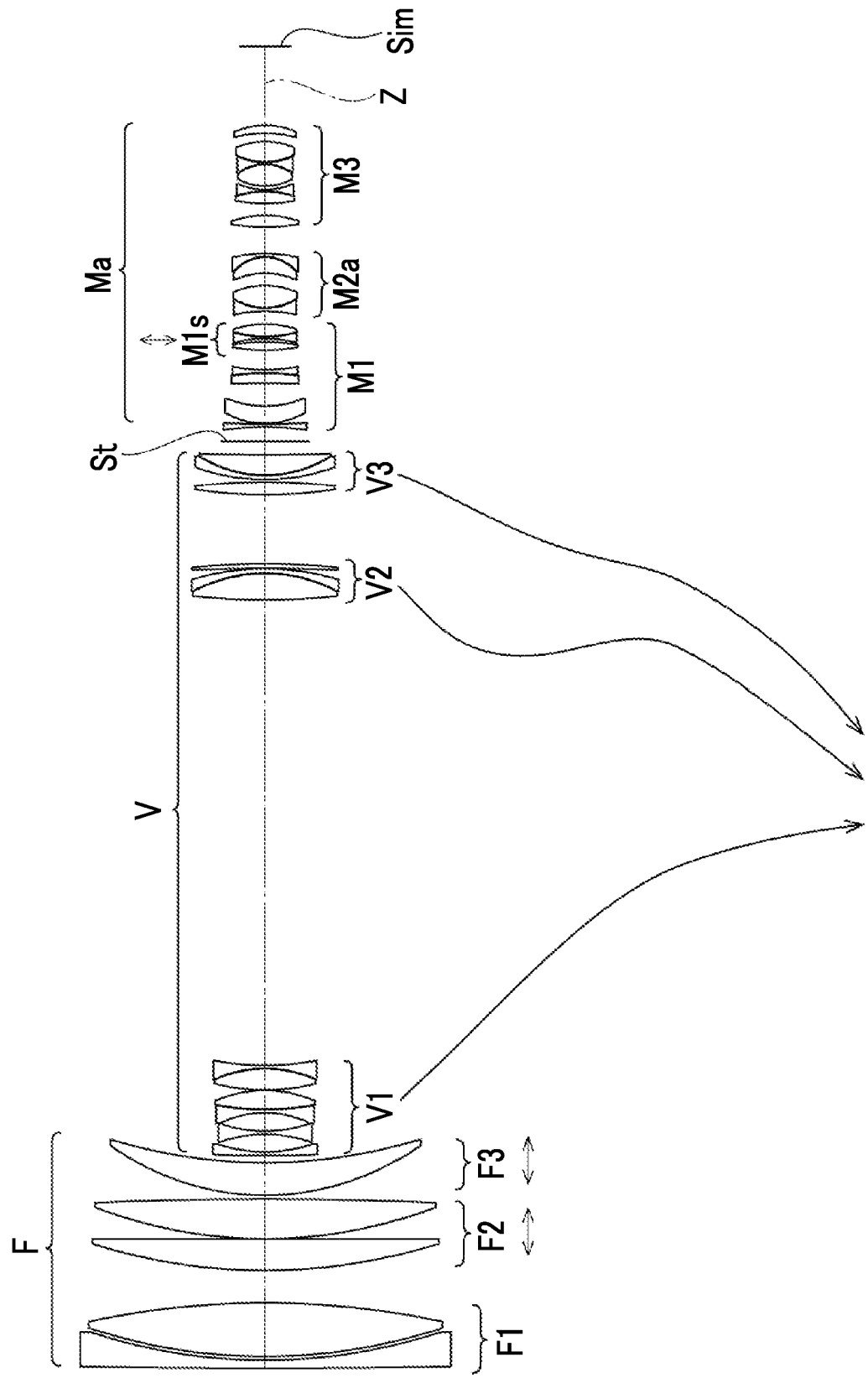

FIG. 13 shows a configuration and movement loci of the zoom lens according to Example 3a. The zoom lens according to Example 3a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. During focusing, the F1 lens group F1 remains stationary with respect to the image plane Sim, and the F2 lens group F2 and the F3 lens group F3 move along the optical axis Z by changing the mutual spacing. The variable magnification part V consists of, in order from the object side to the image side, a V1 lens group V1 that has a negative refractive power, a V2 lens group V2 that has a positive refractive power, and a V3 lens group V3 that has a positive refractive power. During magnification change, the V1 lens group V1, the V2 lens group V2, and the V3 lens group V3 move along the optical axis Z by changing the spacing between adjacent groups. The imaging part Ma consists of, in order from the object side to the image side, an M1 lens group M1, an M2a lens group M2a, and an M3 lens group M3. The M1 lens group M1 includes the vibration-proof group M1s closest to the image side. The M2a lens group M2a is replaceable with the M2b lens group M2b according to Example 3b.

Figure 15:
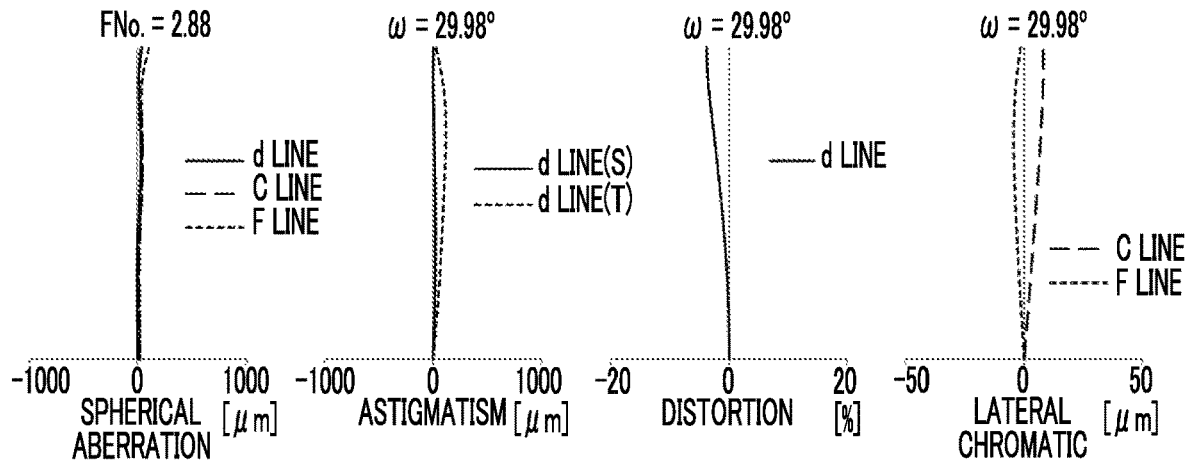
Figure 15:
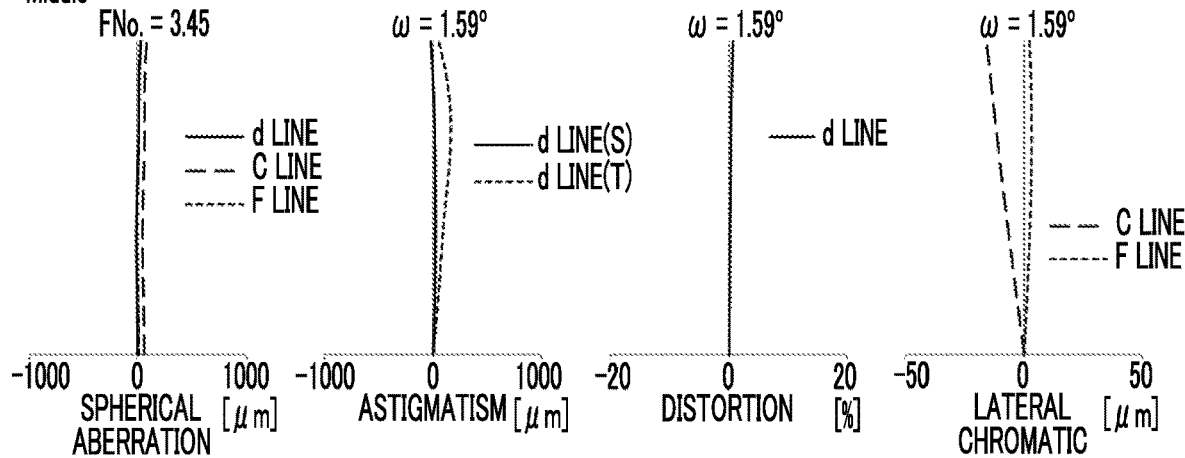
Figure 15:
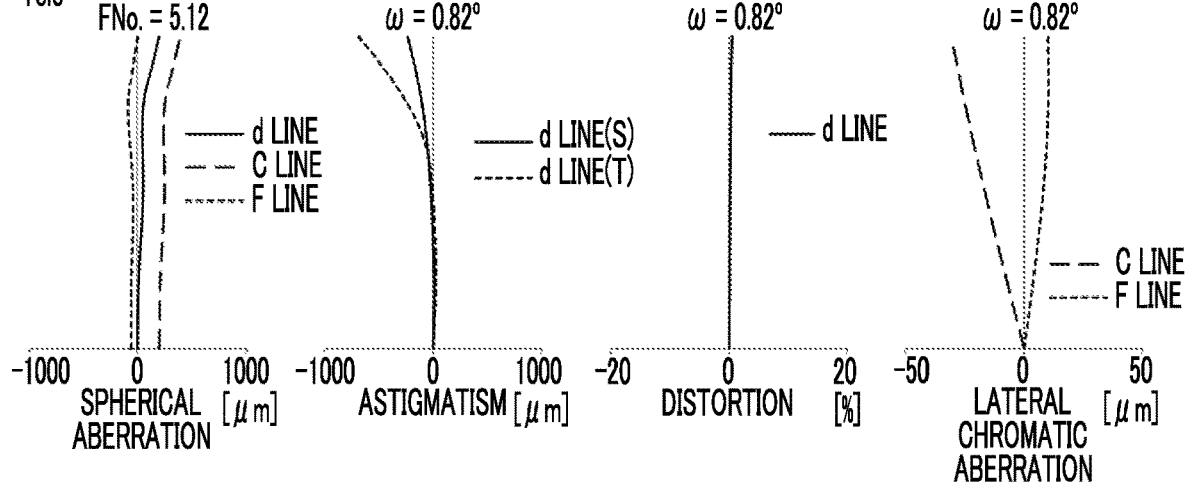

Regarding the zoom lens according to Example 3a, Tables 13-1 and 13-2 show basic lens data, Table 14 shows specifications and variable surface spacings, and Table 15 shows aspherical coefficients thereof. FIG. 15 shows aberration diagrams. The 39th to 43rd surfaces of Table 13-2 correspond to the vibration-proof group M1s.

TABLE 13-1

Example 3a

| | Sn | R | D | Nd | vd | θgF | ED |
|---|---|---|---|---|---|---|---|
| F | 1 | 6623.2944 | 4.4000 | 1.83481 | 42.73 | 0.56481 | 207.26 |
| | 2 | 332.3311 | 2.0000 | | | | 201.40 |
| | 3 | 333.1699 | 29.5000 | 1.43387 | 95.18 | 0.53733 | 202.17 |
| | 4 | 498.9841 | 17.9000 | | | | 202.36 |
| | 5 | 342.5422 | 17.3000 | 1.43387 | 95.18 | 0.53733 | 198.00 |
| | 6 | ∞ | 0.1200 | | | | 197.71 |
| | 7 | 283.0731 | 21.9072 | 1.43387 | 95.18 | 0.53733 | 195.00 |
| | 8 | −2271.8992 | 2.0000 | | | | 194.19 |
| | 9 | 156.7233 | 17.9998 | 1.43700 | 95.10 | 0.53364 | 177.79 |
| | 10 | 314.2891 | DD[10] | | | | 175.63 |
| V | *11 | 2760.8829 | 2.0000 | 2.00069 | 25.46 | 0.61364 | 60.29 |
| | 12 | 88.7218 | 9.6426 | | | | 54.83 |
| | 13 | −82.7951 | 1.8000 | 1.84666 | 23.84 | 0.62012 | 53.75 |
| | 14 | 81.4397 | 10.0833 | | | | 51.38 |
| | 15 | −60.6418 | 1.8205 | 1.78226 | 46.61 | 0.55852 | 51.41 |
| | 16 | 160.3482 | 10.6476 | 1.85896 | 22.73 | 0.62844 | 56.21 |
| | 17 | −71.3362 | 0.1200 | | | | 57.17 |
| | 18 | 121.7690 | 11.7529 | 1.77047 | 29.74 | 0.59514 | 58.00 |
| | 19 | −73.9168 | 1.8000 | 1.77250 | 49.62 | 0.55038 | 58.23 |
| | 20 | 163.4954 | DD[20] | | | | 59.32 |
| | 21 | 388.3735 | 14.7200 | 1.52353 | 77.24 | 0.53922 | 82.40 |
| | 22 | −91.2103 | 2.6000 | 1.84751 | 44.07 | 0.56176 | 82.63 |
| | 23 | −148.1945 | 0.1200 | | | | 84.18 |
| | 24 | −888.6636 | 2.6000 | 1.43875 | 94.94 | 0.53433 | 83.93 |
| | 25 | −398.8234 | DD[25] | | | | 83.93 |
| | 26 | 277.0521 | 7.0000 | 1.61914 | 63.43 | 0.54424 | 80.00 |
| | 27 | −369.9721 | 1.5703 | | | | 79.94 |
| | 28 | 121.9884 | 2.4000 | 1.84819 | 27.37 | 0.60872 | 78.02 |
| | 29 | 73.5884 | 11.1634 | 1.49700 | 81.54 | 0.53748 | 75.41 |
| | 30 | 943.3533 | DD[30] | | | | 75.05 |
| St | 31 | ∞ | 7.9881 | | | | 50.27 |

TABLE 13-2

Example 3a

|  | Sn | R | D | Nd | vd | θgF | ED | MDA |
|---|---|---|---|---|---|---|---|---|
| M1 | 32 | −172.3657 | 1.8000 | 1.81755 | 46.25 | 0.55807 | 47.38 | |
| | 33 | 750.3863 | 0.1200 | | | | 46.94 | |
| | 34 | 46.6290 | 9.5525 | 1.85229 | 26.13 | 0.61344 | 46.08 | |
| | 35 | 58.7421 | 12.5873 | | | | 41.93 | |
| | 36 | −922.8813 | 5.5698 | 1.64959 | 39.86 | 0.57760 | 38.50 | |
| | 37 | −148.5370 | 1.8000 | 1.83368 | 44.63 | 0.56103 | 37.47 | |
| | 38 | 92.5695 | 10.8535 | | | | 36.62 | |
| | 39 | 106.9665 | 4.5245 | 1.65747 | 34.78 | 0.59125 | 36.76 | |
| | 40 | −113.7348 | 1.8355 | | | | 36.57 | |
| | 41 | −74.2043 | 1.1300 | 1.82835 | 29.63 | 0.60192 | 36.09 | |
| | 42 | 74.1297 | 6.8171 | 1.57741 | 43.21 | 0.57289 | 36.06 | |
| | 43 | −61.6629 | 7.1482 | | | | 36.20 | |
| M2a | 44 | −84.8958 | 1.8000 | 1.71711 | 54.35 | 0.54555 | 35.10 | 34.23 |
| | 45 | 34.5866 | 12.3316 | 1.61429 | 36.58 | 0.58724 | 35.95 | |
| | 46 | −47.3898 | 6.7952 | | | | 36.62 | |
| | 47 | −45.1332 | 8.9576 | 1.64440 | 59.28 | 0.54291 | 35.11 | |
| | 48 | −23.7994 | 1.8100 | 1.64348 | 34.23 | 0.59328 | 35.97 | |
| | 49 | −86.8280 | 14.6186 | | | | 37.55 | 34.13 |
| M3 | 50 | 122.8529 | 6.4001 | 1.69502 | 30.60 | 0.60244 | 38.50 | |
| | *51 | −59.7868 | 6.6771 | | | | 38.51 | |
| | 52 | 104.0447 | 6.5101 | 1.55020 | 72.28 | 0.53973 | 33.64 | |
| | 53 | −57.7630 | 1.1000 | 1.77991 | 40.99 | 0.57114 | 32.52 | |
| | 54 | 42.1309 | 1.9686 | | | | 30.84 | |
| | 55 | 34.9865 | 11.9655 | 1.43875 | 94.94 | 0.53433 | 31.22 | |
| | 56 | −27.2937 | 1.2000 | 1.85517 | 42.48 | 0.56506 | 30.47 | |
| | 57 | 38.4508 | 11.3481 | 1.52536 | 57.38 | 0.54841 | 31.83 | |
| | 58 | −42.1912 | 4.5734 | | | | 33.58 | |
| | 59 | −68.7714 | 4.2398 | 1.65918 | 34.52 | 0.59198 | 34.51 | |
| | *60 | −54.4832 | 43.5200 | | | | 35.38 | |

TABLE 14

Example 3a

| | Wide | Middle | Tele |
|---|---|---|---|
| Zr | 1.00 | 19.87 | 38.60 |
| f | 25.73 | 511.12 | 993.10 |
| Bf | 43.51 | 43.51 | 43.51 |
| FNo. | 2.88 | 3.45 | 5.12 |
| 2ω[°] | 59.96 | 3.18 | 1.64 |
| DD[10] | 3.90 | 145.22 | 152.35 |
| DD[20] | 255.75 | 47.41 | 4.62 |
| DD[25] | 38.04 | 13.27 | 1.99 |
| DD[30] | 7.38 | 99.18 | 146.13 |

TABLE 15

Example 3a

| Sn | 11 | 51 | 60 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.2167690E−07 | 1.5627011E−06 | −4.2288575E−06 |
| A5 | 3.1277183E−09 | −2.7703508E−08 | −2.5524310E−07 |
| A6 | −6.0770255E−10 | 6.3084999E−09 | 2.0152538E−08 |
| A7 | 5.6806544E−11 | −5.0916775E−10 | −1.1401201E−09 |
| A8 | −1.4354615E−12 | 9.8318597E−12 | 5.7630965E−11 |
| A9 | −1.1293572E−13 | −1.1083597E−13 | −2.0591703E−12 |
| A10 | 1.0463864E−14 | 2.7627818E−14 | 1.6288926E−14 |
| A11 | −3.6391921E−16 | −3.1412215E−16 | 8.2684211E−16 |
| A12 | 9.9530738E−18 | −1.8204303E−17 | −5.8233717E−17 |
| A13 | −5.1327913E−19 | −2.3870878E−18 | 2.8554016E−18 |
| A14 | 2.2460698E−20 | 1.2631340E−19 | −8.2037001E−20 |
| A15 | −4.8377063E−22 | −2.8563853E−21 | 3.1265177E−21 |
| A16 | 3.9670874E−24 | 6.5812603E−23 | −8.7649039E−23 |

Example 3b

Figure 14:
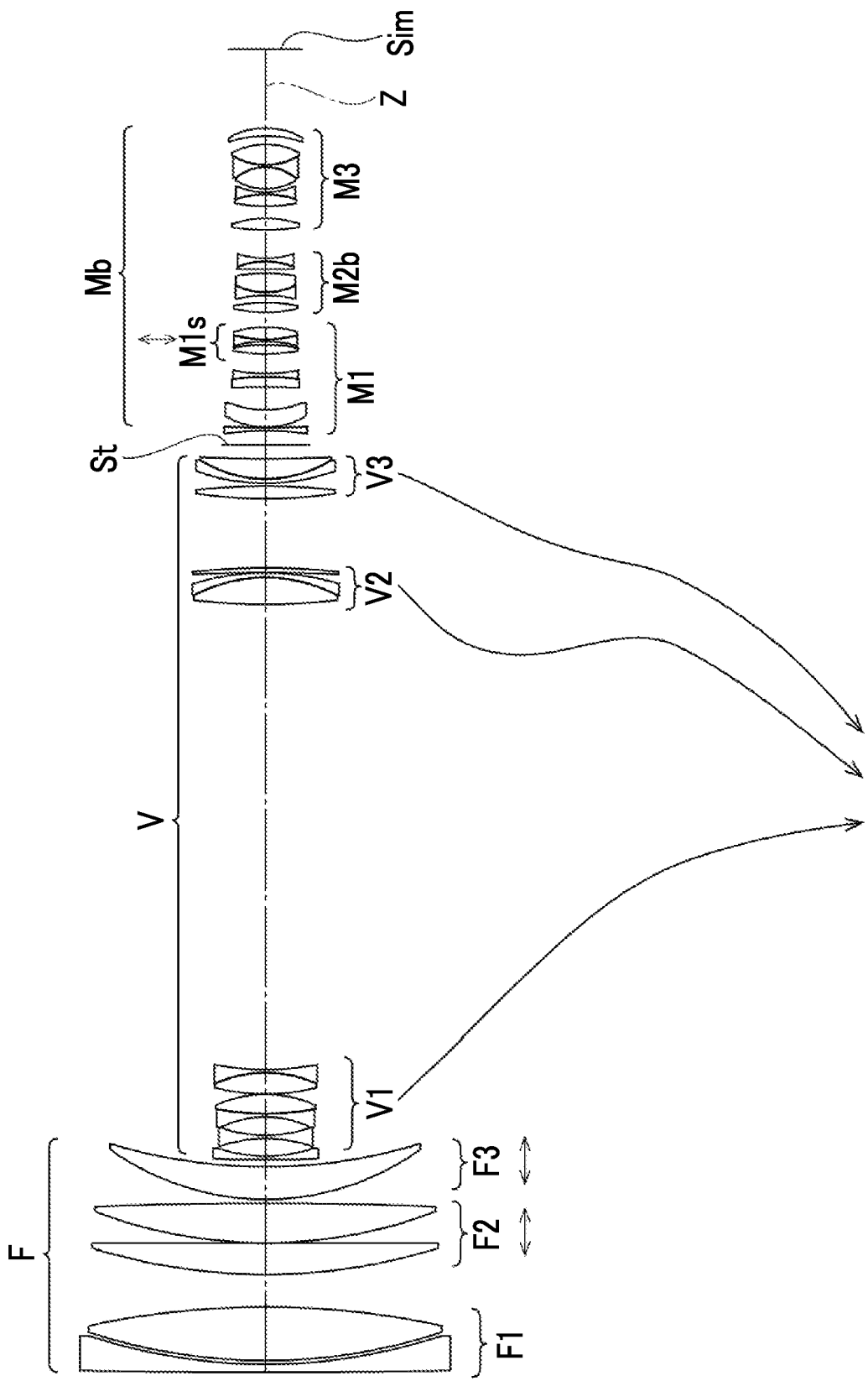
FIG. 14 is a diagram showing a configuration and a movement locus of a zoom lens according to Example 3b.

FIG. 14 shows a configuration and movement loci of the zoom lens according to Example 3b. In the zoom lens according to Example 3b, the M2a lens group M2a of the zoom lens according to Example 3a is replaced with the M2b lens group M2b according to Example 3b. The focusing part F, the variable magnification part V, the aperture stop St, the M1 lens group M1, and the M3 lens group M3 of the zoom lens according to Example 3b are common to those of the zoom lens according to Example 3a.

Figure 16:
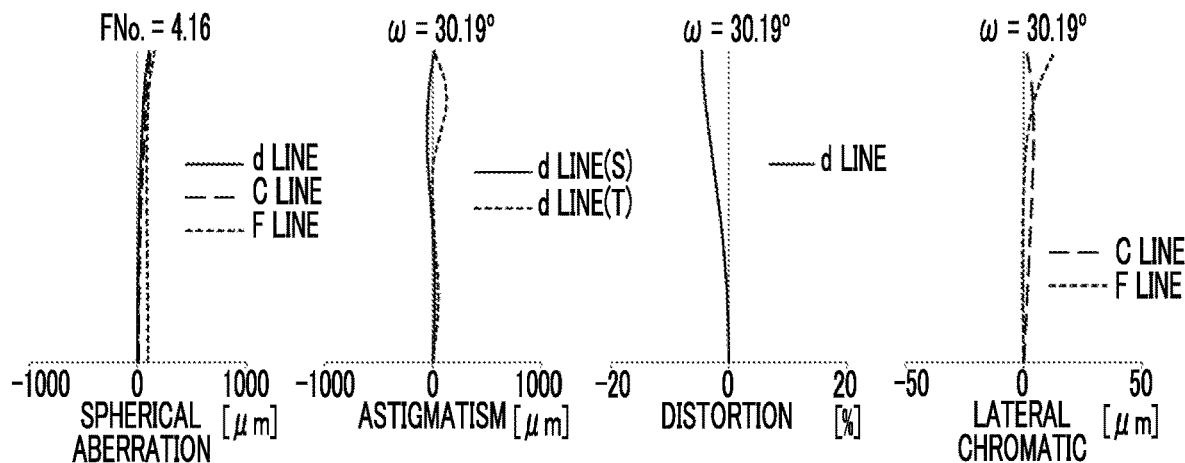
FIG. 16 is a diagram showing aberrations of the zoom lens according to Example 3b.
Figure 16:
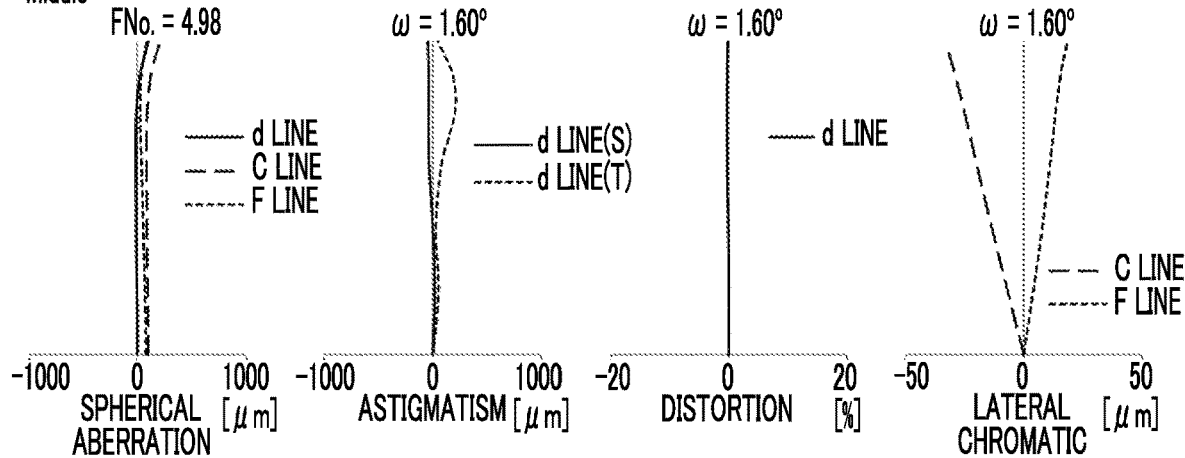
Figure 16:
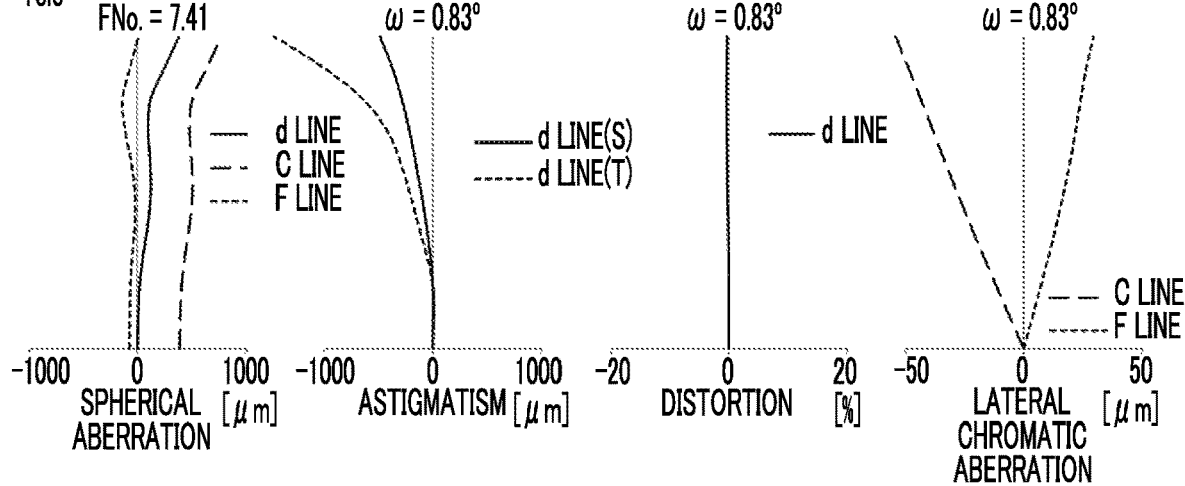

Regarding the zoom lens according to Example 3b, Tables 16-1 and 16-2 show basic lens data, Table 17 shows specifications and variable surface spacings, and Table 18 shows aspherical coefficients thereof. FIG. 16 shows aberration diagrams.

TABLE 16-1

Example 3b

| | Sn | R | D | Nd | vd | θgF | ED |
|---|---|---|---|---|---|---|---|
| F | 1 | 6623.2944 | 4.4000 | 1.83481 | 42.73 | 0.56481 | 207.26 |
| | 2 | 332.3311 | 2.0000 | | | | 201.40 |
| | 3 | 333.1699 | 29.5000 | 1.43387 | 95.18 | 0.53733 | 202.17 |
| | 4 | −498.9841 | 17.9000 | | | | 202.36 |
| | 5 | 342.5422 | 17.3000 | 1.43387 | 95.18 | 0.53733 | 198.00 |
| | 6 | ∞ | 0.1200 | | | | 197.71 |
| | 7 | 283.0731 | 21.9072 | 1.43387 | 95.18 | 0.53733 | 195.00 |
| | 8 | −2271.8992 | 2.0000 | | | | 194.19 |
| | 9 | 156.7233 | 17.9998 | 1.43700 | 95.10 | 0.53364 | 177.79 |
| | 10 | 314.2891 | DD[10] | | | | 175.63 |
| V | *11 | 2760.8829 | 2.0000 | 2.00069 | 25.46 | 0.61364 | 60.29 |
| | 12 | 88.7218 | 9.6426 | | | | 54.83 |
| | 13 | −82.7951 | 1.8000 | 1.84666 | 23.84 | 0.62012 | 53.75 |
| | 14 | 81.4397 | 10.0833 | | | | 51.38 |
| | 15 | −60.6418 | 1.8205 | 1.78226 | 46.61 | 0.55852 | 51.41 |
| | 16 | 160.3482 | 10.6476 | 1.85896 | 22.73 | 0.62844 | 56.21 |

TABLE 16-1-continued

Example 3b

| Sn | R | D | Nd | νd | θgF | ED |
|---|---|---|---|---|---|---|
| 17 | −71.3362 | 0.1200 | | | | 57.17 |
| 18 | 121.7690 | 11.7529 | 1.77047 | 29.74 | 0.59514 | 58.00 |
| 19 | −73.9168 | 1.8000 | 1.77250 | 49.62 | 0.55038 | 58.23 |
| 20 | 163.4954 | DD[20] | | | | 59.32 |
| 21 | 388.3735 | 14.7200 | 1.52353 | 77.24 | 0.53922 | 82.40 |
| 22 | −91.2103 | 2.6000 | 1.84751 | 44.07 | 0.56176 | 82.63 |
| 23 | −148.1945 | 0.1200 | | | | 84.18 |
| 24 | −888.6636 | 2.6000 | 1.43875 | 94.94 | 0.53433 | 83.93 |
| 25 | −398.8234 | DD[25] | | | | 83.93 |
| 26 | 277.0521 | 7.0000 | 1.61914 | 63.43 | 0.54424 | 80.00 |
| 27 | −369.9721 | 1.5703 | | | | 79.94 |
| 28 | 121.9884 | 2.4000 | 1.84819 | 27.37 | 0.60872 | 78.02 |
| 29 | 73.5884 | 11.1634 | 1.49700 | 81.54 | 0.53748 | 75.41 |
| 30 | 943.3533 | DD[30] | | | | 75.05 |
| St 31 | ∞ | 7.9881 | | | | 50.27 |

TABLE 16-2

Example 3b

| | Sn | R | D | Nd | νd | θgF | ED | MDA |
|---|---|---|---|---|---|---|---|---|
| M1 | 32 | −172.3657 | 1.8000 | 1.81755 | 46.25 | 0.55807 | 47.47 | |
| | 33 | 750.3863 | 0.1200 | | | | 47.05 | |
| | 34 | 46.6290 | 9.5525 | 1.85229 | 26.13 | 0.61344 | 46.19 | |
| | 35 | 58.7421 | 12.5873 | | | | 41.93 | |
| | 36 | −922.8813 | 5.5698 | 1.64959 | 39.86 | 0.57760 | 38.50 | |
| | 37 | −148.5370 | 1.8000 | 1.83368 | 44.63 | 0.56103 | 37.47 | |
| | 38 | 92.5695 | 10.8535 | | | | 36.62 | |
| | 39 | 106.9665 | 4.5245 | 1.65747 | 34.78 | 0.59125 | 36.76 | |
| | 40 | −113.7348 | 1.8355 | | | | 36.57 | |
| | 41 | −74.2043 | 1.1300 | 1.82835 | 29.63 | 0.60192 | 36.09 | |
| | 42 | 74.1297 | 6.8171 | 1.57741 | 43.21 | 0.57289 | 36.06 | |
| | 43 | −61.6629 | 8.0359 | | | | 36.20 | |
| M2b | 44 | 77.7298 | 5.4455 | 1.52240 | 64.36 | 0.53831 | 36.40 | 33.16 |
| | 45 | −96.1802 | 3.8331 | | | | 36.18 | |
| | 46 | −81.7655 | 1.8100 | 1.73806 | 43.62 | 0.56652 | 34.58 | |
| | 47 | 40.3155 | 10.5610 | 1.73813 | 28.57 | 0.60743 | 34.17 | |
| | 48 | −93.8375 | 2.0455 | | | | 33.89 | |
| | 49 | 730.9629 | 4.3235 | 1.56655 | 44.00 | 0.57162 | 32.46 | |
| | 50 | −46.4521 | 1.8751 | 1.90044 | 37.87 | 0.57583 | 32.14 | |
| | 51 | 57.2858 | 15.5316 | | | | 31.62 | 23.08 |
| M3 | 52 | 122.8529 | 6.4001 | 1.69502 | 30.60 | 0.60244 | 37.39 | |
| | *53 | −59.7868 | 6.6771 | | | | 37.60 | |
| | 54 | 104.0447 | 6.5101 | 1.55020 | 72.28 | 0.53973 | 34.80 | |
| | 55 | −57.7630 | 1.1000 | 1.77991 | 40.99 | 0.57114 | 34.10 | |
| | 56 | 42.1309 | 1.9686 | | | | 32.96 | |
| | 57 | 34.9865 | 11.9655 | 1.43875 | 94.94 | 0.53433 | 34.16 | |
| | 58 | −27.2937 | 1.2000 | 1.85517 | 42.48 | 0.56506 | 34.02 | |
| | 59 | 38.4508 | 11.3481 | 1.52536 | 57.38 | 0.54841 | 37.37 | |
| | 60 | −42.1912 | 4.5734 | | | | 38.57 | |
| | 61 | −68.7714 | 4.2398 | 1.65918 | 34.52 | 0.59198 | 41.38 | |
| | *62 | −54.4832 | 43.4700 | | | | 42.35 | |

TABLE 17

Example 3b

| | Wide | Middle | Tele |
|---|---|---|---|
| Zr | 1.00 | 19.87 | 38.60 |
| f | 37.19 | 738.92 | 1435.71 |
| Bf | 43.46 | 43.46 | 43.46 |
| FNo. | 4.16 | 4.98 | 7.41 |
| 2ω[°] | 60.38 | 3.20 | 1.66 |
| DD[10] | 3.90 | 145.22 | 152.35 |
| DD[20] | 255.75 | 47.41 | 4.62 |
| DD[25] | 38.04 | 13.27 | 1.99 |
| DD[30] | 7.38 | 99.18 | 146.13 |

TABLE 18

Example 3b

| Sn | 11 | 53 | 62 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.2167690E−07 | 1.5627011E−06 | −4.2288575E−06 |
| A5 | 3.1277183E−09 | −2.7703508E−08 | −2.5524310E−07 |
| A6 | −6.0770255E−10 | 6.3084999E−09 | 2.0152538E−08 |
| A7 | 5.6806544E−11 | −5.0916775E−10 | −1.1401201E−09 |
| A8 | −1.4354615E−12 | 9.8318597E−12 | 5.7630965E−11 |
| A9 | −1.1293572E−13 | −1.1083597E−13 | −2.0591703E−12 |
| A10 | 1.0463864E−14 | 2.7627818E−14 | 1.6288926E−14 |
| A11 | −3.6391921E−16 | −3.1412215E−16 | 8.2684211E−16 |
| A12 | 9.9530738E−18 | −1.8204303E−17 | −5.8233717E−17 |
| A13 | −5.1327913E−19 | −2.3870878E−18 | 2.8554016E−18 |
| A14 | 2.2460698E−20 | 1.2631340E−19 | −8.2037001E−20 |
| A15 | −4.8377063E−22 | −2.8563853E−21 | 3.1265177E−21 |
| A16 | 3.9670874E−24 | 6.5812603E−23 | −8.7649039E−23 |

Example 4a

Figure 17:
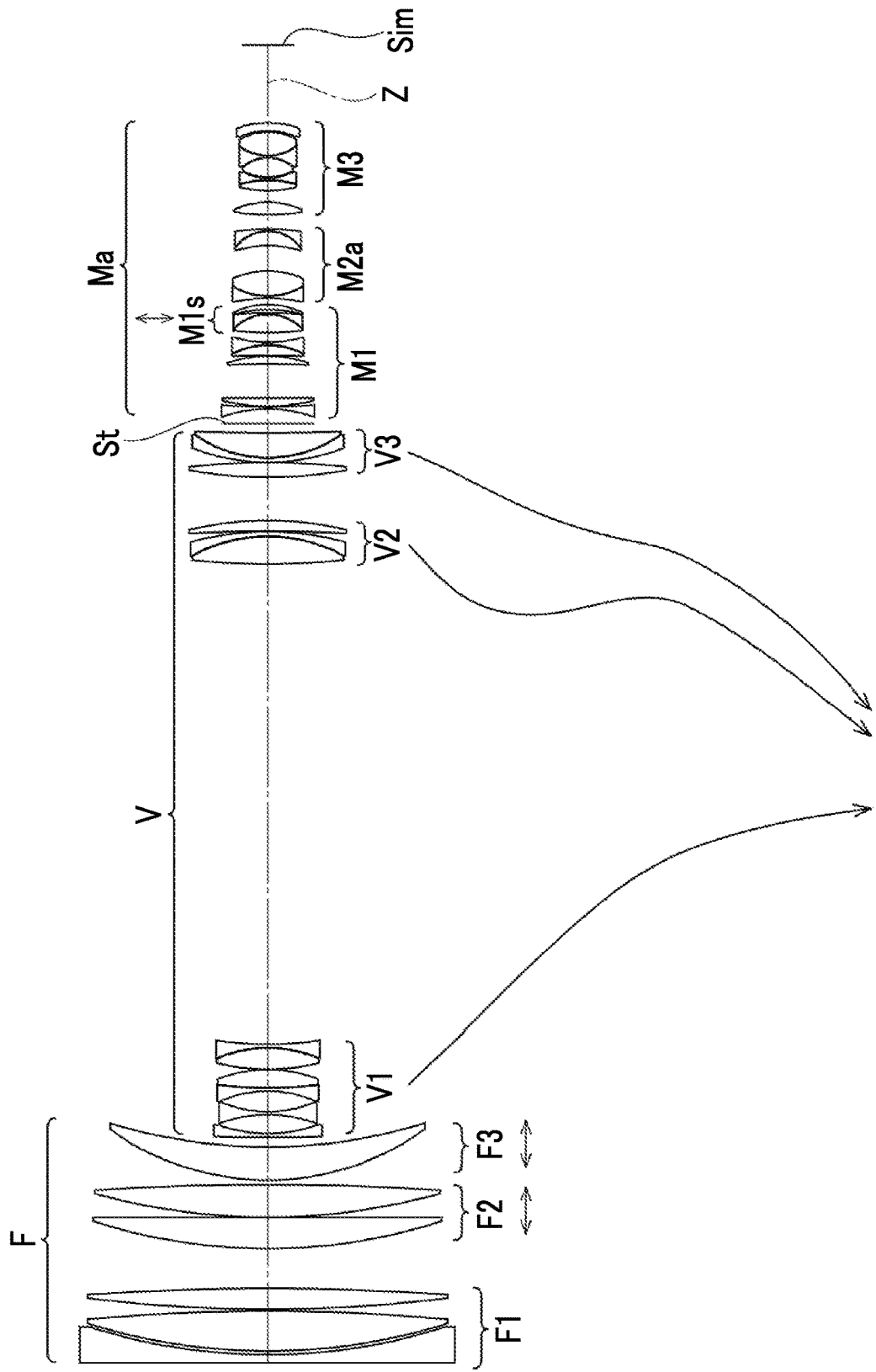

FIG. 17 shows a configuration and movement loci of the zoom lens according to Example 4a. The zoom lens according to Example 4a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. During focusing, the F1 lens group F1 remains stationary with respect to the image plane Sim, and the F2 lens group F2 and the F3 lens group F3 move along the optical axis Z by changing the mutual spacing. The variable magnification part V consists of, in order from the object side to the image side, a V1 lens group V1 that has a negative refractive power, a V2 lens group V2 that has a positive refractive power, and a V3 lens group V3 that has a positive refractive power. During magnification change, the V1 lens group V1, the V2 lens group V2, and the V3 lens group V3 move along the optical axis Z by changing the spacing between adjacent groups. The imaging part Ma consists of, in order from the object side to the image side, an M1 lens group M1, an M2a lens group M2a, and an M3 lens group M3. The M1 lens group M1 includes the vibration-proof group M1s closest to the image side. The M2a lens group M2a is replaceable with the M2b lens group M2b according to Example 4b.

Figure 19:
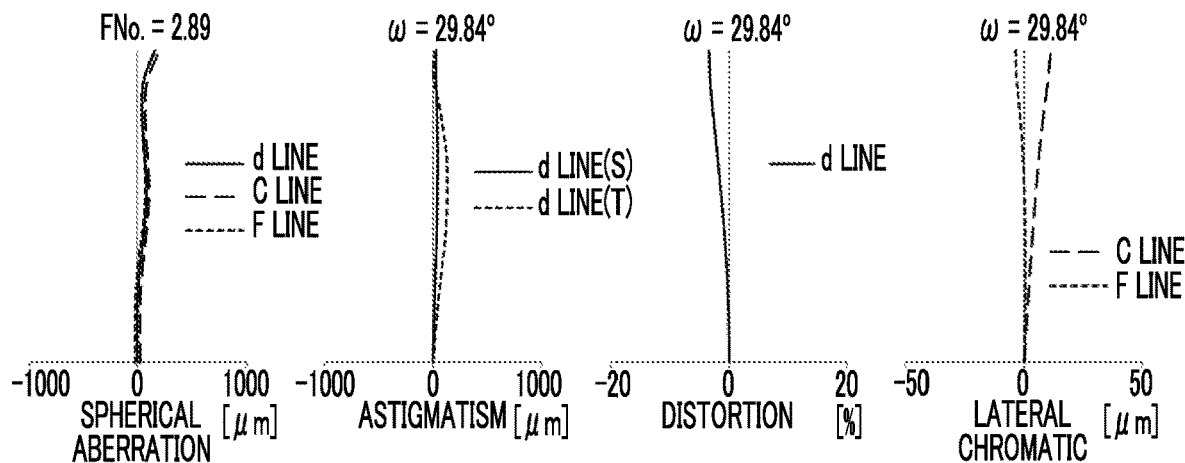
Figure 19:
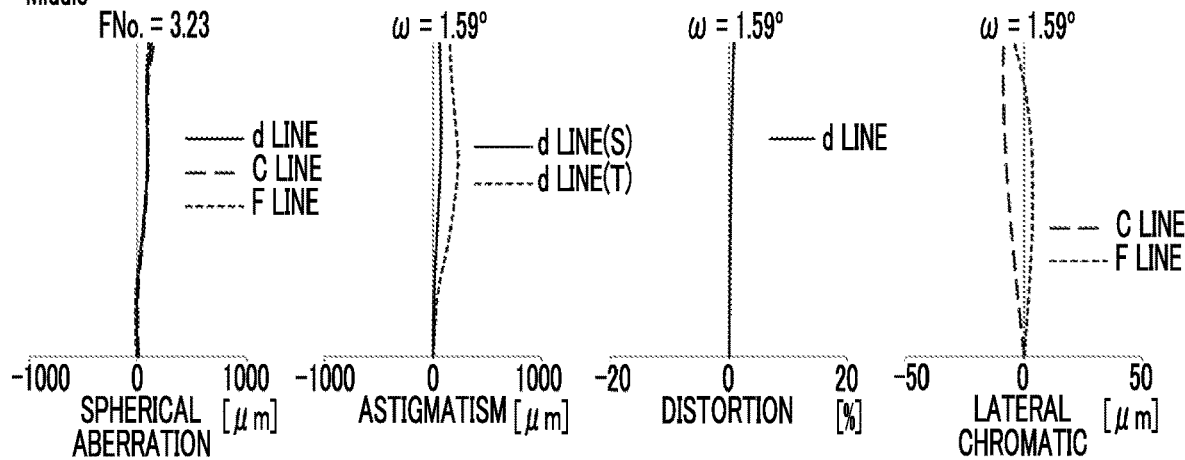
Figure 19:
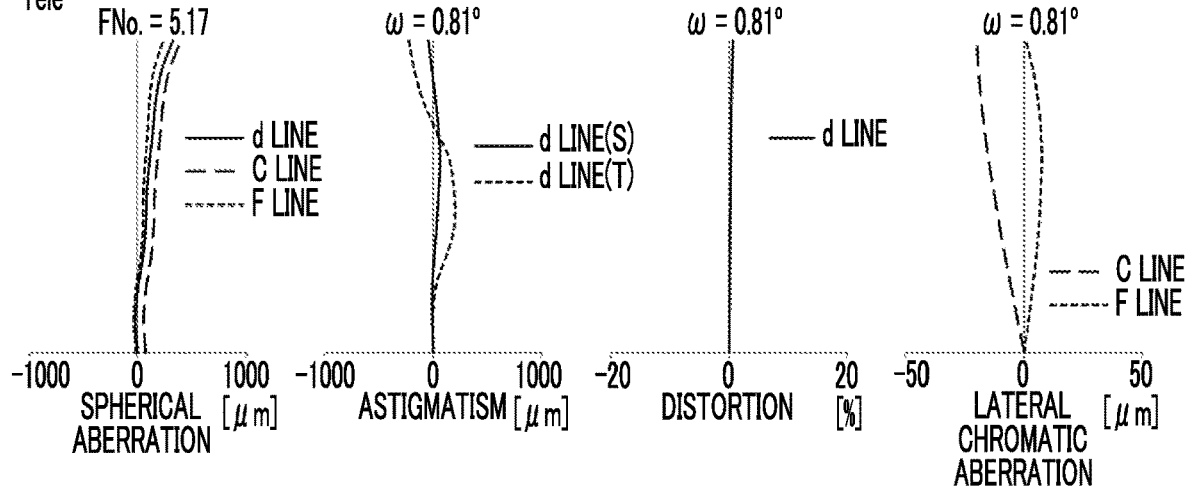

Regarding the zoom lens according to Example 4a, Tables 19-1 and 19-2 show basic lens data, Table 20 shows specifications and variable surface spacings, and Table 21 shows aspherical coefficients thereof. FIG. 19 shows aberration diagrams. The 43rd to 47th surfaces of Table 19-2 correspond to the vibration-proof group M1s.

TABLE 19-1

Example 4a

|   | Sn | R | D | Nd | vd | θgF | ED |
|---|----|---|---|----|----|-----|----|
| F | 1 | ∞ | 4.4000 | 1.83481 | 42.73 | 0.56481 | 212.00 |
|   | 2 | 347.8070 | 2.0200 | | | | 202.57 |
|   | 3 | 358.8084 | 21.9900 | 1.43387 | 95.18 | 0.53733 | 203.08 |
|   | 4 | −1120.1699 | 1.0000 | | | | 203.27 |
|   | 5 | 884.2759 | 11.4200 | 1.43387 | 95.18 | 0.53733 | 203.54 |
|   | 6 | −1520.9423 | 21.8500 | | | | 203.43 |

TABLE 19-1-continued

Example 4a

|   | Sn | R | D | Nd | vd | θgF | ED |
|---|----|---|---|----|----|-----|----|
|   | 7 | 338.8734 | 17.1300 | 1.43387 | 95.18 | 0.53733 | 198.00 |
|   | 8 | ∞ | 0.1200 | | | | 197.66 |
|   | 9 | 380.9876 | 18.1800 | 1.43387 | 95.18 | 0.53733 | 195.00 |
|   | 10 | −1520.9400 | 2.4400 | | | | 194.31 |
|   | 11 | 159.2262 | 18.2800 | 1.43700 | 95.10 | 0.53364 | 176.07 |
|   | 12 | 315.5803 | DD[12] | | | | 173.29 |
| V | *13 | ∞ | 2.0000 | 2.00069 | 25.46 | 0.61364 | 61.36 |
|   | 14 | 83.6756 | 10.2700 | | | | 55.58 |
|   | 15 | −84.8016 | 1.8000 | 1.68960 | 31.09 | 0.60333 | 54.38 |
|   | 16 | 71.6943 | 11.3700 | | | | 51.40 |
|   | 17 | −66.8766 | 1.8100 | 1.80420 | 46.50 | 0.55727 | 51.50 |
|   | 18 | 276.4700 | 9.9900 | 1.84666 | 23.83 | 0.61603 | 54.83 |
|   | 19 | −80.5612 | 0.1200 | | | | 56.21 |
|   | 20 | 125.2721 | 11.7500 | 1.79504 | 28.69 | 0.60656 | 57.00 |
|   | 21 | −77.0576 | 1.8300 | 1.80420 | 46.50 | 0.55727 | 57.34 |
|   | 22 | 189.6799 | DD[22] | | | | 58.48 |
|   | 23 | 459.4027 | 15.2200 | 1.52841 | 76.45 | 0.53954 | 85.29 |
|   | 24 | −93.2124 | 2.6000 | 1.85150 | 40.78 | 0.56958 | 85.42 |
|   | 25 | −173.1179 | 0.1200 | | | | 87.00 |
|   | 26 | −862.2295 | 6.0000 | 1.43700 | 95.10 | 0.53364 | 86.94 |
|   | 27 | −195.5039 | DD[27] | | | | 87.00 |
|   | 28 | 274.6642 | 8.3000 | 1.59282 | 68.62 | 0.54414 | 87.50 |
|   | 29 | −373.0811 | 0.1500 | | | | 87.39 |
|   | 30 | 124.6802 | 2.4000 | 1.85883 | 30.00 | 0.59793 | 85.13 |
|   | 31 | 75.0450 | 13.8200 | 1.49782 | 82.57 | 0.53862 | 81.94 |
|   | 32 | 1426.5737 | DD[32] | | | | 81.36 |
| St | 33 | ∞ | 8.0300 | | | | 51.62 |

TABLE 19-2

Example 4a

|   | Sn | R | D | Nd | vd | θgF | ED | MDA |
|---|----|---|---|----|----|-----|----|-----|
| M1 | 34 | −79.6572 | 1.1340 | 1.51680 | 64.13 | 0.53566 | 49.87 | |
|   | 35 | 350.0599 | 0.2710 | | | | 49.60 | |
|   | 36 | 109.6606 | 4.5390 | 1.79504 | 28.69 | 0.60656 | 49.61 | |
|   | 37 | −2501.0853 | 18.7940 | | | | 49.30 | |
|   | 38 | −372.7197 | 4.4000 | 1.54072 | 47.20 | 0.56784 | 42.33 | |
|   | 39 | −67.9860 | 0.1260 | | | | 41.99 | |
|   | 40 | −1329.1987 | 5.6780 | 1.51742 | 52.20 | 0.55800 | 39.53 | |
|   | 41 | −47.5015 | 1.1340 | 1.80420 | 46.50 | 0.55727 | 38.76 | |
|   | 42 | 70.4605 | 5.4300 | | | | 37.04 | |
|   | 43 | 177.5307 | 10.0100 | 1.56732 | 42.96 | 0.57434 | 37.21 | |
|   | 44 | −27.7081 | 0.8000 | 1.68960 | 31.05 | 0.60339 | 37.10 | |
|   | 45 | −224.8714 | 1.7220 | | | | 37.67 | |
|   | 46 | −75.7515 | 2.6920 | 1.64000 | 60.19 | 0.53772 | 37.67 | |
|   | 47 | −47.8527 | 3.6900 | | | | 37.92 | |
| M2a | 48 | −88.2029 | 1.1300 | 1.84850 | 43.79 | 0.56197 | 36.77 | 36.76 |
|   | 49 | 40.4132 | 13.6800 | 1.69895 | 30.05 | 0.60282 | 37.44 | |
|   | 50 | −52.1437 | 14.0000 | | | | 38.49 | |
|   | 51 | −61.1438 | 7.8900 | 1.78590 | 44.20 | 0.56317 | 35.07 | |
|   | 52 | −23.9147 | 1.1500 | 1.78472 | 25.68 | 0.61621 | 35.44 | |
|   | 53 | −130.5719 | 8.2100 | | | | 36.61 | 36.50 |
| M3 | 54 | 132.1314 | 6.9900 | 1.74000 | 28.30 | 0.60790 | 37.20 | |
|   | *55 | −43.1140 | 6.3400 | | | | 37.25 | |
|   | 56 | 68.8567 | 5.6300 | 1.43700 | 95.10 | 0.53364 | 30.27 | |
|   | 57 | −57.4786 | 1.1300 | 1.75500 | 52.34 | 0.54761 | 29.14 | |
|   | 58 | 31.5567 | 0.5000 | | | | 27.11 | |
|   | 59 | 30.4077 | 10.6500 | 1.49782 | 82.57 | 0.53862 | 27.19 | |
|   | 60 | −23.4879 | 1.2000 | 1.91082 | 35.25 | 0.58224 | 26.35 | |
|   | 61 | 27.7466 | 13.1400 | 1.62004 | 36.26 | 0.58800 | 27.29 | |
|   | 62 | −32.6418 | 0.5000 | | | | 29.40 | |
|   | 63 | −42.1020 | 4.3000 | 1.71736 | 29.52 | 0.60483 | 29.34 | |
|   | *64 | −77.9005 | 42.8500 | | | | 30.69 | |

TABLE 20

Example 4a

|  | Wide | Middle | Tele |
|---|---|---|---|
| Zr | 1.00 | 19.87 | 38.86 |
| f | 25.77 | 511.54 | 1000.44 |
| Bf | 42.85 | 42.88 | 42.96 |
| FNo. | 2.89 | 3.23 | 5.17 |
| 2ω[°] | 59.68 | 3.18 | 1.62 |
| DD[12] | 5.31 | 151.35 | 159.44 |
| DD[22] | 264.17 | 49.37 | 4.56 |
| DD[27] | 23.79 | 6.72 | 2.43 |
| DD[32] | 5.08 | 90.91 | 131.91 |

TABLE 21

Example 4a

| Sn | 13 | 55 | 64 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.3333062E−07 | 3.5404193E−06 | −8.0593104E−06 |
| A5 | −1.4456577E−08 | 1.0888558E−08 | −3.5445040E−07 |
| A6 | 1.1459126E−09 | 6.0202029E−09 | 2.1037716E−08 |
| A7 | 2.6026508E−11 | −1.1627046E−09 | −3.8751167E−10 |
| A8 | −6.1882849E−12 | 5.4983376E−11 | 3.9855400E−11 |
| A9 | 4.6400323E−14 | 5.0595051E−15 | −4.8150830E−12 |
| A10 | 1.8661754E−14 | −1.7987972E−14 | 9.6357690E−14 |
| A11 | −5.8437683E−16 | −2.3007123E−15 | −3.7681748E−15 |
| A12 | −8.7968378E−18 | 5.0188542E−17 | 5.5927332E−16 |
| A13 | −3.9887545E−20 | −6.9629980E−19 | 1.6583585E−17 |
| A14 | 4.6714273E−20 | 1.5760078E−19 | −6.0729530E−18 |
| A15 | −1.5483061E−21 | −3.6295614E−21 | 3.7438451E−19 |
| A16 | 1.5326036E−23 | −1.5482897E−24 | −7.9003931E−21 |

Example 4b

Figure 18:
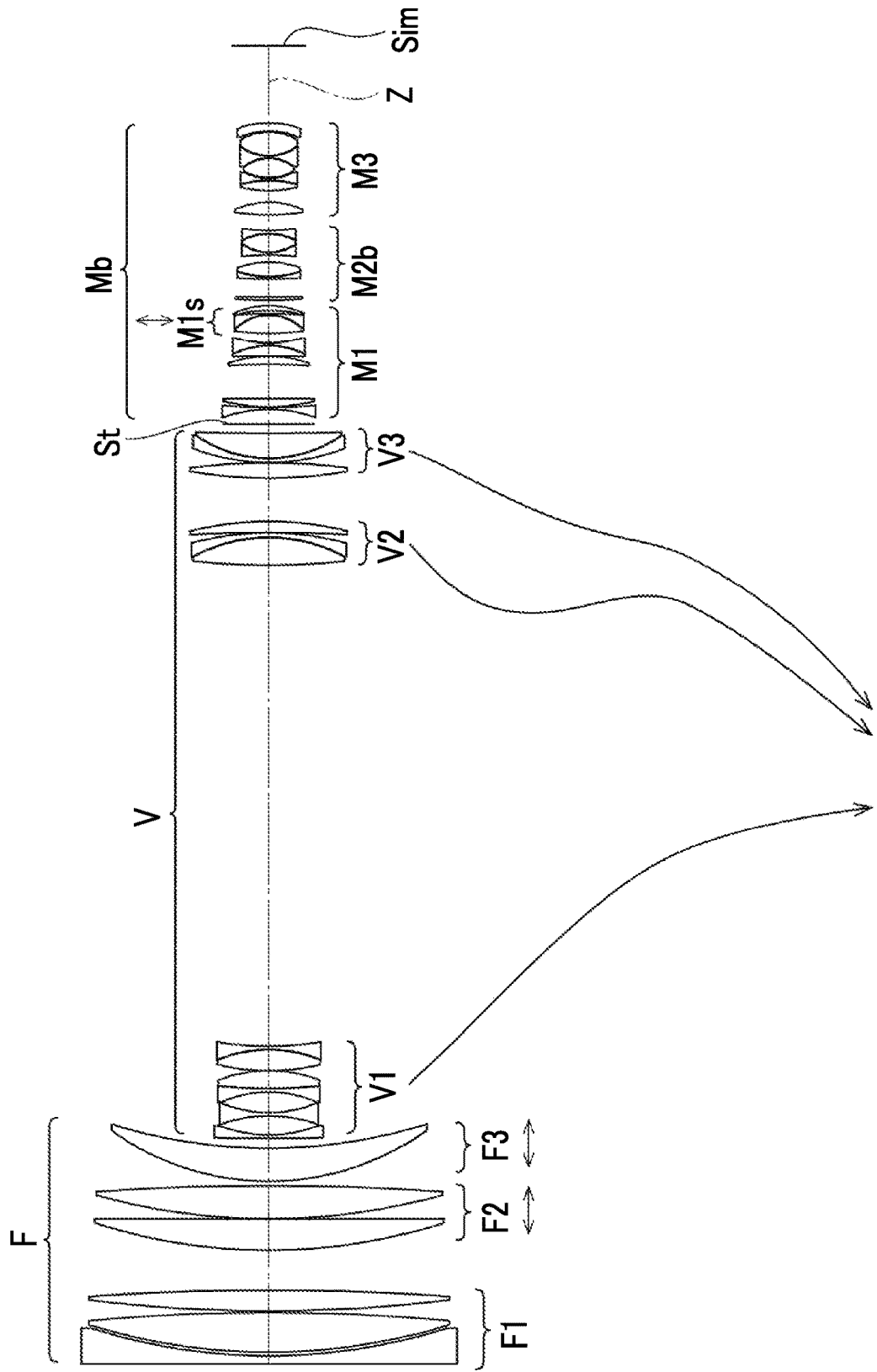
FIG. 18 is a diagram showing a configuration and a movement locus of a zoom lens according to Example 4b.

FIG. 18 shows a configuration and movement loci of the zoom lens according to Example 4b. In the zoom lens according to Example 4b, the M2a lens group M2a of the zoom lens according to Example 4a is replaced with the M2b lens group M2b according to Example 4b. The focusing part F, the variable magnification part V, the aperture stop St, the M1 lens group M1, and the M3 lens group M3 of the zoom lens according to Example 4b are common to those of the zoom lens according to Example 4a.

Figure 20:
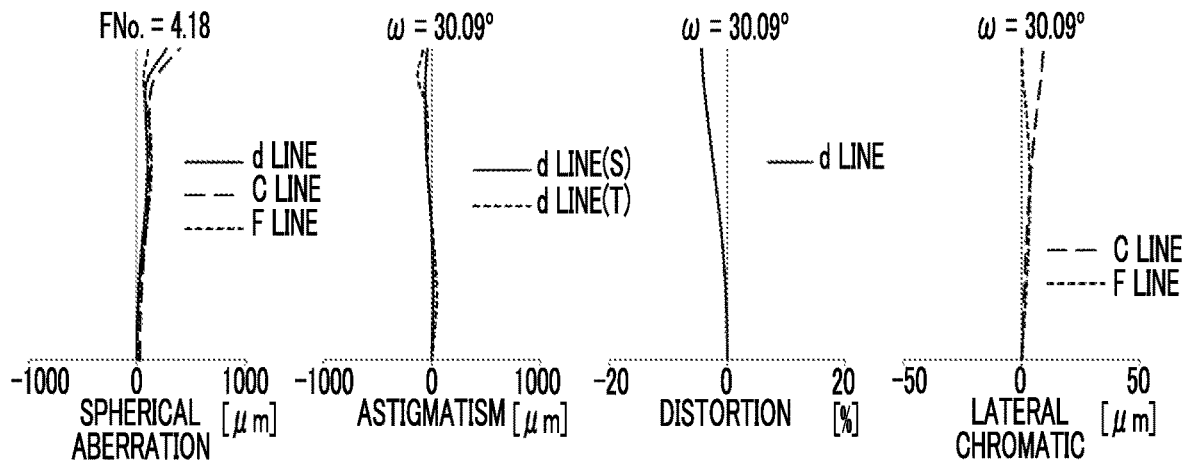
FIG. 20 is a diagram showing aberrations of the zoom lens according to Example 4b.
Figure 20:
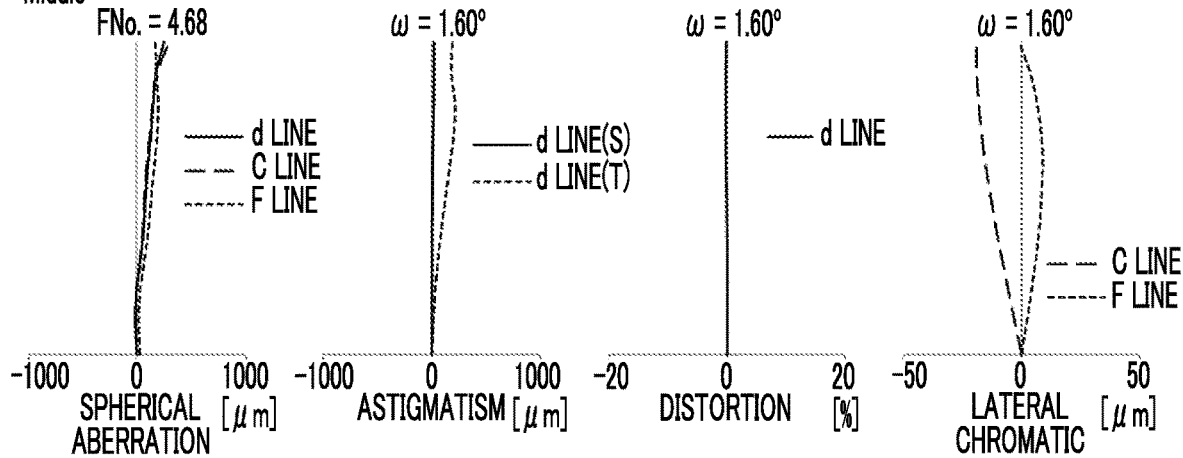
Figure 20:
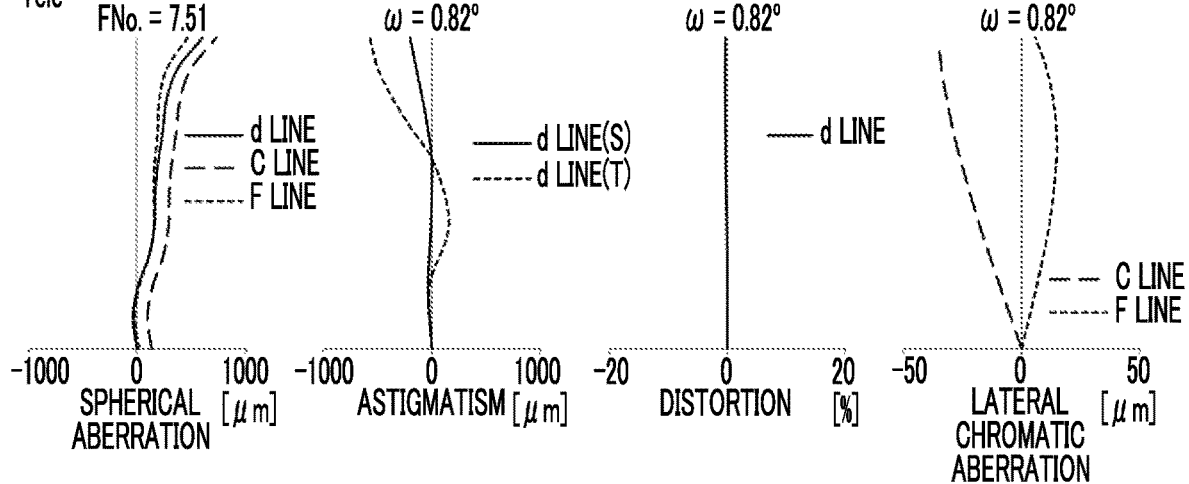

Regarding the zoom lens according to Example 4b, Tables 22-1 and 22-2 show basic lens data, Table 23 shows specifications and variable surface spacings, and Table 24 shows aspherical coefficients thereof. FIG. 20 shows aberration diagrams.

TABLE 22-1

Example 4b

|  | Sn | R | D | Nd | vd | θgF | ED |
|---|---|---|---|---|---|---|---|
| F | 1 | ∞ | 4.4000 | 1.83481 | 42.73 | 0.56481 | 212.00 |
|  | 2 | 347.8070 | 2.0200 |  |  |  | 202.57 |
|  | 3 | 358.8084 | 21.9900 | 1.43387 | 95.18 | 0.53733 | 203.08 |
|  | 4 | −1120.1699 | 1.0000 |  |  |  | 203.27 |
|  | 5 | 884.2759 | 11.4200 | 1.43387 | 95.18 | 0.53733 | 203.54 |
|  | 6 | −1520.9423 | 21.8500 |  |  |  | 203.43 |
|  | 7 | 338.8734 | 17.1300 | 1.43387 | 95.18 | 0.53733 | 198.00 |
|  | 8 | ∞ | 0.1200 |  |  |  | 197.66 |
|  | 9 | 380.9876 | 18.1800 | 1.43387 | 95.18 | 0.53733 | 195.00 |
|  | 10 | −1520.9400 | 2.4400 |  |  |  | 194.31 |
|  | 11 | 159.2262 | 18.2800 | 1.43700 | 95.10 | 0.53364 | 176.07 |
|  | 12 | 315.5803 | DD[12] |  |  |  | 173.29 |
| V | *13 | ∞ | 2.0000 | 2.00069 | 25.46 | 0.61364 | 61.36 |
|  | 14 | 83.6756 | 10.2700 |  |  |  | 55.58 |
|  | 15 | −84.8016 | 1.8000 | 1.68960 | 31.09 | 0.60333 | 54.38 |
|  | 16 | 71.6943 | 11.3700 |  |  |  | 51.40 |
|  | 17 | −66.8766 | 1.8100 | 1.80420 | 46.50 | 0.55727 | 51.50 |
|  | 18 | 276.4700 | 9.9900 | 1.84666 | 23.83 | 0.61603 | 54.83 |
|  | 19 | −80.5612 | 0.1200 |  |  |  | 56.21 |
|  | 20 | 125.2721 | 11.7500 | 1.79504 | 28.69 | 0.60656 | 57.00 |
|  | 21 | −77.0576 | 1.8300 | 1.80420 | 46.50 | 0.55727 | 57.34 |
|  | 22 | 189.6799 | DD[22] |  |  |  | 58.48 |
|  | 23 | 459.4027 | 15.2200 | 1.52841 | 76.45 | 0.53954 | 85.29 |
|  | 24 | −93.2124 | 2.6000 | 1.85150 | 40.78 | 0.56958 | 85.42 |
|  | 25 | −173.1179 | 0.1200 |  |  |  | 87.00 |
|  | 26 | −862.2295 | 6.0000 | 1.43700 | 95.10 | 0.53364 | 86.94 |
|  | 27 | −195.5039 | DD[27] |  |  |  | 87.00 |
|  | 28 | 274.6642 | 8.3000 | 1.59282 | 68.62 | 0.54414 | 87.50 |
|  | 29 | −373.0811 | 0.1500 |  |  |  | 87.39 |
|  | 30 | 124.6802 | 2.4000 | 1.85883 | 30.00 | 0.59793 | 85.13 |
|  | 31 | 75.0450 | 13.8200 | 1.49782 | 82.57 | 0.53862 | 81.94 |
|  | 32 | 1426.5737 | DD[32] |  |  |  | 81.36 |
| St | 33 | ∞ | 8.0300 |  |  |  | 51.62 |

TABLE 22-2

Example 4b

|  | Sn | R | D | Nd | vd | θgF | ED | MDA |
|---|---|---|---|---|---|---|---|---|
| M1 | 34 | −79.6572 | 1.1340 | 1.51680 | 64.13 | 0.53566 | 49.87 |  |
|  | 35 | 350.0599 | 0.2710 |  |  |  | 49.60 |  |
|  | 36 | 109.6606 | 4.5390 | 1.79504 | 28.69 | 0.60656 | 49.61 |  |
|  | 37 | −2501.0853 | 18.7940 |  |  |  | 49.30 |  |
|  | 38 | −372.7197 | 4.4000 | 1.54072 | 47.20 | 0.56784 | 42.32 |  |
|  | 39 | −67.9860 | 0.1260 |  |  |  | 41.98 |  |
|  | 40 | −1329.1987 | 5.6780 | 1.51742 | 52.20 | 0.55800 | 39.53 |  |
|  | 41 | −47.5015 | 1.1340 | 1.80420 | 46.50 | 0.55727 | 38.75 |  |
|  | 42 | 70.4605 | 5.4300 |  |  |  | 37.04 |  |
|  | 43 | 177.5307 | 10.0100 | 1.56732 | 42.96 | 0.57434 | 37.18 |  |
|  | 44 | −27.7081 | 0.8000 | 1.68960 | 31.05 | 0.60339 | 37.08 |  |
|  | 45 | −224.8714 | 1.7220 |  |  |  | 37.66 |  |
|  | 46 | −75.7515 | 2.6920 | 1.64000 | 60.19 | 0.53772 | 37.66 |  |
|  | 47 | −47.8527 | 3.1100 |  |  |  | 37.91 |  |
| M2b | 48 | 386.3713 | 1.8200 | 1.94595 | 17.98 | 0.65460 | 36.40 | 36.40 |
|  | 49 | ∞ | 9.8500 |  |  |  | 36.26 |  |

TABLE 22-2-continued

Example 4b

| | Sn | R | D | Nd | vd | θgF | ED | MDA |
|---|---|---|---|---|---|---|---|---|
| | 50 | 409.0951 | 1.1300 | 1.52841 | 76.45 | 0.53954 | 34.26 | |
| | 51 | 56.0254 | 8.0100 | 1.53172 | 48.84 | 0.56309 | 33.73 | |
| | 52 | −52.4927 | 3.8700 | | | | 33.30 | |
| | 53 | −137.3427 | 1.4700 | 1.71700 | 47.97 | 0.55852 | 29.47 | |
| | 54 | 28.1737 | 10.1900 | 1.58144 | 40.75 | 0.57757 | 27.84 | |
| | 55 | −34.1457 | 1.8200 | 1.90366 | 31.27 | 0.59487 | 27.09 | |
| | 56 | 136.0978 | 8.4800 | | | | 27.00 | 24.39 |
| M3 | 57 | 132.1314 | 6.9900 | 1.74000 | 28.30 | 0.60790 | 30.56 | |
| | *58 | −43.1140 | 6.3400 | | | | 31.01 | |
| | 59 | 68.8567 | 5.6300 | 1.43700 | 95.10 | 0.53364 | 28.11 | |
| | 60 | −57.4786 | 1.1300 | 1.75500 | 52.34 | 0.54761 | 27.30 | |
| | 61 | 31.5567 | 0.5000 | | | | 26.35 | |
| | 62 | 30.4077 | 10.6500 | 1.49782 | 82.57 | 0.53862 | 26.65 | |
| | 63 | −23.4879 | 1.2000 | 1.91082 | 35.25 | 0.58224 | 26.44 | |
| | 64 | 27.7466 | 13.1400 | 1.62004 | 36.26 | 0.58800 | 28.66 | |
| | 65 | −32.6418 | 0.5000 | | | | 31.47 | |
| | 66 | −42.1020 | 4.3000 | 1.71736 | 29.52 | 0.60483 | 31.81 | |
| | *67 | −77.9005 | 42.8400 | | | | 33.99 | |

TABLE 23

Example 4b

| | Wide | Middle | Tele |
|---|---|---|---|
| Zr | 1.00 | 19.87 | 38.86 |
| f | 37.27 | 740.15 | 1448.91 |
| Bf | 42.84 | 42.90 | 43.07 |
| FNo. | 4.18 | 4.68 | 7.51 |
| 2ω[°] | 60.18 | 3.20 | 1.64 |
| DD[12] | 5.31 | 151.35 | 159.44 |
| DD[22] | 264.17 | 49.37 | 4.56 |
| DD[27] | 23.79 | 6.72 | 2.43 |
| DD[32] | 5.08 | 90.91 | 131.91 |

TABLE 24

Example 4b

| Sn | 13 | 58 | 67 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.3333062E−07 | 3.5404193E−06 | −8.0593104E−06 |
| A5 | −1.4456577E−08 | 1.0888558E−08 | −3.5445040E−07 |
| A6 | 1.1459126E−09 | 6.0202029E−09 | 2.1037716E−08 |
| A7 | 2.6026508E−11 | −1.1627046E−09 | −3.8751167E−10 |
| A8 | −6.1882849E−12 | 5.4983376E−11 | 3.9855400E−11 |
| A9 | 4.6400323E−14 | 5.0595051E−15 | −4.8150830E−12 |
| A10 | 1.8661754E−14 | −1.7987972E−14 | 9.6357690E−14 |
| A11 | −5.8437683E−16 | −2.3007123E−15 | −3.7681748E−15 |
| A12 | −8.7968378E−18 | 5.0188542E−17 | 5.5927332E−16 |
| A13 | −3.9887545E−20 | −6.9629980E−19 | 1.6583585E−17 |
| A14 | 4.6714273E−20 | 1.5760078E−19 | −6.0729530E−18 |
| A15 | −1.5483061E−21 | −3.6295614E−21 | 3.7438451E−19 |
| A16 | 1.5326036E−23 | −1.5482897E−24 | −7.9003931E−21 |

Example 5a

Figure 21:
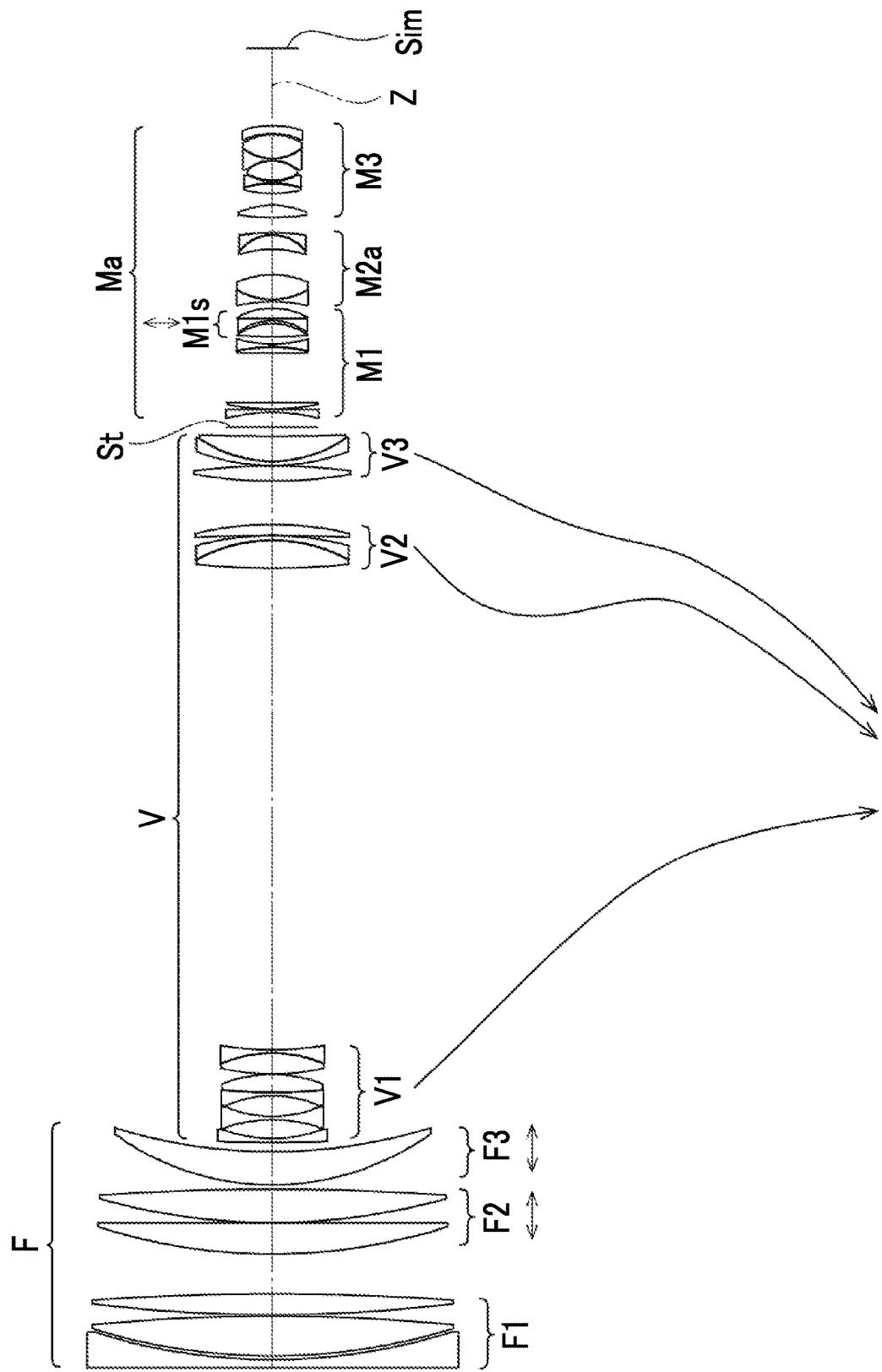

FIG. 21 shows a configuration and movement loci of the zoom lens according to Example 5a. The zoom lens according to Example 5a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. During focusing, the F1 lens group F1 remains stationary with respect to the image plane Sim, and the F2 lens group F2 and the F3 lens group F3 move along the optical axis Z by changing the mutual spacing. The variable magnification part V consists of, in order from the object side to the image side, a V1 lens group V1 that has a negative refractive power, a V2 lens group V2 that has a positive refractive power, and a V3 lens group V3 that has a positive refractive power. During magnification change, the V1 lens group V1, the V2 lens group V2, and the V3 lens group V3 move along the optical axis Z by changing the spacing between adjacent groups. The imaging part Ma consists of, in order from the object side to the image side, an M1 lens group M1, an M2a lens group M2a, and an M3 lens group M3. The M1 lens group M1 includes the vibration-proof group M1s closest to the image side. The M2a lens group M2a is replaceable with the M2b lens group M2b according to Example 5b.

Figure 23:
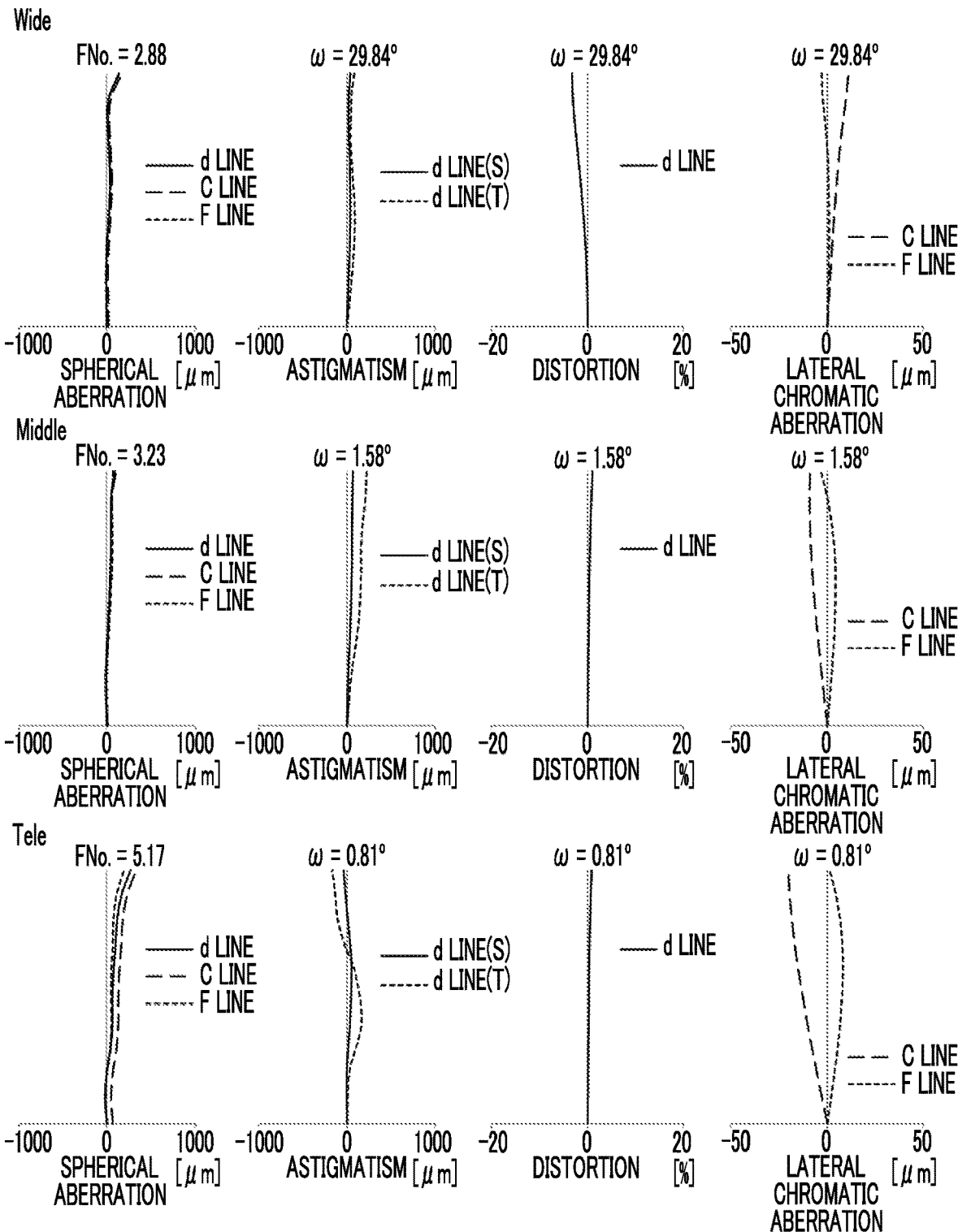

Regarding the zoom lens according to Example 5a, Tables 25-1 and 25-2 show basic lens data, Table 26 shows specifications and variable surface spacings, and Table 27 shows aspherical coefficients thereof. FIG. 23 shows aberration diagrams. The 41st to 45th surfaces of Table 25-2 correspond to the vibration-proof group M1s.

TABLE 25-1

Example 5a

| | Sn | R | D | Nd | vd | θgF | ED |
|---|---|---|---|---|---|---|---|
| F | 1 | ∞ | 4.4000 | 1.83481 | 42.73 | 0.56481 | 212.00 |
| | 2 | 347.8070 | 2.0200 | | | | 202.57 |
| | 3 | 358.8084 | 21.9900 | 1.43387 | 95.18 | 0.53733 | 203.07 |
| | 4 | −1120.1699 | 1.0000 | | | | 203.27 |
| | 5 | 884.2759 | 11.4200 | 1.43387 | 95.18 | 0.53733 | 203.54 |
| | 6 | −1520.9423 | 21.8500 | | | | 203.43 |
| | 7 | 338.8734 | 17.1300 | 1.43387 | 95.18 | 0.53733 | 198.00 |
| | 8 | ∞ | 0.1200 | | | | 197.66 |
| | 9 | 380.9876 | 18.1800 | 1.43387 | 95.18 | 0.53733 | 195.00 |
| | 10 | −1520.9400 | 2.4400 | | | | 194.30 |
| | 11 | 159.2262 | 18.2800 | 1.43700 | 95.10 | 0.53364 | 178.41 |
| | 12 | 315.5803 | DD[12] | | | | 175.60 |
| V | *13 | ∞ | 2.0000 | 2.00069 | 25.46 | 0.61364 | 61.34 |
| | 14 | 83.6756 | 10.2700 | | | | 55.57 |
| | 15 | −84.8016 | 1.8000 | 1.68960 | 31.14 | 0.60319 | 54.36 |
| | 16 | 71.6943 | 11.3700 | | | | 51.39 |
| | 17 | −66.8766 | 1.8100 | 1.80420 | 46.50 | 0.55727 | 51.49 |
| | 18 | 276.4700 | 9.9900 | 1.84666 | 23.83 | 0.61603 | 54.82 |
| | 19 | −80.5612 | 0.1200 | | | | 56.20 |
| | 20 | 125.2721 | 11.7500 | 1.79504 | 28.69 | 0.60656 | 57.00 |

TABLE 25-1-continued

Example 5a

| Sn | R | D | Nd | vd | θgF | ED |
|---|---|---|---|---|---|---|
| 21 | −77.4063 | 1.8300 | 1.80420 | 46.50 | 0.55727 | 57.34 |
| 22 | 189.6799 | DD[22] | | | | 58.49 |
| 23 | 459.4027 | 15.2200 | 1.52841 | 76.45 | 0.53954 | 85.29 |
| 24 | −93.2124 | 2.6000 | 1.85150 | 40.78 | 0.56958 | 85.42 |
| 25 | −173.1179 | 0.1200 | | | | 87.00 |
| 26 | −862.2295 | 6.0000 | 1.43700 | 95.10 | 0.53364 | 86.94 |
| 27 | −195.5039 | DD[27] | | | | 87.00 |
| 28 | 274.6642 | 8.3000 | 1.59282 | 68.62 | 0.54414 | 87.50 |
| 29 | −373.0811 | 0.1500 | | | | 87.39 |
| 30 | 124.6802 | 2.4000 | 1.85883 | 30.00 | 0.59793 | 85.13 |
| 31 | 75.0450 | 13.8200 | 1.49782 | 82.57 | 0.53862 | 81.94 |
| 32 | 1426.5737 | DD[32] | | | | 81.36 |
| St 33 | ∞ | 8.0300 | | | | 51.62 |

TABLE 25-2

Example 5a

| | Sn | R | D | Nd | vd | θgF | ED | MDA |
|---|---|---|---|---|---|---|---|---|
| M1 | 34 | −102.7377 | 1.6300 | 1.72916 | 54.61 | 0.54428 | 49.44 | |
| | 35 | ∞ | 0.1200 | | | | 49.31 | |
| | 36 | 133.5505 | 3.5000 | 1.85000 | 27.03 | 0.60935 | 49.18 | |
| | 37 | ∞ | 27.2500 | | | | 48.94 | |
| | 38 | ∞ | 3.3100 | 1.59270 | 35.31 | 0.59336 | 38.87 | |
| | 39 | −93.9150 | 1.2800 | 1.72916 | 54.61 | 0.54428 | 38.57 | |
| | 40 | 79.3508 | 4.0600 | | | | 37.60 | |
| | 41 | 333.4172 | 7.2500 | 1.53172 | 48.84 | 0.56309 | 37.73 | |
| | 42 | −36.7110 | 1.6200 | | | | 37.72 | |
| | 43 | −33.4013 | 1.1300 | 1.71736 | 29.50 | 0.60404 | 36.66 | |
| | 44 | ∞ | 5.6100 | 1.51742 | 52.20 | 0.55800 | 37.82 | |
| | 45 | −43.4927 | 3.6600 | | | | 38.06 | |
| M2a | 46 | −88.2029 | 1.1300 | 1.84850 | 43.79 | 0.56197 | 36.83 | 36.82 |
| | 47 | 40.4132 | 13.6800 | 1.69895 | 30.05 | 0.60282 | 37.51 | |
| | 48 | −52.1437 | 14.0000 | | | | 38.56 | |
| | 49 | −61.1438 | 7.8900 | 1.78590 | 44.20 | 0.56317 | 35.15 | |
| | 50 | −23.9147 | 1.1500 | 1.78472 | 25.68 | 0.61621 | 35.51 | |
| | 51 | −130.5719 | 8.2100 | | | | 36.61 | 36.58 |
| M3 | 52 | 132.1314 | 6.9900 | 1.74000 | 28.30 | 0.60790 | 37.20 | |
| | *53 | −43.1140 | 6.3400 | | | | 37.25 | |
| | 54 | 68.8567 | 5.6300 | 1.43700 | 95.10 | 0.53364 | 30.23 | |
| | 55 | −57.4786 | 1.1300 | 1.75500 | 52.34 | 0.54761 | 29.09 | |
| | 56 | 31.5567 | 0.5000 | | | | 27.07 | |
| | 57 | 30.4077 | 10.6500 | 1.49782 | 82.57 | 0.53862 | 27.14 | |
| | 58 | −23.4879 | 1.2000 | 1.91082 | 35.25 | 0.58224 | 26.29 | |
| | 59 | 27.7466 | 13.1400 | 1.62004 | 36.26 | 0.58800 | 27.20 | |
| | 60 | −32.6418 | 0.5000 | | | | 29.30 | |
| | 61 | −42.1020 | 4.3000 | 1.71736 | 29.52 | 0.60483 | 29.23 | |
| | *62 | −77.9005 | 42.8400 | | | | 30.57 | |

TABLE 26

Example 5a

| | Wide | Middle | Tele |
|---|---|---|---|
| Zr | 1.00 | 19.87 | 38.86 |
| f | 25.72 | 510.95 | 999.46 |
| Bf | 42.83 | 42.83 | 42.83 |
| FNo. | 2.88 | 3.23 | 5.17 |
| 2ω[°] | 59.68 | 3.16 | 1.62 |
| DD[12] | 5.21 | 151.34 | 159.45 |
| DD[22] | 264.29 | 49.39 | 4.57 |
| DD[27] | 23.79 | 6.72 | 2.43 |
| DD[32] | 5.08 | 90.92 | 131.93 |

TABLE 27

Example 5a

| Sn | 13 | 53 | 62 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.3333062E−07 | 3.5427160E−06 | −7.5572490E−06 |
| A5 | −1.4456577E−08 | −5.8874015E−09 | −4.0734464E−07 |
| A6 | 1.1459126E−09 | 7.4284965E−09 | 2.3019902E−08 |
| A7 | 2.6026508E−11 | −1.1148046E−09 | −5.8421927E−10 |
| A8 | −6.1882849E−12 | 5.0707427E−11 | 5.3298320E−11 |
| A9 | 4.6400323E−14 | −1.8685828E−13 | −4.2399750E−12 |
| A10 | 1.8661754E−14 | −1.2200940E−14 | 1.3543404E−13 |
| A11 | −5.8437683E−16 | −2.0996796E−15 | −9.7548437E−15 |
| A12 | −8.7968378E−18 | 6.0789850E−17 | 1.0571444E−16 |
| A13 | −3.9887545E−20 | −2.6598533E−19 | 2.3539649E−17 |
| A14 | 4.6714273E−20 | 1.1724182E−19 | −5.7904455E−19 |

TABLE 27-continued

Example 5a

| Sn | 13 | 53 | 62 |
|---|---|---|---|
| A15 | −1.5483061E−21 | −3.9570508E−21 | 2.1534662E−20 |
| A16 | 1.5326036E−23 | 5.6867614E−24 | −1.3467318E−21 |

Example 5b

Figure 22:
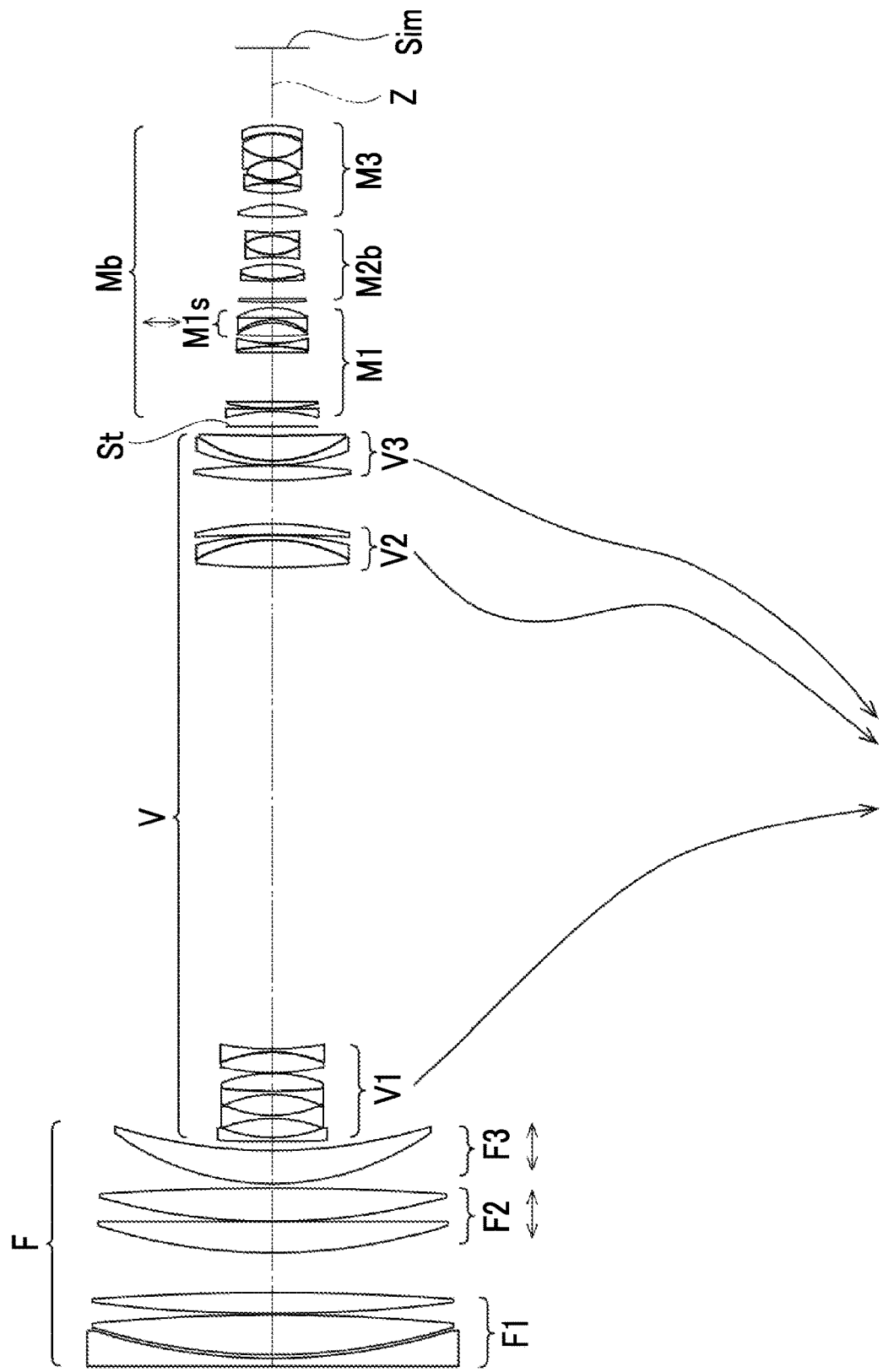
FIG. 22 is a diagram showing a configuration and a movement locus of a zoom lens according to Example 5b.

FIG. 22 shows a configuration and movement loci of the zoom lens according to Example 5b. In the zoom lens according to Example 5b, the M2a lens group M2a of the zoom lens according to Example 5a is replaced with the M2b lens group M2b according to Example 5b. The focusing part F, the variable magnification part V, the aperture stop St, the M1 lens group M1, and the M3 lens group M3 of the zoom lens according to Example 5b are common to those of the zoom lens according to Example 5a.

Figure 24:
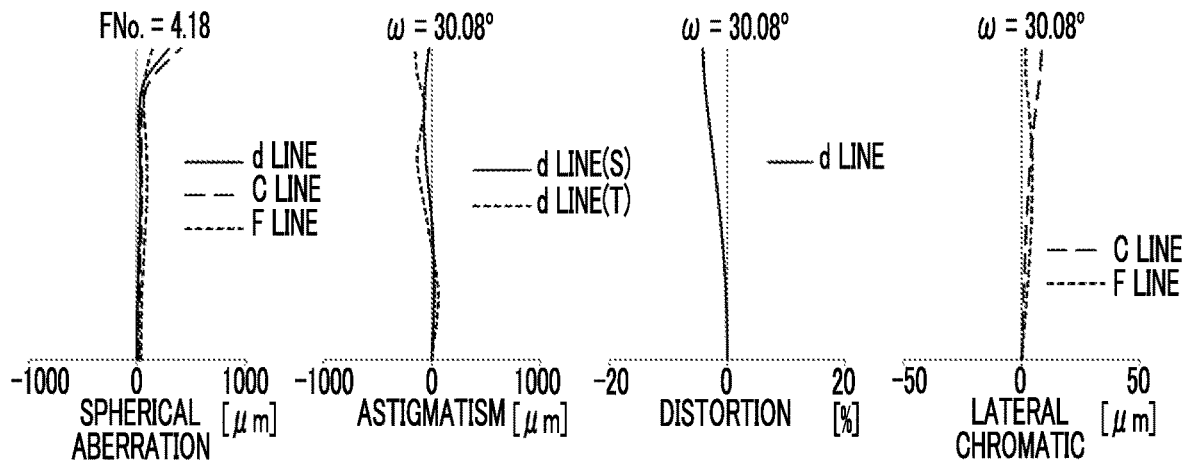
FIG. 24 is a diagram showing aberrations of the zoom lens according to Example 5b.
Figure 24:
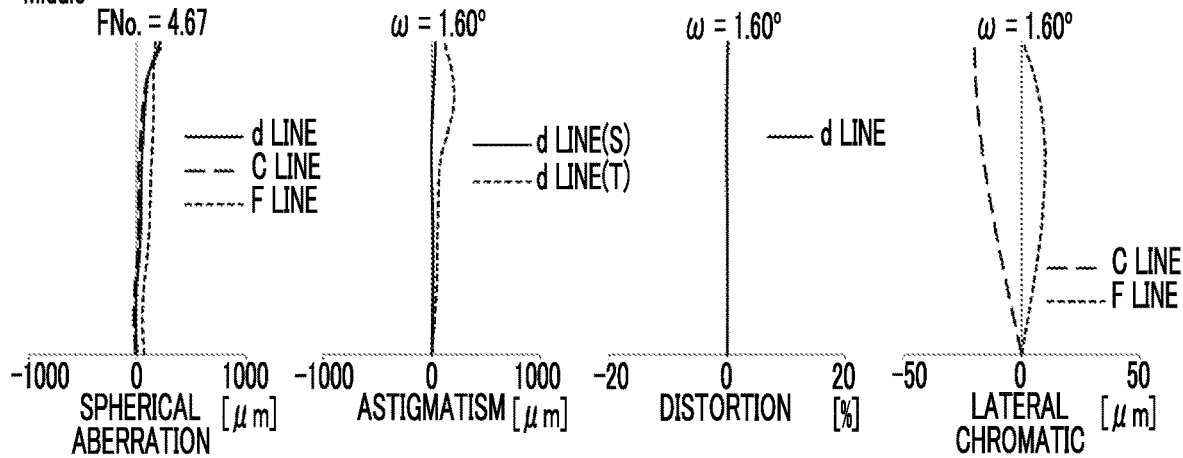
Figure 24:
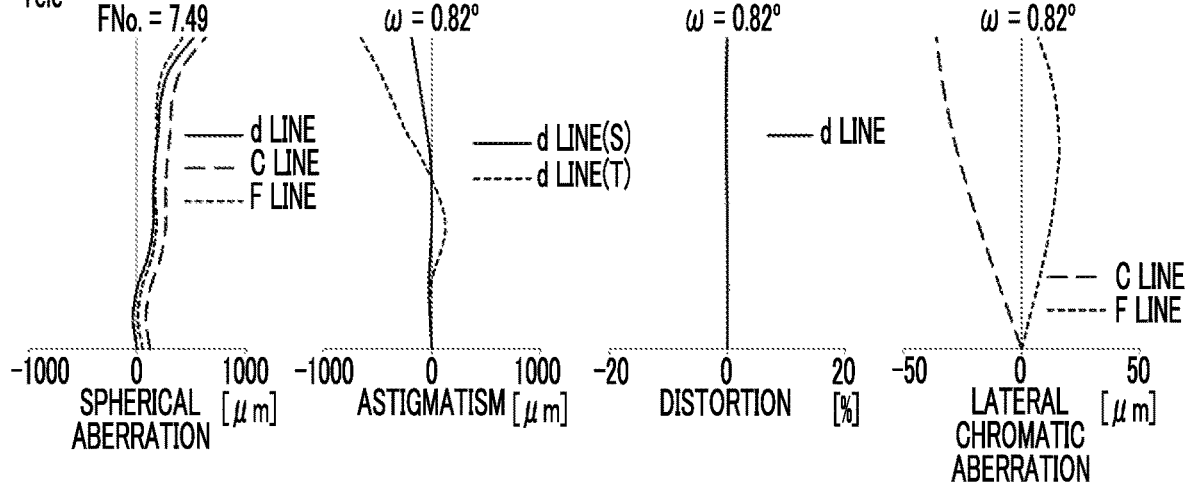

Regarding the zoom lens according to Example 5b, Tables 28-1 and 28-2 show basic lens data, Table 29 shows specifications and variable surface spacings, and Table 30 shows aspherical coefficients thereof. FIG. 24 shows aberration diagrams.

TABLE 28-1

Example 5b

|   | Sn | R | D | Nd | vd | θgF | ED |
|---|----|---|---|----|----|-----|----|
| F | 1  | ∞ | 4.4000 | 1.83481 | 42.73 | 0.56481 | 212.00 |
|   | 2  | 347.8070 | 2.0200 | | | | 202.57 |
|   | 3  | 358.8084 | 21.9900 | 1.43387 | 95.18 | 0.53733 | 203.07 |
|   | 4  | −1120.1699 | 1.0000 | | | | 203.27 |
|   | 5  | 884.2759 | 11.4200 | 1.43387 | 95.18 | 0.53733 | 203.54 |
|   | 6  | −1520.9423 | 21.8500 | | | | 203.43 |
|   | 7  | 338.8734 | 17.1300 | 1.43387 | 95.18 | 0.53733 | 198.00 |
|   | 8  | ∞ | 0.1200 | | | | 197.66 |
|   | 9  | 380.9876 | 18.1800 | 1.43387 | 95.18 | 0.53733 | 195.00 |
|   | 10 | −1520.9400 | 2.4400 | | | | 194.30 |
|   | 11 | 159.2262 | 18.2800 | 1.43700 | 95.10 | 0.53364 | 178.41 |
|   | 12 | 315.5803 | DD[12] | | | | 175.60 |
| V | *13 | ∞ | 2.0000 | 2.00069 | 25.46 | 0.61364 | 61.34 |
|   | 14 | 83.6756 | 10.2700 | | | | 55.57 |

TABLE 28-1-continued

Example 5b

|    | Sn | R | D | Nd | vd | θgF | ED |
|----|----|---|---|----|----|-----|----|
|    | 15 | −84.8016 | 1.8000 | 1.68960 | 31.14 | 0.60319 | 54.36 |
|    | 16 | 71.6943 | 11.3700 | | | | 51.39 |
|    | 17 | −66.8766 | 1.8100 | 1.80420 | 46.50 | 0.55727 | 51.49 |
|    | 18 | 276.4700 | 9.9900 | 1.84666 | 23.83 | 0.61603 | 54.82 |
|    | 19 | −80.5612 | 0.1200 | | | | 56.20 |
|    | 20 | 125.2721 | 11.7500 | 1.79504 | 28.69 | 0.60656 | 57.00 |
|    | 21 | −77.4063 | 1.8300 | 1.80420 | 46.50 | 0.55727 | 57.34 |
|    | 22 | 189.6799 | DD[22] | | | | 58.49 |
|    | 23 | 459.4027 | 15.2200 | 1.52841 | 76.45 | 0.53954 | 85.29 |
|    | 24 | −93.2124 | 2.6000 | 1.85150 | 40.78 | 0.56958 | 85.42 |
|    | 25 | −173.1179 | 0.1200 | | | | 87.00 |
|    | 26 | −862.2295 | 6.0000 | 1.43700 | 95.10 | 0.53364 | 86.94 |
|    | 27 | −195.5039 | DD[27] | | | | 87.00 |
|    | 28 | 274.6642 | 8.3000 | 1.59282 | 68.62 | 0.54414 | 87.50 |
|    | 29 | −373.0811 | 0.1500 | | | | 87.39 |
|    | 30 | 124.6802 | 2.4000 | 1.85883 | 30.00 | 0.59793 | 85.13 |
|    | 31 | 75.0450 | 13.8200 | 1.49782 | 82.57 | 0.53862 | 81.94 |
|    | 32 | 1426.5737 | DD[32] | | | | 81.36 |
| St | 33 | ∞ | 8.0300 | | | | 51.62 |

TABLE 28-2

Example 5b

|     | Sn | R | D | Nd | vd | θgF | ED | MDA |
|-----|----|---|---|----|----|-----|----|----|
| M1  | 34 | −102.7377 | 1.6300 | 1.72916 | 54.61 | 0.54428 | 49.44 | |
|     | 35 | ∞ | 0.1200 | | | | 49.30 | |
|     | 36 | 133.5505 | 3.5000 | 1.85000 | 27.03 | 0.60935 | 49.18 | |
|     | 37 | ∞ | 27.2500 | | | | 48.94 | |
|     | 38 | ∞ | 3.3100 | 1.59270 | 35.31 | 0.59336 | 38.80 | |
|     | 39 | −93.9150 | 1.2800 | 1.72916 | 54.61 | 0.54428 | 38.50 | |
|     | 40 | 79.3508 | 4.0600 | | | | 37.54 | |
|     | 41 | 333.4172 | 7.2500 | 1.53172 | 48.84 | 0.56309 | 37.66 | |
|     | 42 | −36.7110 | 1.6200 | | | | 37.65 | |
|     | 43 | −33.4013 | 1.1300 | 1.71736 | 29.50 | 0.60404 | 36.60 | |
|     | 44 | ∞ | 5.6100 | 1.51742 | 52.20 | 0.55800 | 37.75 | |
|     | 45 | −43.4927 | 3.0800 | | | | 37.99 | |
| M2b | 46 | 386.3713 | 1.8200 | 1.94595 | 17.98 | 0.65460 | 36.40 | 36.14 |
|     | 47 | ∞ | 9.8500 | | | | 36.25 | |
|     | 48 | 409.0951 | 1.1300 | 1.52841 | 76.45 | 0.53954 | 34.17 | |
|     | 49 | 56.0254 | 8.0100 | 1.53172 | 48.84 | 0.56309 | 33.63 | |
|     | 50 | −52.4927 | 3.8700 | | | | 33.18 | |
|     | 51 | −137.3427 | 1.4700 | 1.71700 | 47.97 | 0.55852 | 29.32 | |
|     | 52 | 28.1737 | 10.1900 | 1.58144 | 40.75 | 0.57757 | 27.68 | |
|     | 53 | −34.1457 | 1.8200 | 1.90366 | 31.27 | 0.59487 | 26.91 | |
|     | 54 | 136.0978 | 8.4800 | | | | 27.00 | 23.53 |
| M3  | 55 | 132.1314 | 6.9900 | 1.74000 | 28.30 | 0.60790 | 30.58 | |
|     | *56 | −43.1140 | 6.3400 | | | | 31.02 | |
|     | 57 | 68.8567 | 5.6300 | 1.43700 | 95.10 | 0.53364 | 28.13 | |
|     | 58 | −57.4786 | 1.1300 | 1.75500 | 52.34 | 0.54761 | 27.32 | |
|     | 59 | 31.5567 | 0.5000 | | | | 26.38 | |
|     | 60 | 30.4077 | 10.6500 | 1.49782 | 82.57 | 0.53862 | 26.67 | |
|     | 61 | −23.4879 | 1.2000 | 1.91082 | 35.25 | 0.58224 | 26.47 | |
|     | 62 | 27.7466 | 13.1400 | 1.62004 | 36.26 | 0.58800 | 28.70 | |
|     | 63 | −32.6418 | 0.5000 | | | | 31.51 | |
|     | 64 | −42.1020 | 4.3000 | 1.71736 | 29.52 | 0.60483 | 31.85 | |
|     | *65 | −77.9005 | 42.8100 | | | | 34.05 | |

TABLE 29

Example 5b

| | Wide | Middle | Tele |
|---|---|---|---|
| Zr | 1.00 | 19.87 | 38.86 |
| f | 37.19 | 738.91 | 1445.37 |
| Bf | 42.81 | 42.81 | 42.81 |
| FNo. | 4.18 | 4.67 | 7.49 |
| 2ω[°] | 60.16 | 3.20 | 1.64 |
| DD[12] | 5.21 | 151.34 | 159.45 |
| DD[22] | 264.29 | 49.39 | 4.57 |
| DD[27] | 23.79 | 6.72 | 2.43 |
| DD[32] | 5.08 | 90.92 | 131.93 |

TABLE 30

Example 5b

| Sn | 13 | 56 | 65 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 5.3333062E−07 | 3.5427160E−06 | −7.5572490E−06 |
| A5 | −1.4456577E−08 | −5.8874015E−09 | −4.0734464E−07 |
| A6 | 1.1459126E−09 | 7.4284965E−09 | 2.3019902E−08 |
| A7 | 2.6026508E−11 | −1.1148046E−09 | −5.8421927E−10 |
| A8 | −6.1882849E−12 | 5.0707427E−11 | 5.3298320E−11 |
| A9 | 4.6400323E−14 | −1.8685828E−13 | −4.2399750E−12 |
| A10 | 1.8661754E−14 | −1.2200940E−14 | 1.3543404E−13 |
| A11 | −5.8437683E−16 | −2.0996796E−15 | −9.7548437E−15 |
| A12 | −8.7968378E−18 | 6.0789850E−17 | 1.0571444E−16 |
| A13 | −3.9887545E−20 | −2.6598533E−19 | 2.3539649E−17 |
| A14 | 4.6714273E−20 | 1.1724182E−19 | −5.7904455E−19 |
| A15 | −1.5483061E−21 | −3.9570508E−21 | 2.1534662E−20 |
| A16 | 1.5326036E−23 | 5.6867614E−24 | −1.3467318E−21 |

Example 6a

Figure 25:
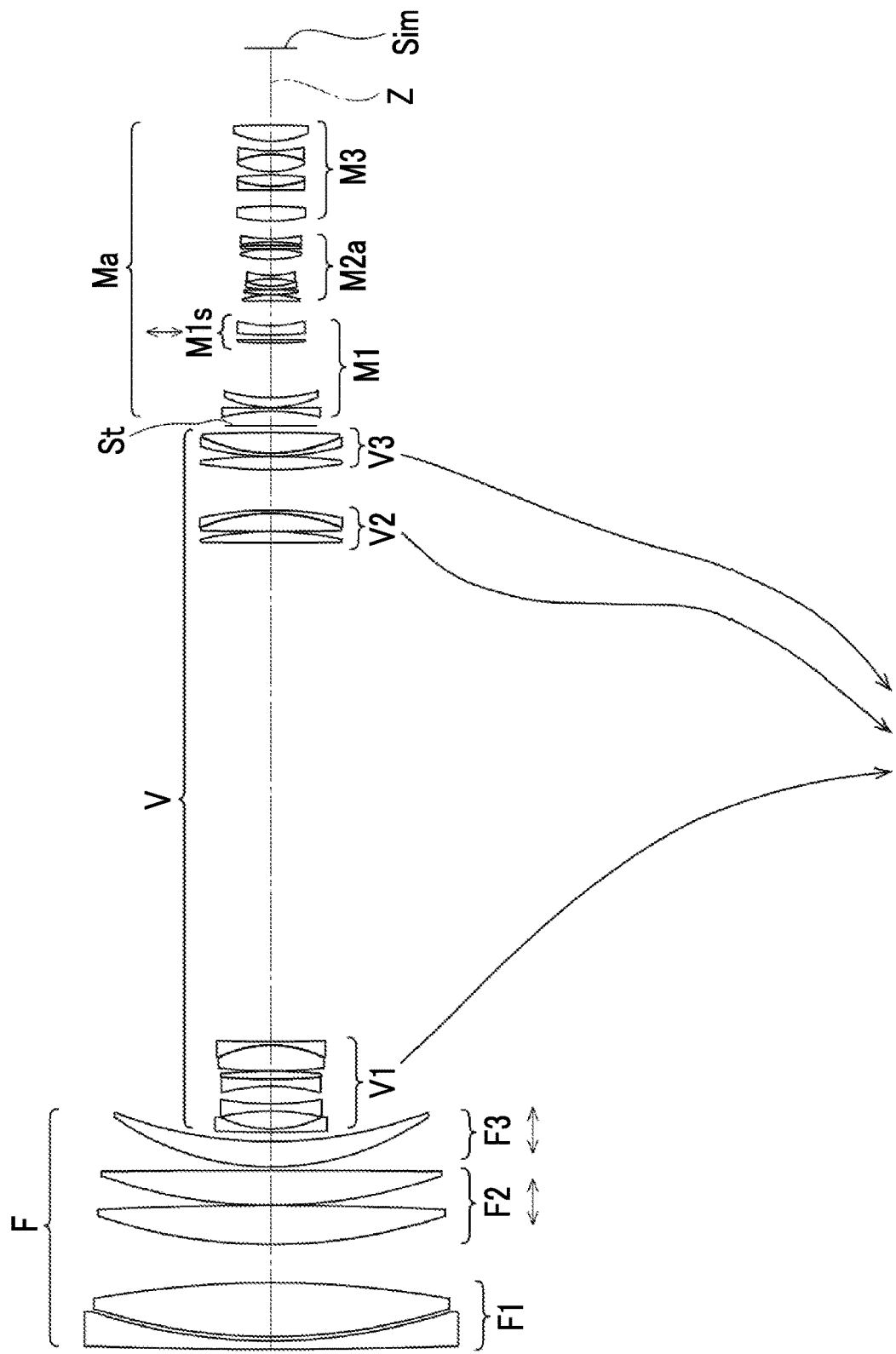

FIG. 25 shows a configuration and movement loci of the zoom lens according to Example 6a. The zoom lens according to Example 5a consists of, in order from the object side to the image side, the focusing part F, the variable magnification part V, the aperture stop St, and the imaging part Ma. The focusing part F consists of, in order from the object side to the image side, the F1 lens group F1, the F2 lens group F2, and the F3 lens group F3. During focusing, the F1 lens group F1 remains stationary with respect to the image plane Sim, and the F2 lens group F2 and the F3 lens group F3 move along the optical axis Z by changing the mutual spacing. The variable magnification part V consists of, in order from the object side to the image side, a V1 lens group V1 that has a negative refractive power, a V2 lens group V2 that has a positive refractive power, and a V3 lens group V3 that has a positive refractive power. During magnification change, the V1 lens group V1, the V2 lens group V2, and the V3 lens group V3 move along the optical axis Z by changing the spacing between adjacent groups. The imaging part Ma consists of, in order from the object side to the image side, an M1 lens group M1, an M2a lens group M2a, and an M3 lens group M3. The M1 lens group M1 includes the vibration-proof group M1s closest to the image side. The M2a lens group M2a is replaceable with the M2b lens group M2b according to Example 6b.

Figure 27:
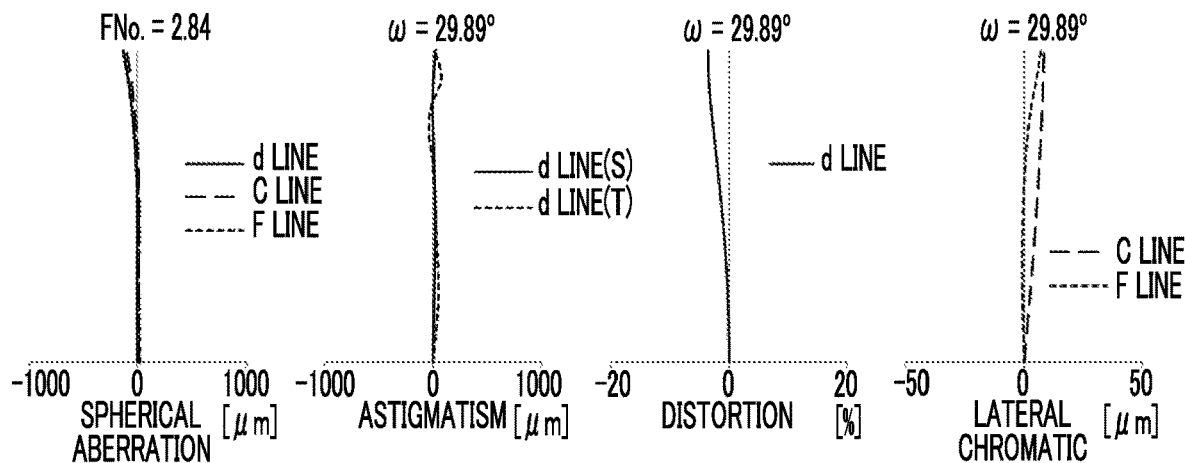
Figure 27:
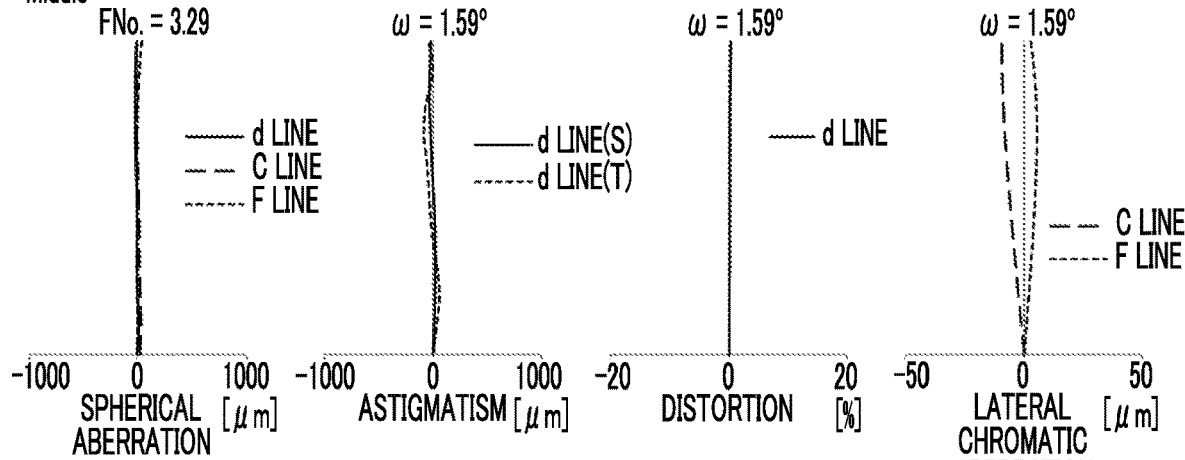
Figure 27:
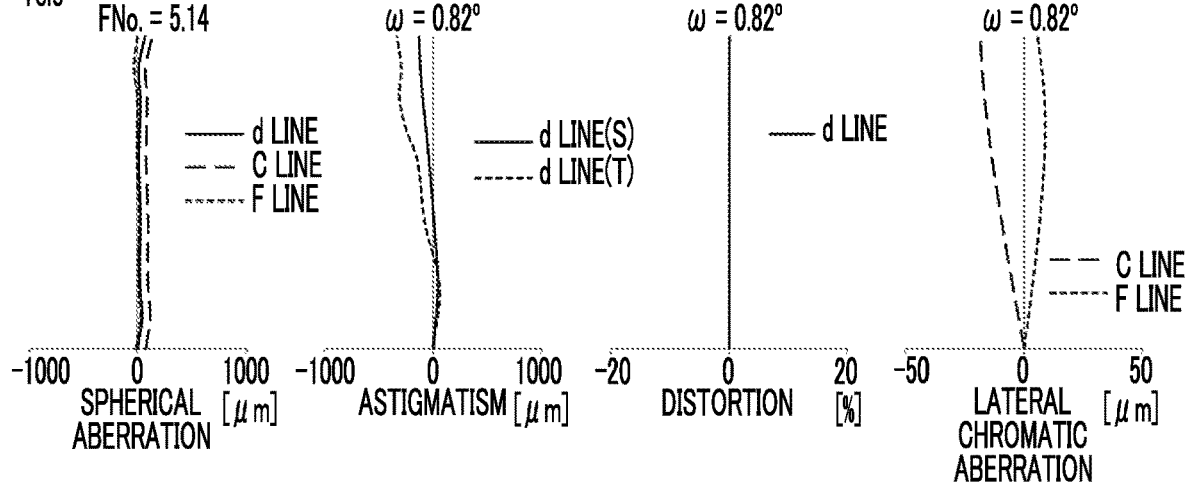

Regarding the zoom lens according to Example 6a, Tables 31-1 and 31-2 show basic lens data, Table 32 shows specifications and variable surface spacings, and Table 33 shows aspherical coefficients thereof. FIG. 27 shows aberration diagrams. The 36th to 39th surfaces of Table 31-2 correspond to the vibration-proof group M1s.

TABLE 31-1

Example 6a

| | Sn | R | D | Nd | vd | θgF | ED |
|---|---|---|---|---|---|---|---|
| F | 1 | 3522.8936 | 4.4000 | 1.80610 | 40.97 | 0.56882 | 209.68 |
| | 2 | 331.3997 | 2.2778 | | | | 200.07 |
| | 3 | 338.2495 | 29.6404 | 1.43387 | 95.18 | 0.53733 | 199.96 |
| | 4 | −595.5919 | 20.9000 | | | | 200.15 |
| | 5 | 317.6064 | 21.2502 | 1.43387 | 95.18 | 0.53733 | 197.00 |
| | 6 | −2216.5767 | 0.1202 | | | | 196.61 |
| | 7 | 298.8189 | 18.8917 | 1.43387 | 95.18 | 0.53733 | 192.84 |
| | 8 | −9755.6288 | 2.0400 | | | | 192.00 |
| | 9 | 159.8334 | 13.8345 | 1.43700 | 95.10 | 0.53364 | 178.04 |
| | 10 | 258.5068 | DD[10] | | | | 176.16 |
| V | *11 | 859.5721 | 1.8002 | 2.00069 | 25.46 | 0.61364 | 63.53 |
| | 12 | 67.2517 | 9.7502 | | | | 57.02 |
| | 13 | −127.1070 | 3.9225 | 1.82515 | 46.68 | 0.55683 | 56.87 |
| | 14 | 173.3864 | 9.6664 | | | | 55.18 |
| | 15 | −106.3794 | 3.7816 | 1.59282 | 68.62 | 0.54414 | 54.94 |
| | 16 | 394.5838 | 4.2902 | 1.82458 | 23.77 | 0.62004 | 56.26 |
| | 17 | −314.5125 | 0.1215 | | | | 56.50 |
| | 18 | 268.7066 | 14.3948 | 1.81662 | 24.17 | 0.61925 | 58.39 |
| | 19 | −69.2000 | 1.8202 | 1.79900 | 48.10 | 0.55219 | 59.78 |
| | 20 | 754.7683 | DD[20] | | | | 61.86 |
| | 21 | 2000.8521 | 6.1012 | 1.49616 | 85.05 | 0.53763 | 79.80 |
| | 22 | −197.3378 | 0.1200 | | | | 79.93 |
| | 23 | 1732.8560 | 9.8692 | 1.54124 | 76.54 | 0.53952 | 79.50 |
| | 24 | −108.1125 | 1.8001 | 1.90143 | 37.86 | 0.57370 | 79.59 |
| | 25 | −189.8802 | DD[25] | | | | 80.54 |
| | 26 | 259.3897 | 7.2250 | 1.43700 | 95.10 | 0.53364 | 80.00 |
| | 27 | −354.8604 | 0.1207 | | | | 80.01 |
| | 28 | 154.5733 | 1.8000 | 1.93869 | 30.13 | 0.59776 | 79.33 |
| | 29 | 94.1540 | 11.2311 | 1.55031 | 75.50 | 0.54001 | 77.82 |
| | 30 | −770.4342 | DD[30] | | | | 77.53 |
| St | 31 | ∞ | 8.0000 | | | | 51.73 |

TABLE 31-2

Example 6a

| | Sn | R | D | Nd | vd | θgF | ED | MDA |
|---|---|---|---|---|---|---|---|---|
| M1 | 32 | −124.5436 | 1.8000 | 1.70775 | 55.81 | 0.54393 | 49.37 | |
| | 33 | 2065.9496 | 0.1200 | | | | 49.05 | |
| | 34 | 63.2228 | 5.4739 | 1.78687 | 25.90 | 0.61509 | 48.55 | |
| | 35 | 102.2539 | 29.7474 | | | | 47.14 | |
| | 36 | 237.7112 | 1.8000 | 1.80255 | 41.95 | 0.56813 | 36.90 | |
| | 37 | 1808.0535 | 2.6772 | | | | 36.59 | |
| | 38 | 227.5306 | 5.0111 | 1.89709 | 21.87 | 0.63321 | 35.02 | |
| | 39 | 58.5940 | 13.8003 | | | | 32.86 | |
| M2a | 40 | −537.0532 | 3.1650 | 1.61843 | 60.45 | 0.54304 | 32.06 | 31.46 |
| | 41 | −60.9483 | 0.1589 | | | | 32.04 | |
| | 42 | 94.0454 | 2.6443 | 1.91142 | 19.98 | 0.64262 | 30.69 | |
| | 43 | −346.1200 | 0.2944 | | | | 30.31 | |
| | 44 | 95.6119 | 1.8189 | 1.68333 | 54.27 | 0.54696 | 28.91 | |

TABLE 31-2-continued

Example 6a

|    | Sn  | R         | D       | Nd      | vd    | θgF     | ED    | MDA   |
|----|-----|-----------|---------|---------|-------|---------|-------|-------|
|    | 45  | 44.6196   | 3.9401  |         |       |         | 27.22 |       |
|    | 46  | −51.1836  | 1.8001  | 1.78523 | 46.60 | 0.55845 | 27.24 |       |
|    | 47  | 51.7606   | 8.7335  |         |       |         | 27.00 |       |
|    | 48  | 61.9629   | 5.6425  | 1.69900 | 40.54 | 0.57464 | 34.01 |       |
|    | 49  | −74.7815  | 0.2505  |         |       |         | 34.21 |       |
|    | 50  | 5689.1415 | 1.8001  | 1.69994 | 52.85 | 0.54892 | 34.09 |       |
|    | 51  | −310.5951 | 1.7897  |         |       |         | 34.05 |       |
|    | 52  | −113.4350 | 1.8001  | 1.84245 | 27.87 | 0.60726 | 33.91 |       |
|    | 53  | 103.9980  | 9.6140  |         |       |         | 34.20 | 26.47 |
| M3 | 54  | 86.9373   | 8.0786  | 1.73414 | 28.63 | 0.60734 | 38.50 |       |
|    | 55  | −208.4952 | 8.9062  |         |       |         | 38.69 |       |
|    | 56  | 2329.3936 | 2.0000  | 1.90000 | 37.33 | 0.57731 | 37.97 |       |
|    | 57  | 59.8116   | 6.0538  | 1.58327 | 67.19 | 0.54169 | 37.74 |       |
|    | 58  | −177.0022 | 2.0003  |         |       |         | 37.89 |       |
|    | 59  | 49.1622   | 9.3045  | 1.53178 | 75.11 | 0.53873 | 37.88 |       |
|    | 60  | −51.5882  | 2.0000  | 1.92711 | 35.05 | 0.58309 | 37.30 |       |
|    | 61  | 97.0654   | 5.1611  |         |       |         | 36.87 |       |
|    | 62  | 50.4745   | 8.6858  | 1.49520 | 55.90 | 0.55094 | 38.67 |       |
|    | *63 | −672.7398 | 42.2600 |         |       |         | 38.16 |       |

TABLE 32

Example 6a

|        | Wide   | Middle | Tele   |
|--------|--------|--------|--------|
| Zr     | 1.00   | 19.87  | 38.60  |
| f      | 25.75  | 511.60 | 994.03 |
| Bf     | 42.25  | 42.25  | 42.25  |
| FNo.   | 2.84   | 3.29   | 5.14   |
| 2ω[°]  | 59.78  | 3.18   | 1.64   |
| DD[10] | 5.03   | 156.64 | 164.09 |
| DD[20] | 271.90 | 50.28  | 4.14   |
| DD[25] | 21.99  | 9.80   | 2.58   |
| DD[30] | 3.50   | 85.70  | 131.61 |

TABLE 33

Example 6a

| Sn  | 11             | 63             |
|-----|----------------|----------------|
| KA  | 1.0000000E+00  | 1.0000000E+00  |
| A3  | 0.0000000E+00  | 0.0000000E+00  |
| A4  | −1.6188564E−07 | −3.8837041E−06 |
| A5  | 8.3359186E−08  | 2.2070902E−06  |
| A6  | −1.8771190E−08 | −5.4378834E−07 |
| A7  | 2.4045481E−09  | 6.0368637E−08  |
| A8  | −1.8834746E−10 | −3.0093390E−09 |
| A9  | 8.9686554E−12  | 1.6564543E−10  |
| A10 | −2.2642099E−13 | −3.4542634E−11 |
| A11 | 8.1958115E−16  | 3.5488251E−12  |
| A12 | 9.1013709E−17  | −9.2714186E−14 |
| A13 | −1.0020731E−19 | −8.6161157E−15 |
| A14 | −1.0830595E−19 | 7.5644130E−16  |
| A15 | 2.8119102E−21  | −2.2895847E−17 |
| A16 | −2.2957039E−23 | 2.5423655E−19  |

Example 6b

Figure 26:
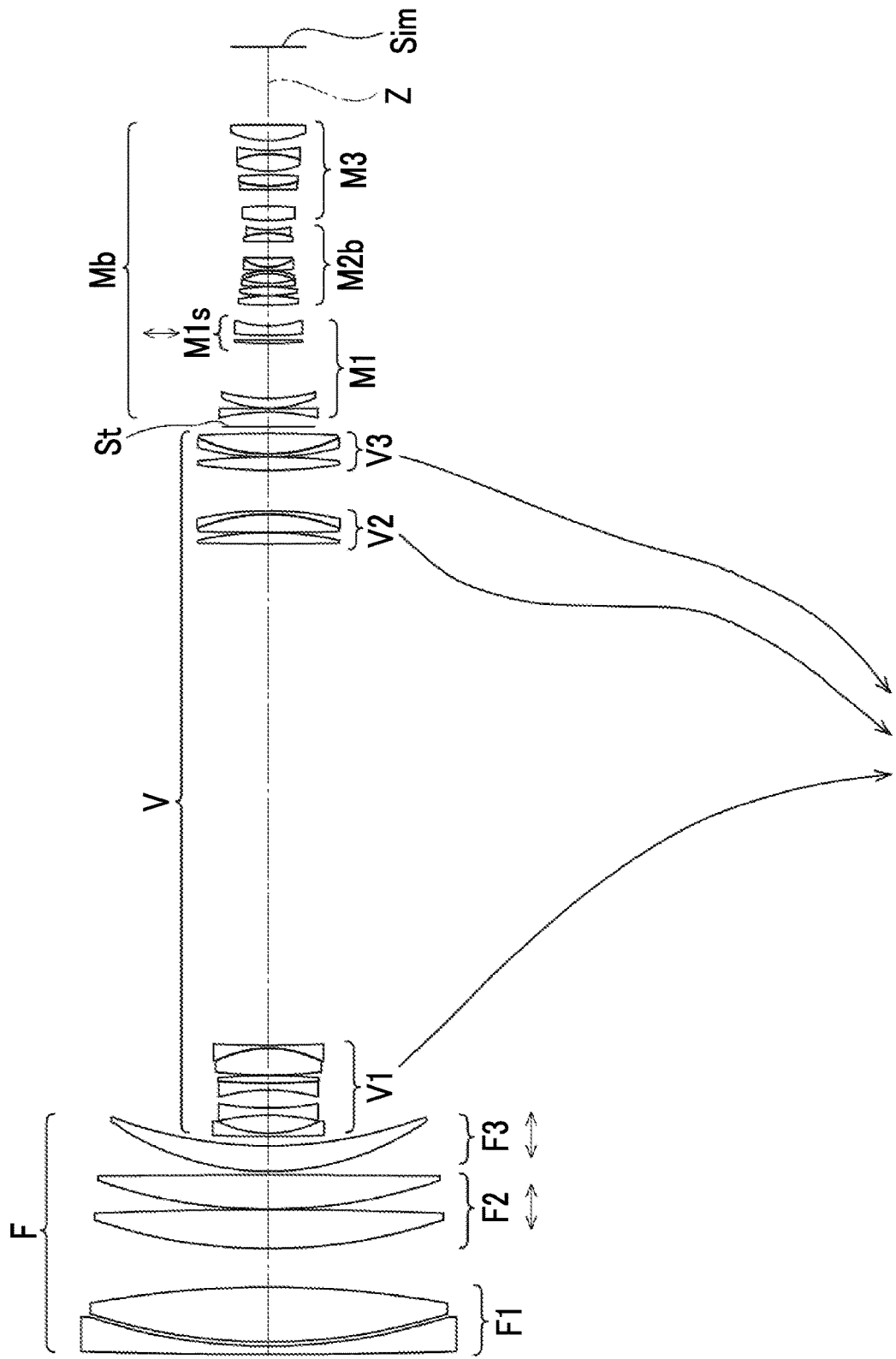
FIG. 26 is a diagram showing a configuration and a movement locus of a zoom lens according to Example 6b.

FIG. 26 shows a configuration and movement loci of the zoom lens according to Example 6b. In the zoom lens according to Example 6b, the M2a lens group M2a of the zoom lens according to Example 6a is replaced with the M2b lens group M2b according to Example 6b. The focusing part F, the variable magnification part V, the aperture stop St, the M1 lens group M1, and the M3 lens group M3 of the zoom lens according to Example 6b are common to those of the zoom lens according to Example 6a.

Figure 28:
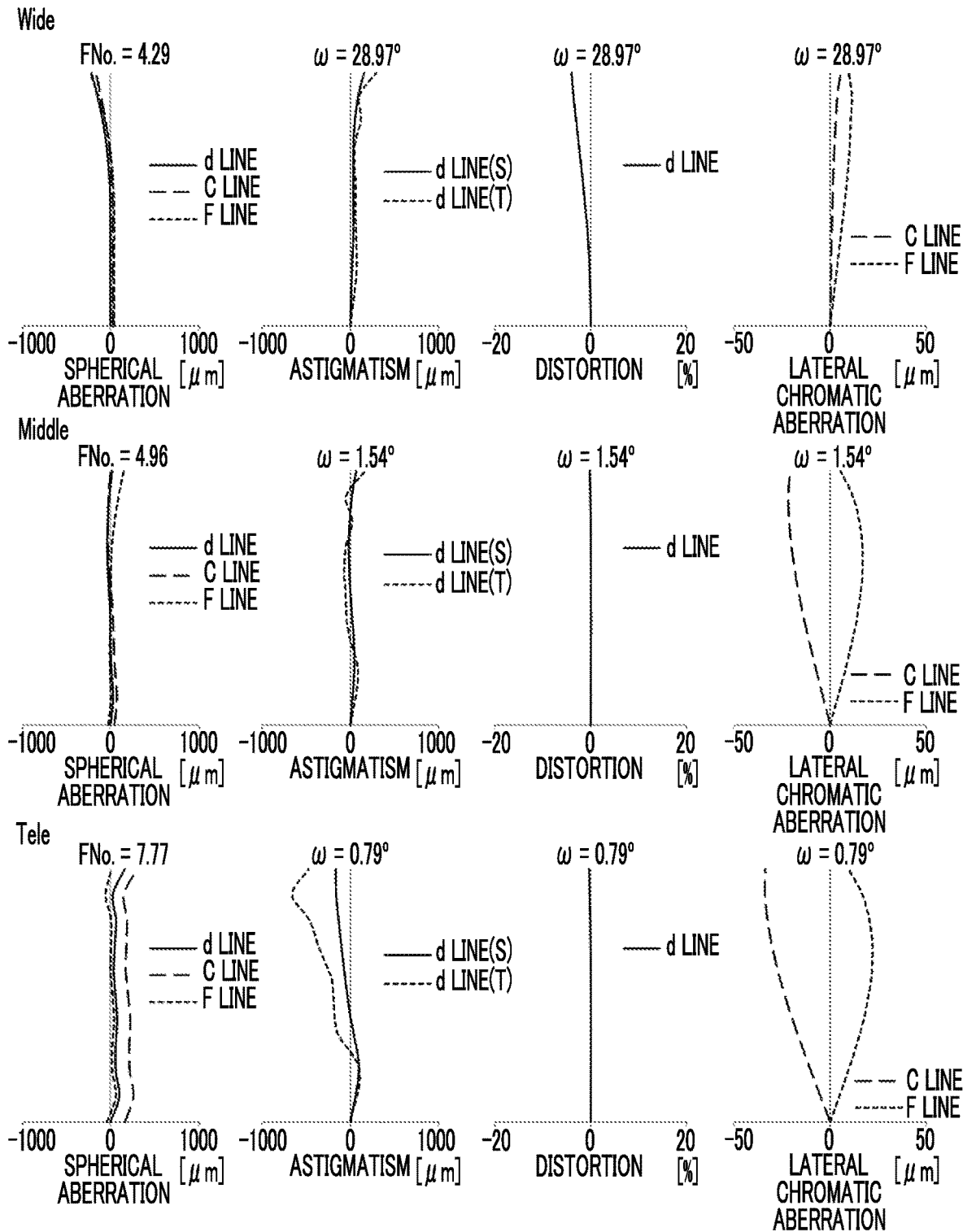
FIG. 28 is a diagram showing aberrations of the zoom lens according to Example 6b.

Regarding the zoom lens according to Example 6b, Tables 34-1 and 34-2 show basic lens data, Table 35 shows specifications and variable surface spacings, and Table 36 shows aspherical coefficients thereof. FIG. 28 shows aberration diagrams.

TABLE 34-1

Example 6b

|    | Sn  | R         | D       | Nd      | vd    | θgF     | ED     |
|----|-----|-----------|---------|---------|-------|---------|--------|
| F  | 1   | 3522.8936 | 4.4000  | 1.80610 | 40.97 | 0.56882 | 209.68 |
|    | 2   | 331.3997  | 2.2778  |         |       |         | 200.07 |
|    | 3   | 338.2495  | 29.6404 | 1.43387 | 95.18 | 0.53733 | 199.96 |
|    | 4   | −595.5919 | 20.9000 |         |       |         | 200.15 |
|    | 5   | 317.6064  | 21.2502 | 1.43387 | 95.18 | 0.53733 | 197.00 |
|    | 6   | −2216.5767| 0.1202  |         |       |         | 196.61 |
|    | 7   | 298.8189  | 18.8917 | 1.43387 | 95.18 | 0.53733 | 192.84 |
|    | 8   | −9755.6288| 2.0400  |         |       |         | 192.00 |
|    | 9   | 159.8334  | 13.8345 | 1.43700 | 95.10 | 0.53364 | 178.04 |
|    | 10  | 258.5068  | DD[10]  |         |       |         | 176.16 |
| V  | *11 | 859.5721  | 1.8002  | 2.00069 | 25.46 | 0.61364 | 63.53  |
|    | 12  | 67.2517   | 9.7502  |         |       |         | 57.02  |
|    | 13  | −127.1070 | 3.9225  | 1.82515 | 46.68 | 0.55683 | 56.87  |
|    | 14  | 173.3864  | 9.6664  |         |       |         | 55.18  |
|    | 15  | −106.3794 | 3.7816  | 1.59282 | 68.62 | 0.54414 | 54.94  |
|    | 16  | 394.5838  | 4.2902  | 1.82458 | 23.77 | 0.62004 | 56.26  |
|    | 17  | −314.5125 | 0.1215  |         |       |         | 56.50  |
|    | 18  | 268.7066  | 14.3948 | 1.81662 | 24.17 | 0.61925 | 58.39  |
|    | 19  | −69.2000  | 1.8202  | 1.79900 | 48.10 | 0.55219 | 59.78  |
|    | 20  | 754.7683  | DD[20]  |         |       |         | 61.86  |
|    | 21  | 2000.8521 | 6.1012  | 1.49616 | 85.05 | 0.53763 | 79.80  |
|    | 22  | −197.3378 | 0.1200  |         |       |         | 79.93  |
|    | 23  | 1732.8560 | 9.8692  | 1.54124 | 76.54 | 0.53952 | 79.50  |
|    | 24  | −108.1125 | 1.8001  | 1.90143 | 37.86 | 0.57370 | 79.59  |
|    | 25  | −189.8802 | DD[25]  |         |       |         | 80.54  |
|    | 26  | 259.3897  | 7.2250  | 1.43700 | 95.10 | 0.53364 | 80.00  |
|    | 27  | −354.8604 | 0.1207  |         |       |         | 80.01  |
|    | 28  | 154.5733  | 1.8000  | 1.93869 | 30.13 | 0.59776 | 79.33  |
|    | 29  | 94.1540   | 11.2311 | 1.55031 | 75.50 | 0.54001 | 77.82  |
|    | 30  | −770.4342 | DD[30]  |         |       |         | 77.53  |
| St | 31  | ∞         | 8.0000  |         |       |         | 51.73  |

TABLE 34-2

| | | | | | | | | |
|---|---|---|---|---|---|---|---|---|
| | Sn | R | D | Nd | vd | θgF | ED | MDA |
| M1 | 32 | −124.5436 | 1.8000 | 1.70775 | 55.81 | 0.54393 | 49.60 | |
| | 33 | 2065.9496 | 0.1200 | | | | 49.38 | |
| | 34 | 63.2228 | 5.4739 | 1.78687 | 25.90 | 0.61509 | 49.04 | |
| | 35 | 102.2539 | 29.7474 | | | | 47.70 | |
| | 36 | 237.7112 | 1.8000 | 1.80255 | 41.95 | 0.56813 | 38.30 | |
| | 37 | 1808.0535 | 2.6772 | | | | 38.01 | |
| | 38 | 227.5306 | 5.0111 | 1.89709 | 21.87 | 0.63321 | 36.49 | |
| | 39 | 58.5940 | 11.3944 | | | | 34.33 | |
| M2b | 40 | 200.7426 | 5.0000 | 1.51599 | 77.54 | 0.51944 | 33.79 | 31.63 |
| | 41 | −87.8132 | 0.1200 | | | | 33.54 | |
| | 42 | 85.9136 | 4.7502 | 1.51600 | 59.55 | 0.54361 | 32.38 | |
| | 43 | −92.4482 | 0.1202 | | | | 31.71 | |
| | 44 | 210.7147 | 1.8000 | 1.86001 | 42.00 | 0.56613 | 30.10 | |
| | 45 | 52.3325 | 5.1999 | | | | 28.54 | |
| | 46 | −37.2148 | 1.4998 | 1.89101 | 20.45 | 0.63901 | 28.38 | |
| | 47 | −46.1923 | 0.1200 | | | | 28.76 | |
| | 48 | 114.4881 | 1.9171 | 1.71396 | 55.80 | 0.54373 | 27.99 | |
| | 49 | 23.4629 | 5.0528 | 1.82906 | 23.55 | 0.62179 | 26.81 | |
| | 50 | 325.5094 | 8.8841 | | | | 26.50 | |
| | 51 | 1427.8602 | 4.5102 | 1.51600 | 52.00 | 0.55740 | 25.15 | |
| | 52 | −41.9771 | 1.8000 | 1.93001 | 35.00 | 0.58315 | 24.87 | |
| | 53 | 48.9145 | 5.0786 | | | | 25.13 | 17.36 |
| M3 | 54 | 86.9373 | 8.0786 | 1.73414 | 28.63 | 0.60734 | 28.08 | |
| | 55 | −208.4952 | 8.9062 | | | | 29.42 | |
| | 56 | 2329.3936 | 2.0000 | 1.90000 | 37.33 | 0.57731 | 31.87 | |
| | 57 | 59.8116 | 6.0538 | 1.58327 | 67.19 | 0.54169 | 32.41 | |
| | 58 | −177.0022 | 2.0003 | | | | 33.24 | |
| | 59 | 49.1622 | 9.3045 | 1.53178 | 75.11 | 0.53873 | 35.19 | |
| | 60 | −51.5882 | 2.0000 | 1.92711 | 35.05 | 0.58309 | 35.00 | |
| | 61 | 97.0654 | 5.1611 | | | | 35.65 | |
| | 62 | 50.4745 | 8.6858 | 1.49520 | 55.90 | 0.55094 | 39.98 | |
| | *63 | −672.7398 | 42.2300 | | | | 40.22 | |

TABLE 35

Example 6b

| | Wide | Middle | Tele |
|---|---|---|---|
| Zr | 1.00 | 19.87 | 38.60 |
| f | 38.86 | 771.98 | 1499.95 |
| Bf | 42.22 | 42.22 | 42.22 |
| FNo. | 4.29 | 4.96 | 7.77 |
| 2ω[°] | 57.94 | 3.08 | 1.58 |
| DD[10] | 5.03 | 156.64 | 164.09 |
| DD[20] | 271.90 | 50.28 | 4.14 |
| DD[25] | 21.99 | 9.80 | 2.58 |
| DD[30] | 3.50 | 85.70 | 131.61 |

TABLE 36

Example 6b

| Sn | 11 | 63 |
|---|---|---|
| KA | 1.0000000E+00 | 1.0000000E+00 |
| A3 | 0.0000000E+00 | 0.0000000E+00 |
| A4 | −1.6188564E−07 | −3.8837041E−06 |

TABLE 36-continued

Example 6b

| Sn | 11 | 63 |
|---|---|---|
| A5 | 8.3359186E−08 | 2.2070902E−06 |
| A6 | −1.8771190E−08 | −5.4378834E−07 |
| A7 | 2.4045481E−09 | 6.0368637E−08 |
| A8 | −1.8834746E−10 | −3.0093390E−09 |
| A9 | 8.9686554E−12 | 1.6564543E−10 |
| A10 | −2.2642099E−13 | −3.4542634E−11 |
| A11 | 8.1958115E−16 | 3.5488251E−12 |
| A12 | 9.1013709E−17 | −9.2714186E−14 |
| A13 | −1.0020731E−19 | −8.6161157E−15 |
| A14 | −1.0830595E−19 | 7.5644130E−16 |
| A15 | 2.8119102E−21 | −2.2895847E−17 |
| A16 | −2.2957039E−23 | 2.5423655E−19 |

Table 37 shows corresponding values of Conditional Expressions (1) to (19) of the zoom lenses according to Examples 1 to 6. Preferable ranges of the conditional expressions may be set by using the corresponding values of the examples shown in Table 37 as the upper limits or the lower limits of the conditional expressions.

TABLE 37

| Expression Number | | Example 1 | Example 2 | Example 3 | Example 4 | Example 5 | Example 6 |
|---|---|---|---|---|---|---|---|
| (1) | (ftb × tanωtb)/(fta × tanωta) | 1.455 | 1.460 | 1.463 | 1.468 | 1.463 | 1.455 |
| (2) | |fMa/fM2a| | 1.328 | 1.239 | 1.248 | 0.082 | 0.127 | 1.233 |
| (3) | |fMb/fM2b| | 0.357 | 0.578 | 0.526 | 5.196 | 1.005 | 2.906 |
| (4) | ωtb/ωta | 1.036 | 1.000 | 1.012 | 1.012 | 1.012 | 0.963 |
| (5) | φM3F/φM3R | 0.722 | 0.711 | 0.883 | 0.899 | 0.898 | 0.698 |

TABLE 37-continued

| Expression Number | | Example 1 | Example 2 | Example 3 | Example 4 | Example 5 | Example 6 |
|---|---|---|---|---|---|---|---|
| (6) | $(\varphi M2bR/\varphi M2bF)/(\varphi M2aR/\varphi M2aF)$ | 0.710 | 0.682 | 0.698 | 0.675 | 0.655 | 0.652 |
| (7) | $|(1 - \beta s) \times \beta M2a3|$ | 0.699 | 0.707 | 0.706 | 0.706 | 0.719 | 0.717 |
| (8) | $\varphi M1saF/\varphi M1aF$ | 0.748 | 0.746 | 0.776 | 0.746 | 0.763 | 0.747 |
| (9) | fwb/Dexwb | −0.159 | −0.192 | −0.189 | −0.302 | −0.298 | −0.214 |
| (10) | $TLtb/(ftb \times \tan\omega tb)$ | 33.958 | 34.177 | 34.987 | 34.914 | 35.039 | 34.315 |
| (11) | fF/fL1 | −0.546 | −0.546 | −0.553 | −0.576 | −0.576 | −0.546 |
| (12) | NdL1 | 1.806 | 1.806 | 1.835 | 1.835 | 1.835 | 1.806 |
| (13) | vdL1 | 40.970 | 40.970 | 42.730 | 42.730 | 42.730 | 40.970 |
| (14) | θgFL1 | 0.569 | 0.569 | 0.565 | 0.565 | 0.565 | 0.569 |
| (15) | fF/(−fV1) | 6.490 | 6.487 | 6.490 | 6.664 | 6.663 | 6.487 |
| (16) | βV1t/βV1w | 9.586 | 9.588 | 9.894 | 9.986 | 9.998 | 9.588 |
| (17) | fV23t/fV1 | −0.354 | −0.353 | −0.311 | −0.329 | −0.329 | −0.353 |
| (18) | Fnota/(fta/fwa) | 0.133 | 0.133 | 0.133 | 0.133 | 0.133 | 0.133 |
| (19) | TLtb/ftb | 0.510 | 0.489 | 0.507 | 0.500 | 0.502 | 0.473 |

As can be seen from the data described above, in the zoom lenses according to Examples 1 to 6, by replacing a part of the lens system, the image size is increased while an increase in focal length is achieved and the same angles of view are ensured before and after the replacement. Further, the zoom lenses according to Examples 1 to 6 have favorable optical performance in which various aberrations are suppressed in a state before and after the replacement.

Figure 29:
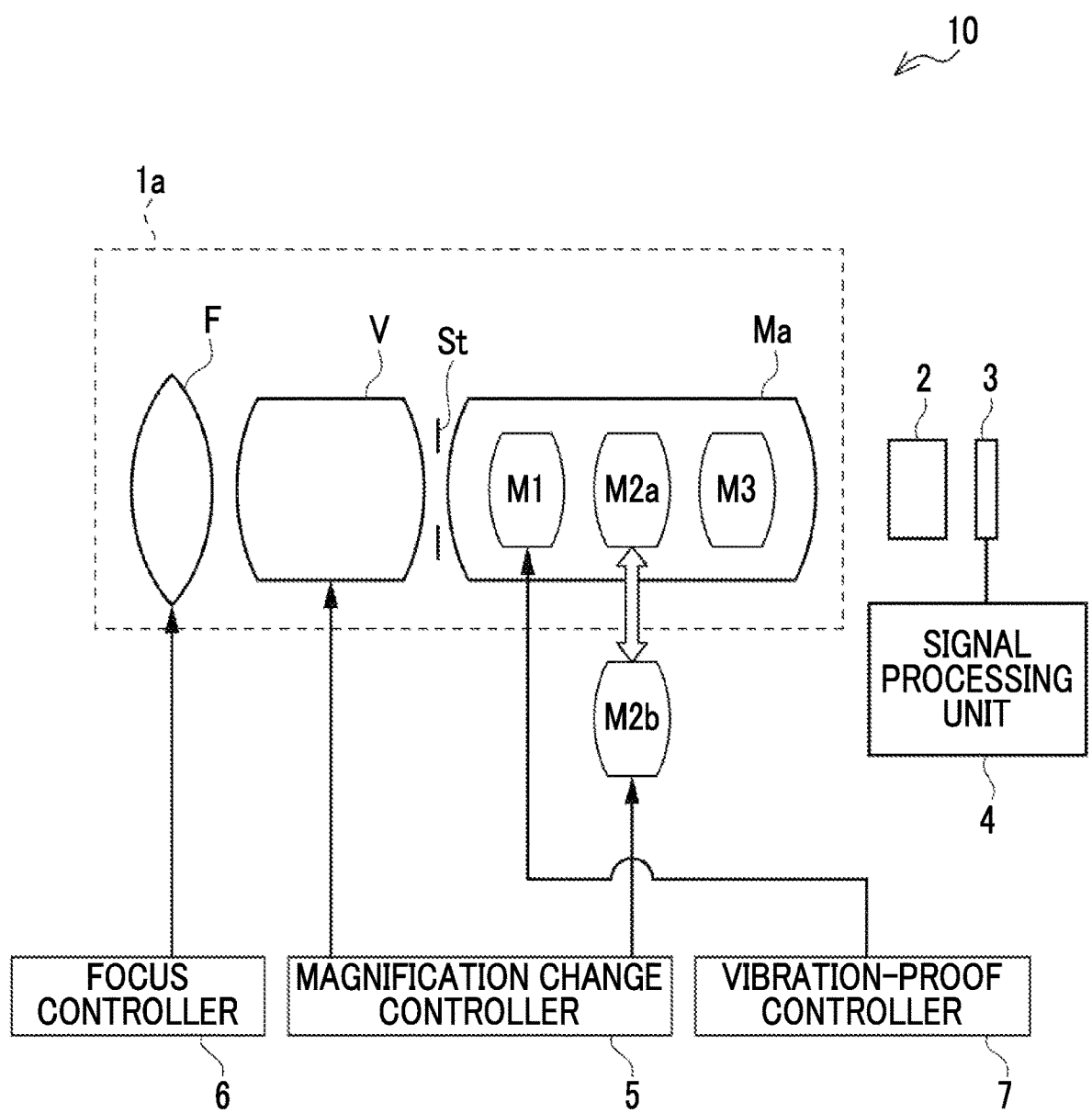
FIG. 29 is a schematic configuration diagram of an imaging apparatus according to an embodiment of the present disclosure.

Next, an imaging apparatus according to an embodiment of the present disclosure will be described. FIG. 29 shows a schematic configuration diagram of an imaging apparatus 10 using the zoom lens according to the embodiment of the present disclosure as an example of the imaging apparatus according to the embodiment of the present disclosure. For example, a broadcast camera, a movie filming camera, a video camera, a digital camera, and a monitoring camera can be exemplified as the imaging apparatus 10.

The imaging apparatus 10 comprises a zoom lens 1a according to an embodiment of the present disclosure, an optical member 2 disposed on the image side of the zoom lens 1a, and an imaging element 3 disposed on the image side of the optical member 2. The optical member 2 is a member having no refractive power, such as a filter, a cover glass, and/or a prism. The zoom lens 1a comprises the focusing part F, the variable magnification part V, the aperture stop St, and imaging part Ma. The imaging part Ma consists of the M1 lens group M1, the M2a lens group M2a, and the M3 lens group M3. The M1 lens group M1 includes a vibration-proof group inside. By replacing the M2a lens group M2a with the M2b lens group M2b, the focal length of the whole system changes to the long focal length side while the image formation position is kept constant. In addition, FIG. 29 schematically shows the focusing part F, the variable magnification part V, the imaging part Ma, the lens groups in the imaging part Ma, and the M2b lens group M2b.

The imaging element 3 converts an optical image formed by the zoom lens 1a into an electrical signal. For example, a charge coupled device (CCD) or a complementary metal oxide semiconductor (CMOS) can be used as the imaging element 3. While only one imaging element 3 is shown in FIG. 29, the imaging apparatus 10 may be an imaging apparatus of a so-called three-plate type including three imaging elements.

Further, the imaging apparatus 10 comprises a signal processing unit 4 that performs arithmetic processing on an output signal from the imaging element 3, a magnification change controller 5 that controls magnification change of the zoom lens 1a, a focus controller 6 that controls focusing of the zoom lens 1a, and a vibration-proof controller 7 that controls image blur correction of the zoom lens 1a. The magnification change controller 5 controls the variable magnification part V and replaces the M2a lens group M2a with the M2b lens group M2b.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

Regarding the above-mentioned embodiments and examples, the following Supplementary Notes will be further disclosed.

Supplementary Note 1

A zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change, in which the zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, in response to switching from the first state to the second state, a focal length of a whole system changes to a long focal length side while keeping an image formation position constant, and assuming that a focal length of the whole system in a state where an infinite distance object is in focus at a telephoto end in the first state is fta, a maximum half angle of view in a state where the infinite distance object is in focus at the telephoto end in the first state is ωta, a focal length of the whole system in a state where the infinite distance object is in focus at the telephoto end in the second state is ftb, a maximum half angle of view in a state where the infinite distance object is in focus at the telephoto end in the second state is ωtb, a focal length of the imaging part in the first state is fMa, a focal length of the M2a lens group is fM2a, a focal length of the imaging part in the second state is fMb, and a focal length of the M2b lens group is fM2b, Conditional Expressions (1), (2), and (3) are satisfied, which are represented by $$1.35<(ftb\times\tan\omega tb)/(fta\times\tan\omega ta)<1.65 \qquad (1)$$

$$0<|fMa/fM2a|<4 \qquad (2), and$$

$$0<|fMb/fM2b|<7 \qquad (3).$$

Supplementary Note 2

A zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change, in which the zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, in response to switching from the first state to the second state, a focal length of a whole system changes to a long focal length side while keeping an image formation position constant, and assuming that a focal length of the imaging part in the first state is fMa, a focal length of the M2a lens group is fM2a, a focal length of the imaging part in the second state is fMb, a focal length of the M2b lens group is fM2b, a maximum half angle of view in a state where an infinite distance object is in focus at a telephoto end in the first state is ωta, and a maximum half angle of view in a state where the infinite distance object is in focus at the telephoto end in the second state is ωtb, Conditional Expressions (2), (3), and (4) are satisfied, which are represented by $$0<|fMa/fM2a|<4 \qquad (2)$$

$$0<|fMb/fM2b|<7 \qquad (3), and$$

$$0.875<\omega tb/\omega ta<1.125 \qquad (4).$$

Supplementary Note 3

A zoom lens comprising, in order from an object side to an image side: a focusing part that includes a focusing lens group moving during focusing and remains stationary with respect to an image plane during magnification change; a variable magnification part that includes at least two variable magnification lens groups of which spacings from adjacent groups change during magnification change; an aperture stop; and an imaging part that remains stationary with respect to the image plane during magnification change, in which the zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, in response to switching from the first state to the second state, a focal length of a whole system changes to a long focal length side while keeping an image formation position constant, and assuming that a focal length of the imaging part in the first state is fMa, a focal length of the M2a lens group is fM2a, a focal length of the imaging part in the second state is fMb, a focal length of the M2b lens group is fM2b, an effective diameter of a lens surface closest to the object side in the M3 lens group in the second state is φM3F, and an effective diameter of a lens surface closest to the image side in the M3 lens group in the second state is φM3R, Conditional Expressions (2), (3), and (5) are satisfied, which are represented by $$0<|fMa/fM2a|<4 \qquad (2)$$

$$0<|fMb/fM2b|<7 \qquad (3), and$$

$$0.5<\varphi M3F/\varphi M3R<0.95 \qquad (5).$$

Supplementary Note 4

The zoom lens according to any one of Supplementary Notes 1 to 3, in which assuming that a maximum diameter of an on-axis luminous flux on a lens surface closest to the object side in the M2a lens group is φM2aF, a maximum diameter of the on-axis luminous flux on a lens surface closest to the image side in the M2a lens group is φM2aR, a maximum diameter of the on-axis luminous flux on a lens surface closest to the object side in the M2b lens group is φM2bF, and a maximum diameter of the on-axis luminous flux on a lens surface closest to the image side in the M2b lens group is φM2bR, Conditional Expression (6) is satisfied, which is represented by $$0.525<(\varphi M2bR/\varphi M2bF)/(\varphi M2aR/\varphi M2aF)<0.8 \qquad (6).$$

Supplementary Note 5

The zoom lens according to any one of Supplementary Notes 1 to 4, in which the M1 lens group includes a vibration-proof group that moves in a direction intersecting with an optical axis during image blur correction, and assuming that
a lateral magnification of the vibration-proof group in a state where the infinite distance object is in focus is βs, and
a composite lateral magnification of the M2a lens group and the M3 lens group in a state where the infinite distance object is in focus in the first state is βM2a3,
Conditional Expression (7) is satisfied, which is represented by $$0.5<|(1-\beta s)\times \beta M2a3|<2.75 \qquad (7).$$

Supplementary Note 6
The zoom lens according to Supplementary Note 5,
in which the vibration-proof group is disposed to be closest to the image side in the M1 lens group, and assuming that
an effective diameter of a lens surface closest to the object side in the vibration-proof group in the first state is φM1saF, and
an effective diameter of a lens surface closest to the object side in the M1 lens group in the first state is φM1aF,
Conditional Expression (8) is satisfied, which is represented by $$0.6<\varphi M1saF/\varphi M1aF<0.875 \qquad (8).$$

Supplementary Note 7
The zoom lens according to any one of Supplementary Notes 1 to 6, in which assuming that
a focal length of the whole system in a state where the infinite distance object is in focus at a wide angle end in the second state is fwb, and
a distance on an optical axis from the image plane in a state where the infinite distance object is in focus at the wide angle end in the second state to a paraxial exit pupil position is Dexwb,
where a sign of Dexwb is positive in a case of being a distance on the image side and is negative in a case of being a distance on the object side, with respect to the image plane, and
Dexwb is calculated using an air-equivalent distance for an optical member having no refractive power in a case where the optical member is disposed between the image plane and the paraxial exit pupil position,
Conditional Expression (9) is satisfied, which is represented by $$-0.45<fwb/Dexwb<-0.05 \qquad (9).$$

Supplementary Note 8
The zoom lens according to any one of Supplementary Notes 1 to 7, in which the M2b lens group includes two cemented lenses.
Supplementary Note 9
The zoom lens according to Supplementary Note 8, in which one of the two cemented lenses is a three-element cemented lens.
Supplementary Note 10
The zoom lens according to any one of Supplementary Notes 1 to 9, in which assuming that
a sum of a back focal length of the whole system at an air-equivalent distance and a distance on an optical axis from a lens surface closest to the object side in the zoom lens to a lens surface closest to the image side in the zoom lens in a state where the infinite distance object is in focus at the telephoto end in the second state is TLtb,
the focal length of the whole system in a state where the infinite distance object is in focus at the telephoto end in the second state is ftb, and
the maximum half angle of view in a state where the infinite distance object is in focus at the telephoto end in the second state is ωtb,
Conditional Expression (10) is satisfied, which is represented by $$30<TLtb/(ftb\times \tan \omega tb)<39 \qquad (10).$$

Supplementary Note 11
The zoom lens according to any one of Supplementary Notes 1 to 10, in which the focusing part has a positive refractive power as a whole.
Supplementary Note 12
The zoom lens according to Supplementary Note 11, in which assuming that
a focal length of the focusing part in a state where the infinite distance object is in focus is fF, and
a focal length of a first lens, which is a lens closest to the object side in the focusing part, is fL1,
Conditional Expression (11) is satisfied, which is represented by $$-0.675<fF/fL1<-0.425 \qquad (11)$$

Supplementary Note 13
The zoom lens according to Supplementary Note 11 or 12, in which assuming that
a refractive index of a first lens, which is a lens closest to the object side in the focusing part, at a d line is NdL1,
an Abbe number of the first lens based on the d line is vdL1, and
a partial dispersion ratio of the first lens between a g line and an F line is θgFL1,
Conditional Expressions (12), (13), and (14) are satisfied, which are represented by $$1.72<NdL1<1.92 \qquad (12)$$

$$34<vdL1<57 \qquad (13), \text{ and}$$

$$0.55<\theta gFL1<0.585 \qquad (14).$$

Supplementary Note 14
The zoom lens according to any one of Supplementary Notes 1 to 13, in which assuming that
the variable magnification lens group closest to the object side in the variable magnification part is a V1 lens group that has a negative refractive power and moves during magnification change,
a focal length of the focusing part in a state where the infinite distance object is in focus is fF, and
a focal length of the V1 lens group is fV1,
Conditional Expression (15) is satisfied, which is represented by $$4<fF/(-fV1)<9 \qquad (15).$$

Supplementary Note 15
The zoom lens according to any one of Supplementary Notes 1 to 14, in which assuming that
the variable magnification lens group closest to the object side in the variable magnification part is a V1 lens group that has a negative refractive power and moves during magnification change,
a lateral magnification of the V1 lens group in a state where the infinite distance object is in focus at the telephoto end is βV1t, and a lateral magnification of the V1 lens group in a state where the infinite distance object is in focus at a wide angle end is βV1w, Conditional Expression (16) is satisfied, which is represented by $$7.5 < \beta V1t/\beta V1w < 12 \quad (16).$$

Supplementary Note 16

The zoom lens according to any one of Supplementary Notes 1 to 15, in which the variable magnification part consists of, in order from the object side to the image side, a V1 lens group that has a negative refractive power and moves during magnification change, a V2 lens group that has a positive refractive power and moves during magnification change, and a V3 lens group that has a positive refractive power and moves during magnification change, and a spacing between the V1 lens group and the V2 lens group changes, and a spacing between the V2 lens group and the V3 lens group changes, during magnification change.

Supplementary Note 17

The zoom lens according to Supplementary Note 16, in which assuming that a focal length of the V1 lens group is fV1, and a composite focal length between the V2 lens group and the V3 lens group at the telephoto end is fV23t, Conditional Expression (17) is satisfied, which is represented by $$-0.45 < fV23t/fV1 < -0.225 \quad (17).$$

Supplementary Note 18

The zoom lens according to any one of Supplementary Notes 1 to 17, in which assuming that an open F number in a state where the infinite distance object is in focus at the telephoto end in the first state is Fnota, the focal length of the whole system in a state where the infinite distance object is in focus at the telephoto end in the first state is fta, and a focal length of the whole system in a state where the infinite distance object is in focus at a wide angle end in the first state is fwa, Conditional Expression (18) is satisfied, which is represented by $$0.11 < Fnota/(fta/fwa) < 0.15 \quad (18).$$

Supplementary Note 19

The zoom lens according to any one of Supplementary Notes 1 to 18, in which assuming that a sum of a back focal length of the whole system at an air-equivalent distance and a distance on an optical axis from a lens surface closest to the object side in the zoom lens to a lens surface closest to the image side in the zoom lens in a state where the infinite distance object is in focus at the telephoto end in the second state is TLtb, and the focal length of the whole system in a state where the infinite distance object is in focus at the telephoto end in the second state is ftb, Conditional Expression (19) is satisfied, which is represented by $$0.4 < TLtb/ftb < 0.6 \quad (19).$$

Supplementary Note 20

An imaging apparatus comprising the zoom lens according to any one of Supplementary Notes 1 to 19.

What is claimed is:

1. A zoom lens comprising, in order from an object side to an image side:

a focusing part that includes a focusing lens group moving during focusing and remains stationary with respect to an image plane during magnification change;

a variable magnification part that includes at least two variable magnification lens groups of which spacings from adjacent groups change during magnification change;

an aperture stop; and an imaging part that remains stationary with respect to the image plane during magnification change, wherein the zoom lens is switchable between a first state and a second state by replacing a part of the imaging part that is provided to be replaceable, in the first state, the imaging part consists of, in order from the object side to the image side, an M1 lens group, a replaceable M2a lens group, and an M3 lens group, in the second state, the imaging part consists of, in order from the object side to the image side, the M1 lens group, a replaceable M2b lens group, and the M3 lens group, in response to switching from the first state to the second state, a focal length of the zoom lens changes to a long focal length side while keeping an image formation position constant, and assuming that a focal length of the zoom lens in a state where an infinite distance object is in focus at a telephoto end in the first state is fta, a maximum half angle of view in a state where the infinite distance object is in focus at the telephoto end in the first state is ωta, a focal length of the zoom lens in a state where the infinite distance object is in focus at the telephoto end in the second state is ftb, a maximum half angle of view in a state where the infinite distance object is in focus at the telephoto end in the second state is ωtb, a focal length of the imaging part in the first state is fMa, a focal length of the M2a lens group is fM2a, a focal length of the imaging part in the second state is fMb, and a focal length of the M2b lens group is fM2b, Conditional Expressions (1), (2), and (3) are satisfied, which are represented by $$1.35 < (ftb \times \tan \omega tb)/(fta \times \tan \omega ta) < 1.65 \quad (1),$$

$$0 < |fMa/fM2a| < 4 \quad (2), \text{ and}$$

$$0 < |fMb/fM2b| < 7 \quad (3).$$

2. The zoom lens according to claim 1, wherein assuming that a maximum diameter of an on-axis luminous flux on a lens surface closest to the object side in the M2a lens group is φM2aF, a maximum diameter of the on-axis luminous flux on a lens surface closest to the image side in the M2a lens group is φM2aR, a maximum diameter of the on-axis luminous flux on a lens surface closest to the object side in the M2b lens group is φM2bF, and a maximum diameter of the on-axis luminous flux on a lens surface closest to the image side in the M2b lens group is φM2bR, Conditional Expression (6) is satisfied, which is represented by $$0.525 < (\varphi M2bR/\varphi M2bF)/(\varphi M2aR/\varphi M2aF) < 0.8 \qquad (6).$$

3. The zoom lens according to claim 1,
wherein the M1 lens group includes a vibration-proof group that moves in a direction intersecting with an optical axis during image blur correction, and assuming that
a lateral magnification of the vibration-proof group in a state where the infinite distance object is in focus is βs, and
a composite lateral magnification of the M2a lens group and the M3 lens group in a state where the infinite distance object is in focus in the first state is βM2a3,
Conditional Expression (7) is satisfied, which is represented by $$0.5 < |(1-\beta s) \times \beta M2a3| < 2.75 \qquad (7).$$

4. The zoom lens according to claim 3,
wherein the vibration-proof group is disposed to be closest to the image side in the M1 lens group, and assuming that
an effective diameter of a lens surface closest to the object side in the vibration-proof group in the first state is φM1saF, and
an effective diameter of a lens surface closest to the object side in the M1 lens group in the first state is φpM1aF,
Conditional Expression (8) is satisfied, which is represented by $$0.6 < \varphi M1saF/\varphi M1aF < 0.875 \qquad (8).$$

5. The zoom lens according to claim 1, wherein assuming that
a focal length of the zoom lens in a state where the infinite distance object is in focus at a wide angle end in the second state is fwb, and
a distance on an optical axis from the image plane to a paraxial exit pupil position in a state where the infinite distance object is in focus at the wide angle end in the second state is Dexwb,
where a sign of Dexwb is positive in a case of being a distance on the image side and is negative in a case of being a distance on the object side, with respect to the image plane, and
Dexwb is calculated using an air-equivalent distance for an optical member having no refractive power in a case where the optical member is disposed between the image plane and the paraxial exit pupil position,
Conditional Expression (9) is satisfied, which is represented by $$-0.45 < fwb/Dexwb < -0.05 \qquad (9).$$

6. The zoom lens according to claim 1, wherein the M2b lens group includes two cemented lenses.

7. The zoom lens according to claim 6, wherein one of the two cemented lenses is a three-element cemented lens.

8. The zoom lens according to claim 1, wherein assuming that
a sum of a back focal length of the zoom lens at an air-equivalent distance and a distance on an optical axis from a lens surface closest to the object side in the zoom lens to a lens surface closest to the image side in the zoom lens in a state where the infinite distance object is in focus at the telephoto end in the second state is TLtb,
the focal length of the zoom lens in a state where the infinite distance object is in focus at the telephoto end in the second state is ftb, and
the maximum half angle of view in a state where the infinite distance object is in focus at the telephoto end in the second state is ωtb,
Conditional Expression (10) is satisfied, which is represented by $$30 < TLtb/(ftb \times \tan \omega tb) < 39 \qquad (10).$$

9. The zoom lens according to claim 1, wherein the focusing part has a positive refractive power as a whole.

10. The zoom lens according to claim 9, wherein assuming that
a focal length of the focusing part in a state where the infinite distance object is in focus is fF, and
a focal length of a first lens, which is a lens closest to the object side in the focusing part, is fL1,
Conditional Expression (11) is satisfied, which is represented by $$-0.675 < fF/fL1 < -0.425 \qquad (11).$$

11. The zoom lens according to claim 9, wherein assuming that
a refractive index of a first lens, which is a lens closest to the object side in the focusing part, at a d line is NdL1,
an Abbe number of the first lens based on the d line is νdL1, and
a partial dispersion ratio of the first lens between a g line and an F line is θgFL1,
Conditional Expressions (12), (13), and (14) are satisfied, which are represented by $$1.72 < NdL1 < 1.92 \qquad (12),$$

$$34 < \nu dL1 < 57 \qquad (13), \text{ and}$$

$$0.55 < \theta gFL1 < 0.585 \qquad (14).$$

12. The zoom lens according to claim 1, wherein assuming that
the variable magnification lens group closest to the object side in the variable magnification part is a V1 lens group that has a negative refractive power and moves during magnification change,
a focal length of the focusing part in a state where the infinite distance object is in focus is fF, and
a focal length of the V1 lens group is fV1,
Conditional Expression (15) is satisfied, which is represented by $$4 < fF/(-fV1) < 9 \qquad (15).$$

13. The zoom lens according to claim 1, wherein assuming that
the variable magnification lens group closest to the object side in the variable magnification part is a V1 lens group that has a negative refractive power and moves during magnification change,
a lateral magnification of the V1 lens group in a state where the infinite distance object is in focus at the telephoto end is βV1t, and
a lateral magnification of the V1 lens group in a state where the infinite distance object is in focus at a wide angle end is βV1w, Conditional Expression (16) is satisfied, which is represented by $$7.5 < \beta V1t/\beta V1w < 12 \qquad (16).$$

14. The zoom lens according to claim 1,
wherein the variable magnification part consists of, in order from the object side to the image side, a V1 lens group that has a negative refractive power and moves during magnification change, a V2 lens group that has a positive refractive power and moves during magnification change, and a V3 lens group that has a positive refractive power and moves during magnification change, and
a spacing between the V1 lens group and the V2 lens group changes, and a spacing between the V2 lens group and the V3 lens group changes, during magnification change.

15. The zoom lens according to claim 14, wherein assuming that
a focal length of the V1 lens group is fV1, and
a composite focal length between the V2 lens group and the V3 lens group at the telephoto end is fV23t,
Conditional Expression (17) is satisfied, which is represented by $$-0.45 < fV23t/fV1 < -0.225 \qquad (17).$$

16. The zoom lens according to claim 1, wherein assuming that
an open F number in a state where the infinite distance object is in focus at the telephoto end in the first state is Fnota,
the focal length of the zoom lens in a state where the infinite distance object is in focus at the telephoto end in the first state is fta, and
a focal length of the zoom lens in a state where the infinite distance object is in focus at a wide angle end in the first state is fwa,
Conditional Expression (18) is satisfied, which is represented by $$0.11 < Fnota/(fta/fwa) < 0.15 \qquad (18).$$

17. The zoom lens according to claim 1, wherein assuming that
a sum of a back focal length of the zoom lens at an air-equivalent distance and a distance on an optical axis from a lens surface closest to the object side in the zoom lens to a lens surface closest to the image side in the zoom lens in a state where the infinite distance object is in focus at the telephoto end in the second state is TLtb, and
the focal length of the zoom lens in a state where the infinite distance object is in focus at the telephoto end in the second state is ftb,
Conditional Expression (19) is satisfied, which is represented by $$0.4 < TLtb/ftb < 0.6 \qquad (19).$$

18. An imaging apparatus comprising the zoom lens according to claim 1.

19. A zoom lens comprising, in order from an object side to an image side:
a focusing part that includes a focusing lens group moving during focusing and remains stationary with respect to an image plane during magnification change;
a variable magnification part that includes at least two variable magnification lens groups of which spacings from adjacent groups change during magnification change;
an aperture stop; and
an imaging part that remains stationary with respect to the image plane during magnification change,
wherein the zoom lens is switchable between a first state and a second state by replacing a part of the imaging part that is provided to be replaceable,
in the first state, the imaging part consists of, in order from the object side to the image side, an M1 lens group, a replaceable M2a lens group, and an M3 lens group,
in the second state, the imaging part consists of, in order from the object side to the image side, the M1 lens group, a replaceable M2b lens group, and the M3 lens group,
in response to switching from the first state to the second state, a focal length of the zoom lens changes to a long focal length side while keeping an image formation position constant, and
assuming that
a focal length of the imaging part in the first state is fMa,
a focal length of the M2a lens group is fM2a,
a focal length of the imaging part in the second state is fMb,
a focal length of the M2b lens group is fM2b,
a maximum half angle of view in a state where an infinite distance object is in focus at a telephoto end in the first state is ωta, and
a maximum half angle of view in a state where the infinite distance object is in focus at the telephoto end in the second state is ωtb,
Conditional Expressions (2), (3), and (4) are satisfied, which are represented by $$0 < |fMa/fM2a| < 4 \qquad (2),$$

$$0 < |fMb/fM2b| < 7 \qquad (3), \text{ and}$$

$$0.875 < \omega tb/\omega ta < 1.125 \qquad (4).$$

20. A zoom lens comprising, in order from an object side to an image side:
a focusing part that includes a focusing lens group moving during focusing and remains stationary with respect to an image plane during magnification change;
a variable magnification part that includes at least two variable magnification lens groups of which spacings from adjacent groups change during magnification change;
an aperture stop; and
an imaging part that remains stationary with respect to the image plane during magnification change,
wherein the zoom lens is switchable between a first state and a second state by replacing a part of the imaging part that is provided to be replaceable,
in the first state, the imaging part consists of, in order from the object side to the image side, an M1 lens group, a replaceable M2a lens group, and an M3 lens group,
in the second state, the imaging part consists of, in order from the object side to the image side, the M1 lens group, a replaceable M2b lens group, and the M3 lens group,
in response to switching from the first state to the second state, a focal length of the zoom lens changes to a long focal length side while keeping an image formation position constant, and
assuming that
a focal length of the imaging part in the first state is fMa, a focal length of the M2a lens group is fM2a,
a focal length of the imaging part in the second state is fMb,
a focal length of the M2b lens group is fM2b,
an effective diameter of a lens surface closest to the object side in the M3 lens group in the second state is φpM3F, and
an effective diameter of a lens surface closest to the image side in the M3 lens group in the second state is φpM3R,
Conditional Expressions (2), (3), and (5) are satisfied, which are represented by $$0 < |fMa/fM2a| < 4 \quad (2),$$

$$0 < |fMb/fM2b| < 7 \quad (3), \text{ and}$$

$$0.5 < \varphi M3F/\varphi M3R < 0.95 \quad (5).$$

* * * * *